(12) United States Patent  
Arai

(10) Patent No.: US 11,363,151 B2  
(45) Date of Patent: Jun. 14, 2022

(54) PROGRAM, INFORMATION PROCESSING APPARATUS, IMAGE FORMING APPARATUS, AND PRINTING SYSTEM

(71) Applicant: Mami Arai, Tokyo (JP)

(72) Inventor: Mami Arai, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 78 days.

(21) Appl. No.: 17/018,101

(22) Filed: Sep. 11, 2020

(65) Prior Publication Data

US 2021/0092236 A1    Mar. 25, 2021

(30) Foreign Application Priority Data

Sep. 25, 2019  (JP) .............................. JP2019-174613

(51) Int. Cl.
| | |
|---|---|
| *H04N 1/08* | (2006.01) |
| *H04N 1/00* | (2006.01) |
| *H04N 1/54* | (2006.01) |
| *G06F 3/04845* | (2022.01) |
| *H04N 1/60* | (2006.01) |

(52) U.S. Cl.
CPC ....... *H04N 1/0044* (2013.01); *G06F 3/04845* (2013.01); *H04N 1/00469* (2013.01); *H04N 1/54* (2013.01); *H04N 1/605* (2013.01)

(58) Field of Classification Search
CPC .............................. G06F 3/04845; H04N 1/605
See application file for complete search history.

(56) References Cited

U.S. PATENT DOCUMENTS

| | | | |
|---|---|---|---|
| 7,553,432 B2 | 6/2009 | Nakamura | |
| 10,620,888 B2 | 4/2020 | Minegishi | |
| 2008/0204774 A1* | 8/2008 | Matsushima | ........ H04N 1/6072 358/1.9 |
| 2013/0278952 A1 | 10/2013 | Suzuki et al. | |
| 2015/0208746 A1* | 7/2015 | Schindler | ............... A41H 3/007 700/132 |

FOREIGN PATENT DOCUMENTS

| | | |
|---|---|---|
| JP | 2006-038933 | 2/2006 |
| JP | 2013-222161 | 10/2013 |
| JP | 5854622 | 2/2016 |
| JP | 2016-062143 | 4/2016 |

OTHER PUBLICATIONS

U.S. Appl. No. 16/802,673, filed Feb. 27, 2020.

* cited by examiner

*Primary Examiner* — Ibrahim Siddo  
(74) *Attorney, Agent, or Firm* — IPUSA, PLLC

(57) ABSTRACT

A non-transitory recording medium for an information processing apparatus having a computer program that, when executed by a hardware circuitry of the information processing apparatus, causes the information processing apparatus to request an image forming apparatus to print a document by executing steps of receiving a position of a specific color area which is printed with a specific color; and sending information of the specific color area including the received position of the specific color area and data of the document to the image forming apparatus.

11 Claims, 49 Drawing Sheets

FIG.3
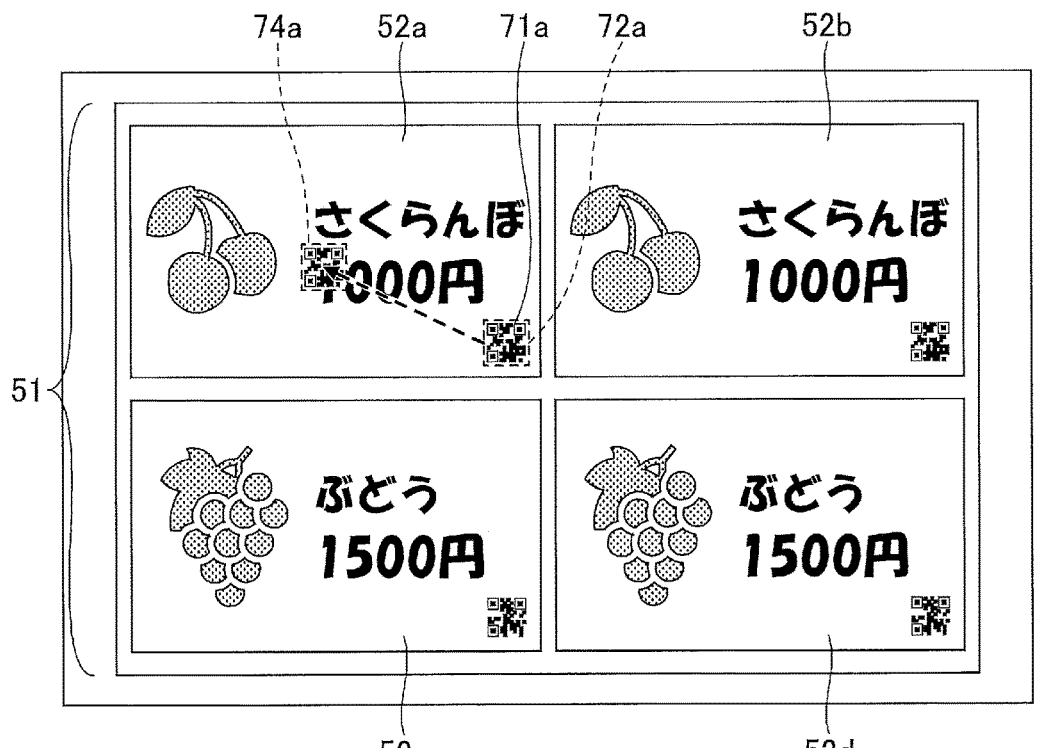
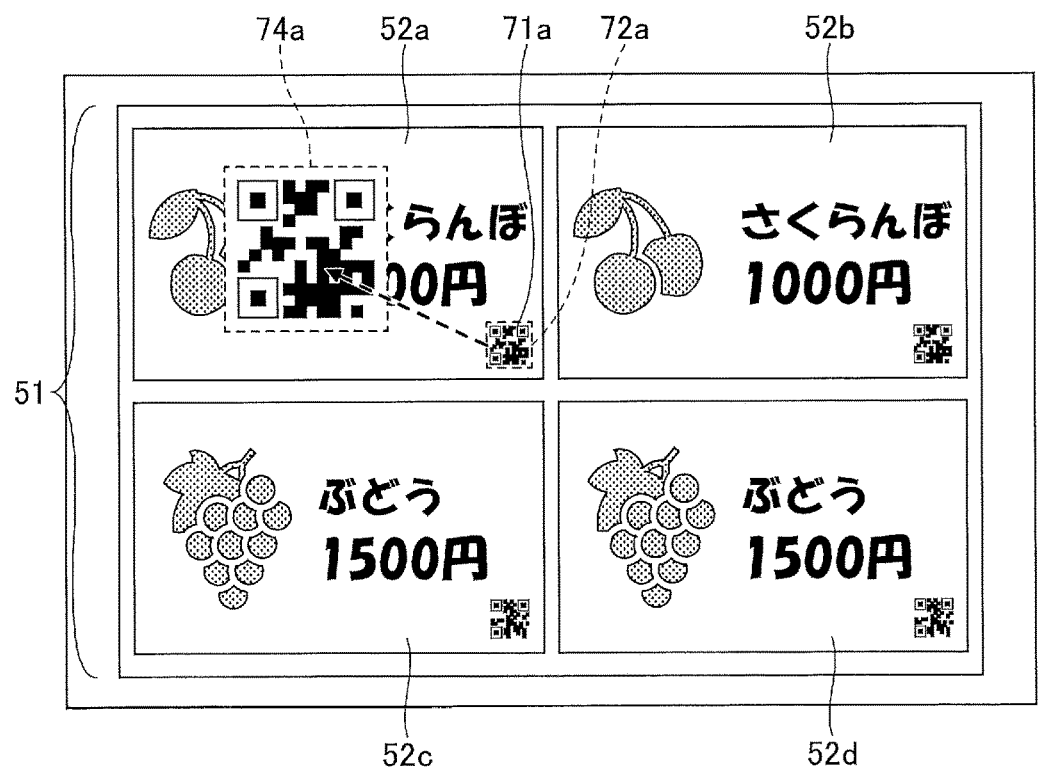

```
[
  {
    "src_x": "100",
    "src_y": "100",
    "width": "200",
    "height": "200",
    "dst_x": "550",
    "dst_y": "750",
    "dst_width": "300",
    "dst_height": "300",
    "rot": "30",
  },
  {
    "src_x": "500",
    "src_y": "500",
    "width": "700",
    "height": "800",
    "dst_x": "550",
    "dst_y": "1100",
    "dst_width": "700",
    "dst_height": "800",
    "rot": "0",
  }
  ... ADD AS MANY AS THE NUMBER OF AREAS TO BE PRINTED WITH THE SPECIFIC COLOR
]
```

D1 = first object, D2 = second object

```
@RPCS SRC1_X=100
@RPCS SRC1_Y=100
@RPCS SRC1_WIDTH=200
@RPCS SRC1_HEIGHT=200
@RPCS DST1_X=550                    ⎫
@RPCS DST1_X=750                    ⎬ D3
@RPCS DST1_width=300                ⎪
@RPCS DST1_height=300               ⎭
@RPCS ROT1=30
@RPCS SRC2_X=500
@RPCS SRC2_Y=500
@RPCS SRC2_WIDTH=700
@RPCS SRC2_HEIGHT=800
@RPCS DST2_X=550                    ⎫
@RPCS DST2_X=1100                   ⎬ D4
@RPCS DST2_width=700                ⎪
@RPCS DST2_height=800               ⎭
@RPCS ROT2=0
...
(PRINT DATA OF DOCUMENT)
```

PROGRAM, INFORMATION PROCESSING APPARATUS, IMAGE FORMING APPARATUS, AND PRINTING SYSTEM

CROSS-REFERENCE TO RELATED APPLICATIONS

The present application claims priority under 35 U.S.C. § 119 to Japanese Patent Application No. 2019-174613, filed Sep. 25, 2019, the contents of which are incorporated herein by reference in their entirety.

BACKGROUND OF THE INVENTION

Field of the Invention

The present invention relates to a program, an information processing apparatus, an image forming apparatus, and a printing system.

Description of the Related Art

The toner used to form an image by a laser printer or the like requires various characteristics from the viewpoints of development, transfer, fixing, image quality, and the like. For example, a technique for imaging with toner that reflects or absorbs light of a specific wavelength has been devised (see, for example, Patent Document 1). Patent Document 1 discloses a technique in which an infrared absorber is mixed with toner such as C, M, Y, and K (cyan, magenta, yellow, and black) to form an image.
[Patent Document 1]
Japanese Laid-Open Patent Application No. 2006-38933

SUMMARY OF THE INVENTION

A non-transitory recording medium for an information processing apparatus having a computer program that, when executed by a hardware circuitry of the information processing apparatus, causes the information processing apparatus to request an image forming apparatus to print a document by executing steps of receiving a position of a specific color area which is printed with a specific color; and sending information of the specific color area including the received position of the specific color area and data of the document to the image forming apparatus.

BRIEF DESCRIPTION OF THE DRAWINGS

FIG. 3 is a diagram illustrating an example of the display of a designated image with a set size.

FIGS. 24A and 24B are views illustrating an example of area information saved in a memory region by an area information storing unit.

FIG. 9 illustrates an example of a flowchart illustrating details of the process performed by a preview application in Steps S2 to S3.1.

DESCRIPTION OF THE EMBODIMENTS

Printing with a specific color requires an application in which a specific color can be designated and an image forming apparatus in which a specific color is designated, but there is a problem that there are only a limited number of applications for printing using the specific color. Documents displayed on a display by an information processing apparatus represent color by the additive subtraction method (RGB). For this reason, it is common for an application operated by an information processing apparatus to form an image in RGB. RGB color-represented documents are converted to C, M, Y, and K during printing, so that a particular color cannot be handled in a general application. Some image processing applications can handle documents in specific colors in addition to RGB, but the costs of implementing and familiarizing such applications are high.

In view of the above-described object, the present disclosure is intended to enable printing of a specific color without application that can designate the specific color.

Hereinafter, as an example of an embodiment of the present invention, a printing method performed by a printing system and the printing system will be described with reference to the drawings.

First Embodiment

<Schematic Operation of Printing System>

Figure 1:
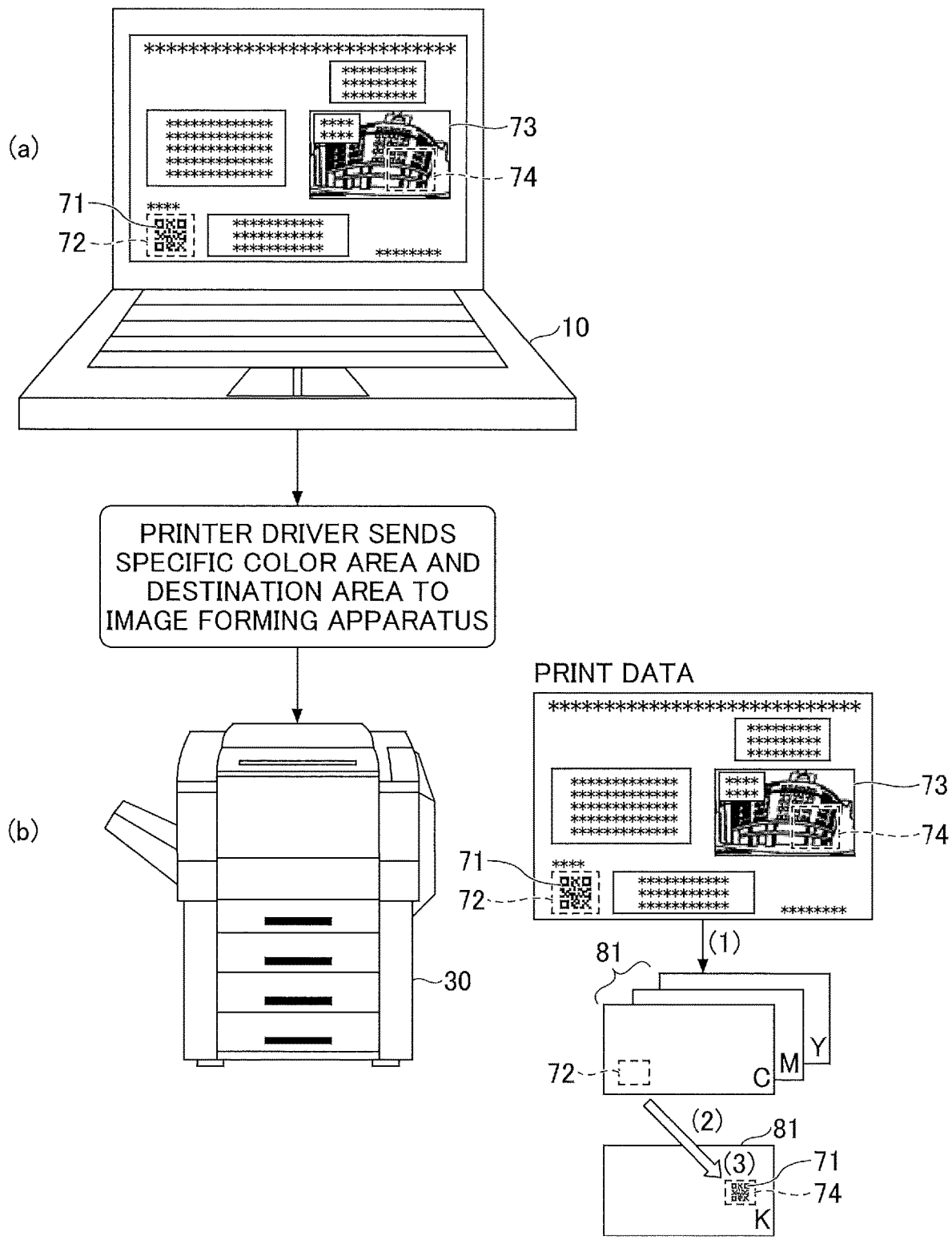
FIG. 1 illustrates an example of a diagram illustrating a schematic operation of a printing system.

First, a method in which an image forming apparatus forms an image having a specific color will be described with reference to FIGS. 1 and 2. FIG. 1 is an example of a diagram illustrating a schematic operation of a printing system. FIG. 2 is an example of a flowchart illustrating a schematic operation of an information processing apparatus in which an application is operated.

As illustrated in FIG. 1, the process performed by the printing system is divided into processing on a side of the information processing apparatus 10 (FIG. 1, (a)) and processing on a side of the image forming apparatus 30 (FIG. 1, (b)). In FIG. 1, (a) is a diagram illustrating the operation performed by the user by the information processing apparatus 10. A user executes a general application software (hereinafter, simply referred to as an application) in the information processing apparatus 10 and creates a document (the document may include not only a character but also a number, a graphic, an image, etc.) to be printed with a specified color (hereinafter, referred to as a specific color) other than C, M, Y, and K. A general application is an application that cannot designates the specific color, in other words, can handle only RGB. Explanation is given in accordance with FIG. 2A.

(S101)

The user describes the designated image 71 to be printed with the specific color. In (a) of FIG. 1, the designated image 71 is an image code (a bar code or a two dimensional code), but a designated image 71 may be a character, a number, a symbol, an alphabet, a graphic shape, or a photograph that can be represented in two dimensions. The document in (a) of FIG. 1 may have been completed in advance. Further, the image in the area selected by the user becomes the designated image 71, and the user can select the designated image 71 from any location in the document.

(S102)

The user calls a first printer driver (described below) from the application. The first printer driver is a virtual printer driver for calling preview application software (hereinafter, simply referred to as a preview application), which will be described later, and printing is not performed. The first printer driver calls the preview application.

(S103)

The user sets up a specific color area 72 (an example of a specific color area) on the preview screen displayed by the preview application to include the designated image 71 to be printed with the specific color. In (a) of FIG. 1, a rectangular area surrounding the image code is the specific color area 72. As described above, the specific color area 72 is an area in which the designated image 71 to be printed with the specific color is designated.

Although the user may print the designated image 71 of the specific color area 72 on the specific color area 72, the designated image 71 of the specific color area 72 may be printed after moving to anywhere in the document. That is, the user can designate a moving destination of the designated image 71 of the specific color area 72. In (a) of FIG. 1, the moving destination area 74 is designated as part of a photograph 73 of the document (which is actually a task on a preview screen).

When the information processing apparatus 10 is operated, the user only designates the moving destination area 74, and the designated image 71 does not move to the moving destination area 74 within the document of the preview screen. When the designated image 71 is moved within the document of the preview screen, for example, in (a) of FIG. 1, the value of the RGB is determined in a state where the photo 73 and the designated image 71 (image code) overlap, so that it is difficult for the image forming apparatus 30 to extract only the image code from the document overlapping the photo 73. The present embodiment assumes a transparent toner as the specific color material as described below, but it is difficult to print only the image code with transparent toner. Another reason is that even if only the image code is retrieved from a document overlapping the photograph, the RGB value is determined when the photograph and image code overlap, so the original photograph information will be missing. In this case, when the image code is printed with transparent toner, the RGB value of the overlapped portion of the image code changes from the value of the original photograph, and the image quality deteriorates.

Accordingly, the printing system 100 according to the present embodiment can specify the moving destination area 74 so that the designated image 71 can be printed at any location with the specific color without degrading image quality. Further, even if the toner having the specific color material is transparent, when the toner is printed on a plain piece of paper, it may be noticeable. Therefore, because the designated image 71 can be printed on a non-plain piece of paper, it is possible to make the designated image 71 printed with the specific color less noticeable.

(S104)

Figure 2A:
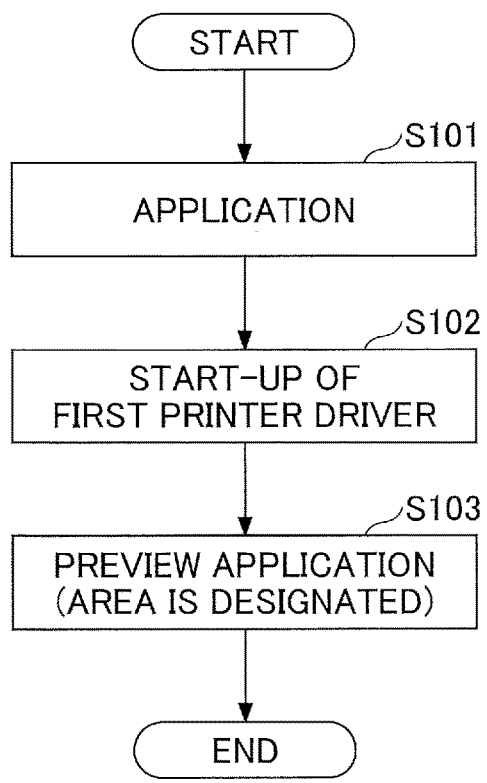
FIGS. 2A and 2B illustrate an example of a flowchart illustrating a schematic operation of an information processing apparatus in which an application operates.
Figure 2B:
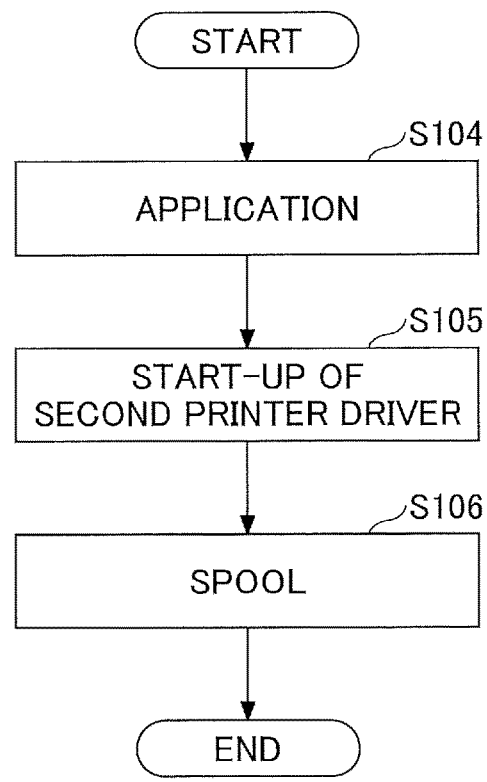

Explain in accordance with FIG. 2B. Next, the user returns to the original application and calls a second printer driver from the application.

(S105, S106)

The second printer driver converts information concerning the specific color area 72 and the moving destination area 74 set in step S103 into print data described using PDL (Printer Description Language) and transmits the converted information to the image forming apparatus 30. Of course, the second printer driver converts the document to print data as before while the designated image 71 is positioned in the specific color area 72. The printed data is transmitted to the image forming apparatus 30 through a spooler.

Next, the processing in the image forming apparatus 30 will be described. In FIG. 1, (b) is a diagram illustrating processing performed by the image forming apparatus 30. The image forming apparatus 30 is a general image forming apparatus 30 that cannot designate the specific color (only C, M, Y, and K can be designated). The image forming apparatus 30 according to this embodiment is a color printer that uses combinations of four colors of C, M, Y, and K (cyan, magenta, yellow, and black). The image forming apparatus 30 converts the print data of the RGB output by the printer driver to the print data of C, M, and Y. In other words, it is not converted to K. Only C, M, and Y from among C, M, Y, and K can represent black. The general image forming apparatus uses K in order to improve color development and reduce the amount of toner used. In the image forming apparatus 30 according to this embodiment, the specific color is assigned to K by utilizing the fact that the black color can be printed without K (a specific color material is housed in a toner cartridge of K).

(1) As illustrated in (b) of FIG. 1, the image forming apparatus 30 creates C, M, and Y plain images 81 (image data in which pixels are represented by 1 or 0) in which the presence or absence of coloring is expressed by a point (bit) based on the print data transmitted from the information processing apparatus 10.

(2) because the designated image 71 of the specific color area 72 is drawn in the plain images 81 of C, M, and Y, the image forming apparatus 30 retrieves image data in the specific color area 72 respectively.

That is, the image of the designated image 71 is extracted. The image data in the specific color area 72 is deleted.

(3) The image forming apparatus 30 converts the image data of C, M, and Y in the specific color area 72 into a plain image 81 of K. This is because K is assigned to the specific color in the image forming apparatus 30. Therefore, it is sufficient to convert the color to a color that is free (not assigned to a color) in the image forming apparatus 30. The image forming apparatus 30 disposes the designated image 71 converted into K in the moving destination area 74 of the plain image of K.

The image forming apparatus 30 forms images of the C-plain image 81 with the C toner, the M-plain image 81 with the M toner, the Y-plain image 81 with the Y toner, and the K-plain image 81 with the specific color material, respectively, and thereby obtains an output in which the designated image 71 of the specific color area 72 is printed using the specific color material in the moving destination area 74.

As described above, in the printing system 100 according to the present embodiment, even without the image forming apparatus 30 capable of designating the specific color, the application capable of designating the specific color, or both, printing using the specific color can be realized.

When there is an image forming apparatus 30 capable of designating the specific color and an application capable of designating the specific color, printing using the specific color is possible, but the following complicated work is required.

a. Output document data created in the general application as image data (PDF (Portable Document Format)).

b. The image data (PDF) is read by an application that can designate the specific color.

c. The user performs the task of adding a specific color plane (creating an RGB image+a PDF file containing the specific color plane).

On the other hand, in the present embodiment, it is possible to implement printing using the specific color in the process of designating the specific color area 72 and the moving destination area 74 by a user calling the printer driver on a general application.

<When the Size of Designated Image is Small>

As described above, although the designated image 71 of the specific color area 72 can be printed using the specific color material in the moving destination area 74, there have been cases in which an empty region (a plain background part) for arranging the designated image to be printed by the specific color toner cannot be allocated to the image to be printed. For example, in the case where the designated image to be printed with the specific color toner is an image code such as a QR code ("QR code" is a registered trademark), the designated image 71 may be prepared in a relatively large size because the scanner or other reading device cannot be accurately read unless the image is prepared to have a certain size.

Accordingly, within the present embodiment, not only the position of the designated image 71 to be printed with the specific color toner is designated, but the user can change the size of the designated image 71.

FIG. 3 is a diagram illustrating an example of a display of a designated image whose size is set. In FIG. 3, (a) illustrates the case where the document is imposed and printed. Imposition print refers to printing of multiple pages after arranging on a plate (one page for printing on a paper). In FIG. 3, (a) illustrates a state where four documents (hereinafter, referred to as "original images 52a-52d") are placed on one sheet. Each original image 52 illustrate the moving destination areas 74a-74d and designated images 71a-71d. Hereinafter, a reference symbol 52 designates any of the original images 52a to 52d, a reference symbol 74 designates any of the moving destination areas 74a to 74d, and a reference symbol 71 designates any of the designated images 71a to 71d.

As described in FIGS. 1, 2A, and 2B, in (a) of FIG. 3, the user can move the designated image 71 to any location within a print region 51. Thereafter, the user enters the size of the designated image 71. The unit of this size may be the number of pixels [pixel] or [m]. The designated image 71 on a paper can be read by a reading device or the like with this size.

When the user enters the size, the information processing apparatus 10 reflects the input size to the designated image 71 (the moving destination area is moved and the size is changed by the image forming apparatus), as illustrated in FIG. 3(b). In (b) of FIG. 3, the moving destination area 74 is magnified larger than the original size of the designated image 71. For example, the user who thinks that the reading device cannot accurately read at the original size of the designated image 71 causes the size of the moving destination area 74 to be magnified.

As described above, the information processing apparatus 10 according to the present embodiment is capable of changing the size of the designated image 71 to be printed with the specific color toner in addition to designation of the position. Although an example of magnifying the designated image is described in FIG. 3, the designated image may be minified depending on the entered size.

Terminology

The specified color (the specific color) refers to a primary color other than C, M, Y, and K (these are referred to as a process color). For example, the specified colors (the specific color) is gold, silver, white or transparent. Because different color inks can be used in addition to C, M, Y, and K depending on the image forming apparatus (for example, an ink jet type), the specific colors may be different with regard to the image forming apparatus. The application can also be a color that cannot be represented in RGB. The specific color material such as toner or ink that can print the specific color is referred to as specific color material.

Transparent means invisible under light having a certain wavelength. Complete invisibility is not required, it may be apparently invisible and/or an imaging apparatus cannot capture an image. Note that a transparent toner or ink may be referred to as a Stealth toner or Stealth ink.

Within the present embodiment, the image forming apparatus in which the specific color other than C, M, Y, and K is designated and printed is not used. For example, the image forming apparatus in which the specific color is assigned to K is used. In other words, only C, M, Y, and K may be available colors. The image forming apparatus 30 according to this embodiment does not use the toner of K, and the toner cartridge for K contains the specific color material. However, the image forming apparatus (C, M, Y, and K+ specific color) that can be printed by designating the specific color can be used.

A predetermined color refers to the primary color other than the specific color.

<Example of System Configuration>

Figure 4:
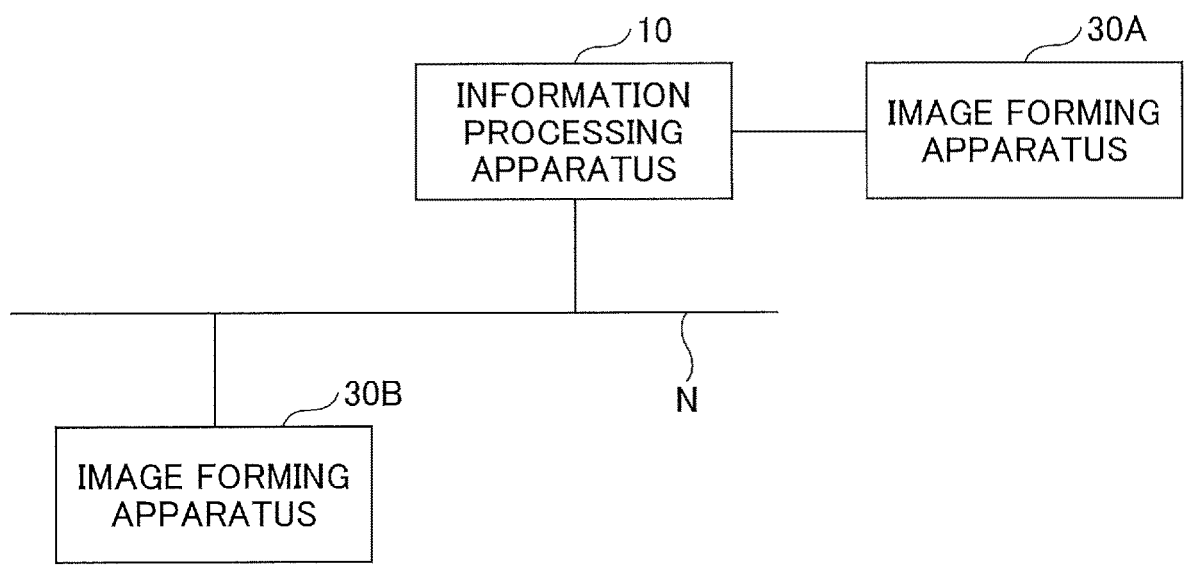
FIG. 4 illustrates an example of a schematic configuration of a printing system.

FIG. 4 illustrates an example of a schematic configuration diagram of the printing system 100. The printing system 100 illustrated in FIG. 4 includes an information processing apparatus 10 and one or more image forming apparatus 30. The image forming apparatus 30 connected to the information processing apparatus 10 by an exclusive line is called an image forming apparatus 30A, and the image forming apparatus 30 connected to the network is called an image forming apparatus 30B. Among the multiple image forming apparatuses 30A and 30B, an arbitrary image forming apparatus 30 is represented as an "image forming apparatus 30".

The information processing apparatus 10 and the image forming apparatus 30A are connected to Peer To Peer (1:1) by the exclusive line such as a USB cable. However, it does not have to be always connected, and the user can detach and attach the exclusive line. In addition to the USB cable, there are, for example, a PC card, PCI, IEEE 1394, SCSI, etc.

The information processing apparatus 10 and the image forming apparatus 30A may be wirelessly connected. Wireless communication that connects to Peer To Peer includes Bluetooth ("Bluetooth" is a registered trademark) and Wireless LAN.

The information processing apparatus 10 is communicatively connected to the image forming apparatus 30B through the network. This network N is assumed to be an ordinary network such as a LAN or the Internet. The LAN is, for example, a LAN within a facility such as a company in which the image forming apparatus 30B is disposed. The network N may also include VPN (Virtual Private Network) and Wide Area Ethernet ("Ethernet" is a registered trademark). The network N may be constructed of either wired or wireless communication, and may be constructed of a combination of the wired and wireless communications.

The information processing apparatus 10 executes various control programs and applications such as an OS (operating system) and a printer driver, and provides functions according to the application. It is often called a computer. The control program is, for example, a program called a device driver (software provided to enable control of hardware connected to a PC by the OS). An example of the device driver is a printer driver. For example, the information processing apparatus 10 may be a personal computer, a smartphone, a tablet terminal, a personal digital assistant (PDA), a wearable PC, or the like.

In addition, the information processing apparatus 10 may be an electronic blackboard (White Board: a device having an electronic blackboard function enabling mutual communications), an output device such as a digital signage, a projector, a video conference terminal, or the like, an OS, a control program, and an application operating devices.

The image forming apparatus 30 forms an image, such as a character or a graphic, on a recording medium mainly by toner or ink. According to the present embodiment, C, M, and Y image data can be formed with a toner or ink (hereinafter, referred to as the visible material) that can be read by the naked eye, and a K image data can be formed with the specific color material (toner or ink). The image forming apparatus 30 can form an image of both a visible material and a specific color material on one recording medium. The image may be formed by only one of the visible material and the specific color material.

As the specific color material, the toner or ink having absorption in the wavelength range of infrared light (about 850 nm) including near infrared light and having absorption in the wavelength range of visible light (about 400 to 700 nm) can be employed (the absorption in the wavelength range of visible light is less than the absorption in the wavelength range of infrared light). These specific color materials are transparent (invisible) to visible light and are legible when irradiated with infrared light. Thus, the specific color means transparent to the visible light. The specific color material appears black because it absorbs infrared light when being irradiated. The colors of C, M, and Y are transparent to infrared light. On the other hand, some K color materials (normal black toner) absorb infrared light and some do not. When the color of K absorbing infrared light is formed with the specific color material, both colors appear black, making it difficult to recognize the designated image 71 formed of the specific color material. For this reason, the color of K and the specific color material that absorb infrared light cannot be formed on the same paper. On the other hand, even though the color of K which does not absorb infrared light is formed with the specific color material, when infrared light is irradiated, only the specific color material appears black and the designated image 71 formed of the specific color material can be recognized. In the present embodiment, an image forming apparatus 30 for printing without using the color of K will be described. For this reason, black is represented by forming C, M, and Y. However, printing using the five colors of C, M, Y, and K+ without absorbing infrared light is acceptable.

Because the color material can form information that can determine the authenticity of the output, it has the effect of suppressing the reproduction of the output. Therefore, the specific color material can be regarded as a consumer material for security because it improves security.

The colored material may be toner or ink that absorbs ultraviolet (UV) light and absorbs less visible light. Alternatively, the image may be formed of a material which is normally transparent, but which can be visualized by a chemical change of heat, laser, chemical, or the like. Alternatively, irregularities may be formed to form information that is difficult to be confirmed by the naked eye.

Further, the recording medium printed by the image forming apparatus 30 may be one on which toner or ink can be adhered. Means a material that can be adhered to and penetrated by adhesion. Examples include media such as paper, recording paper, recording paper, recording paper, film, cloth, etc., electronic components such as electronic substrates, piezoelectric elements, powder layer, etc., and include all media on which toner or ink is adhered, unless otherwise specified.

Further, the material of "the material to which the toner or ink can be attached" may be any material that can be temporarily attached to the toner or ink, such as paper, yarn, fiber, fabric, leather, metal, plastic, glass, wood, ceramics, etc.

The image forming apparatus 30 includes a printing apparatus using an electrophotographic technique, a printing apparatus using an ink jet technique for ejecting droplets, and a printing apparatus for thermally transferring an ink ribbon. The image forming apparatus 30 may be a multi-function machine. The "multi" of a multifunction device means having multiple functions such as image forming function, facsimile transmission/reception, document scanning, and copying. The MFP is sometimes called Multifunction Peripheral/Printer/Product. However, in the present embodiment, an image forming function may be provided. The image forming apparatus 30 may be called a printer.

<Example Hardware Configuration>

Hereinafter, the hardware configuration of the information processing apparatus 10 and the image forming apparatus 30 that are provided by the printing system 100 will be described.

<<Information Processing Apparatus>>

Figure 5:
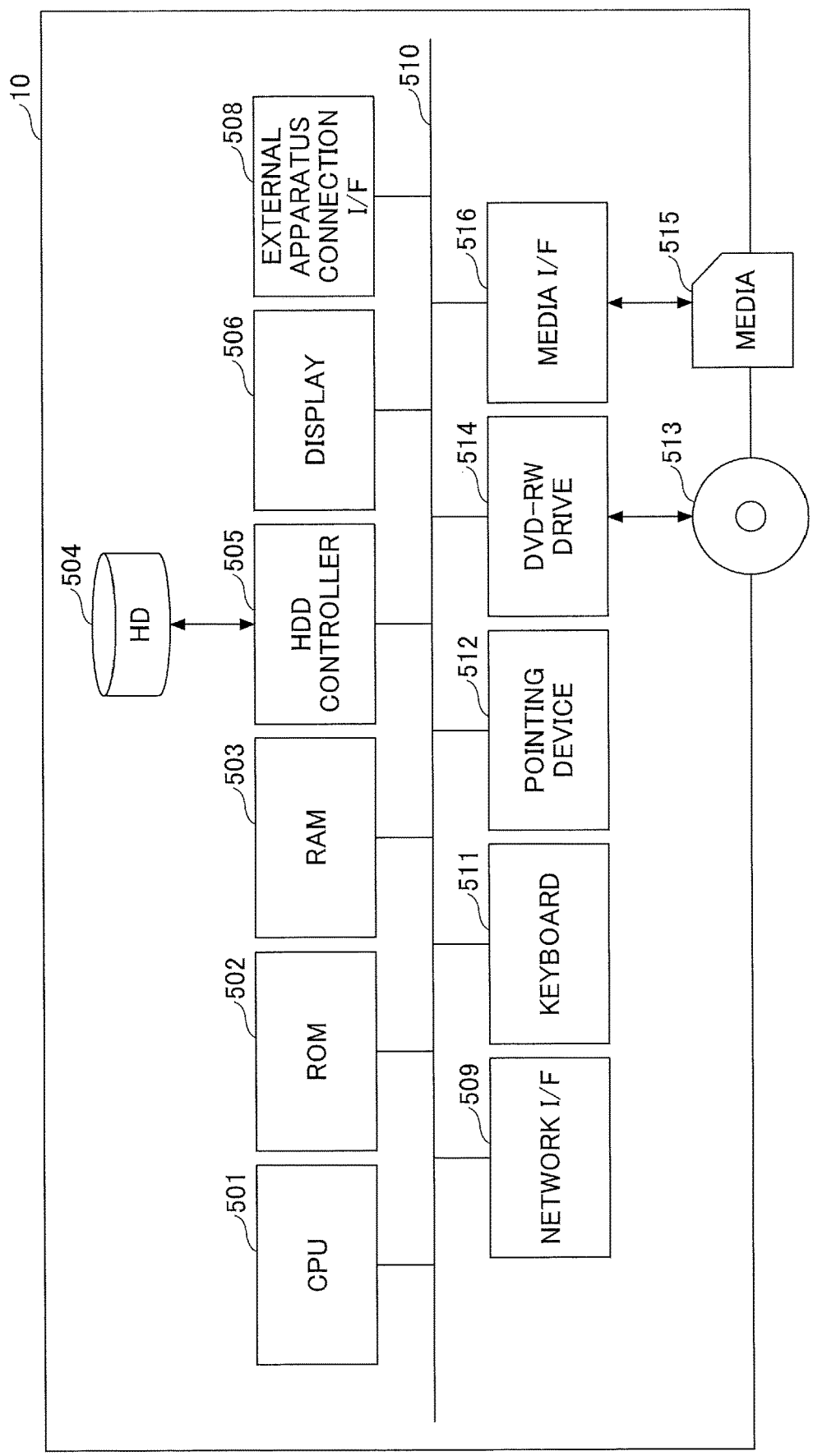
FIG. 5 illustrates an example of a hardware configuration of an information processing apparatus.

FIG. 5 is a hardware configuration diagram illustrating an information processing apparatus 10. As illustrated in FIG. 5, the information processing apparatus 10 is constructed by a computer and includes a CPU 501, a ROM 502, a RAM 503, an HD 504, an HDD (hard disk drive) controller 505, a display 506, an external device connection I/F (interface) 508, a network I/F 509, a data bus 510, a keyboard 511, a pointing device 512, a DVD-RW (Digital Versatile Disk Rewritable) drive 514, and a media I/F 516.

Here, the CPU 501 controls the operation of the entire information processing apparatus 10. ROM 502 stores a program used to drive the CPU 501, such as an IPL. RAM 503 is used as a work area of CPU 501. HD 504 stores various data such as a program. The HDD controller 505 controls the reading or writing of various data to HD 504 according to the control of CPU 501. The display 506 displays various information such as cursors, menus, windows, characters, or images. The external device connection I/F 508 is an interface for connecting various external devices. In this case, the external device may be, for example, a USB (Universal Serial Bus) memory or a printer. The network I/F 509 is an interface for performing data communication using the network N.

The data bus 510 is an address bus, a data bus, or the like for electrically connecting components such as the CPU 501 illustrated in FIG. 5.

The keyboard 511 is also a type of input means with a plurality of keys for input of characters, numbers, various instructions, and the like. The pointing device 512 is a type of input means for selecting and executing various instructions, selecting a processing target, moving a cursor, and the like. The DVD-RW drive 514 controls the reading or writing of various data to the DVD-RW 513 as an example of a removable recording medium. It is not limited to DVD-RW, but may be DVD-R, etc. The media I/F 516 controls the reading or writing (storage) of data to a recording medium 515, such as a flash memory.

<<Image Forming Apparatus>>

Figure 6:
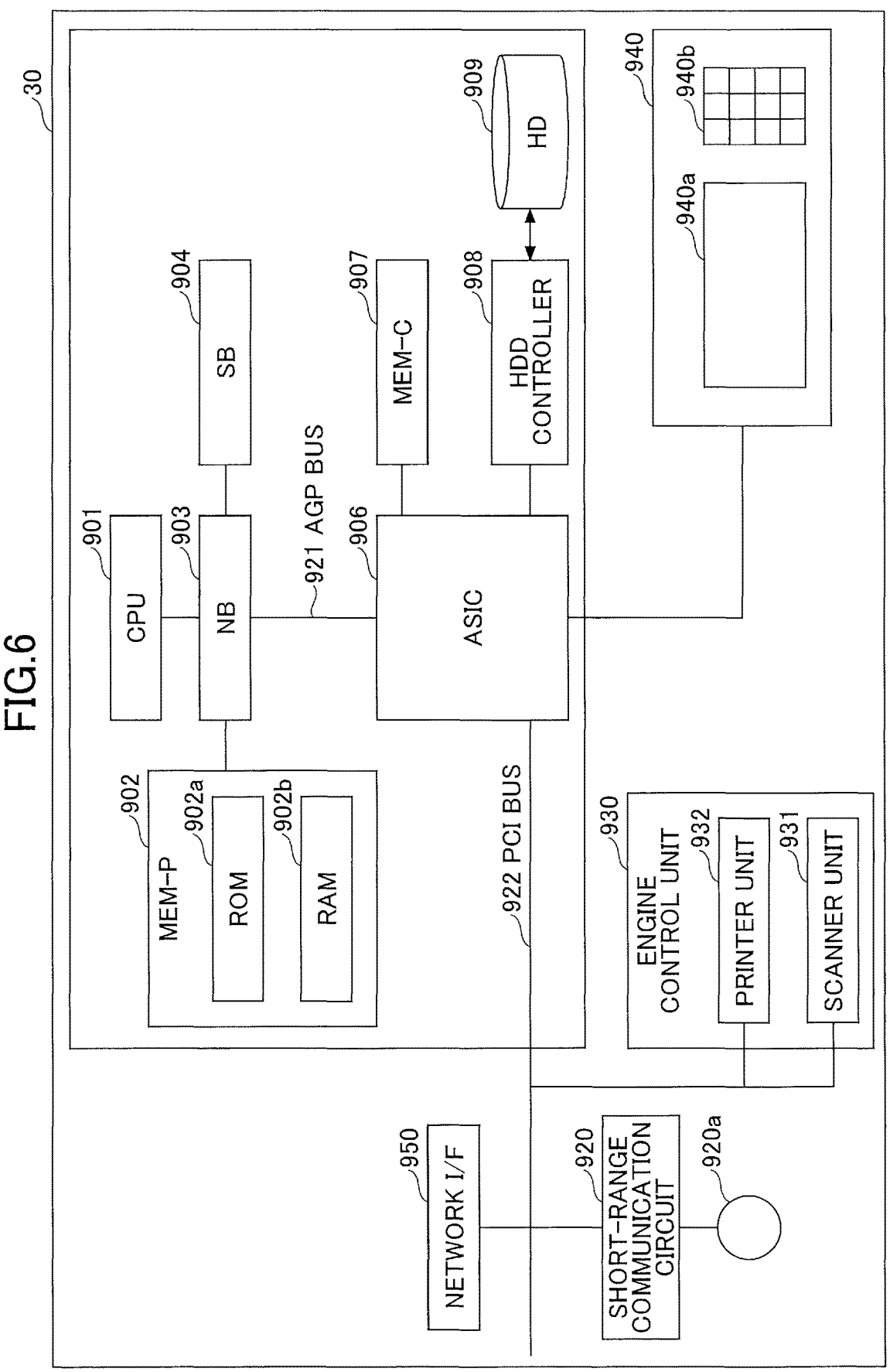
FIG. 6 illustrates an example of a hardware configuration diagram of an image forming apparatus.

FIG. 6 is a hardware configuration diagram of the image forming apparatus 30. As illustrated in FIG. 6, the image forming apparatus 30 includes a controller 910, a short-range communication circuit 920, an engine control unit 930, an operation panel 940, and a network I/F 950.

Among these, the controller 910 includes a CPU 901, a system memory (MEM-P) 902, a northbridge (NB) 903, a south bridge (SB) 904, an ASIC (Application Specific Integrated Circuit) 906, a local memory (MEM-C) 907, an HDD controller 908, and an HD 909 that is a memory unit, and is connected to the NB 903 by an AGP (Accelerated Graphics Port) bus 921 between the NB 903 and the ASIC 906.

Here, the CPU 901 is a control unit that performs an overall control of the image forming apparatus 30. NB 903 is a bridge for connecting CPU 901 to MEM-P 902, SB 904, and AGP bus 921 and has a memory controller for controlling reading and writing to MEM-P 902, a PCI (Peripheral Component Interconnect) master, and an AGP target.

The MEM-P 902 includes ROM 902a, which is a memory for storing programs and data in which each function of the controller 910 is implemented, and RAM 902b, which is used as a program or data expansion and a drawing memory for printing the memory. The program stored in RAM 902b may be configured to be recorded in a computer-readable recording medium such as a CD-ROM, a CD-R, or a DVD in a file in an installable format or an executable format.

SB904 is a bridge for connecting NB903 to PCI devices and peripheral devices. ASIC 906 is an integrated circuit (IC) for image processing use having hardware elements for image processing, and serves as a bridge connecting the AGP bus 921, the PCI bus 922, the HDD controller 908, and the MEM-C907, respectively. The ASIC 906 includes a PCI target and AGP master, an arbitrator (ARB) that forms the core of the ASIC 906, a memory controller that controls the MEM-C907, a plurality of DMACs (Direct Memory Access Controllers) that rotate image data by a hardware logic, and the like, and a PCI unit that performs data transfer between the scanner unit 931 and the printer unit 932 via the PCI bus 922. The interface of the USB (Universal Serial Bus) or the IEEE 1394 (Institute of Electronic and Electronic Engineers 1394) may be connected to the ASIC 906.

MEM-C907 is a local memory used as an image buffer and a code buffer for copying. HD 909 is a storage device for storing image data, storing font data used for printing, and storing form. HD 909 controls the reading or writing of data to HD 909 according to the control of CPU 901. The AGP bus 921 is a proposed bus interface for graphics accelerator cards to speed up graphics processing, and by directly accessing MEM-P 902 with high throughput, the graphics accelerator card can be made to have a high speed.

The short-range communication circuit 920 is provided with a short distance communication antenna 920a. The short-range communication circuit 920 is a communication circuit such as an NFC, Bluetooth ("Bluetooth" is a registered trademark), or the like.

The engine control unit 930 further includes a scanner unit 931 and a printer unit 932. The operation panel 940 includes a panel display portion 940a, such as a touch panel, for displaying a current setting value, a selection screen, or the like, for receiving an entry from an operator, and a hard key 940b, such as a ten key and a start key for receiving a copy start instruction, for receiving a set value of an image forming condition, such as a concentration setting condition. The controller 910 performs an entire control of the image forming apparatus 30 and controls, for example, drawing, communication, entered from an operation panel 940, and the like. The scanner unit 931 or the printer unit 932 includes an image processing portion such as error diffusion or gamma conversion.

The application switching key of the operation panel 940 allows the image forming apparatus 30 to select the document box function, the copy function, the printer function, and the facsimile function in this order. When the document box function is selected, the document box mode is set to a copy mode, when the copy function is selected, the printer mode is set to printer mode, and when the facsimile mode is selected, the document box mode is set to a facsimile mode.

The network I/F 950 is an interface for performing data communications using the network N. The short-range communication circuit 920 and the network I/F 950 are electrically connected to the ASIC 906 via a PCI bus 922.

<Functions of an Information Processing Apparatus and an Image Forming Apparatus>

Next, the functions of the information processing apparatus 10 and the image forming apparatus 30 will be described with reference to FIGS. 7 and 8.

<<Information Processing Equipment>>

Figure 7:
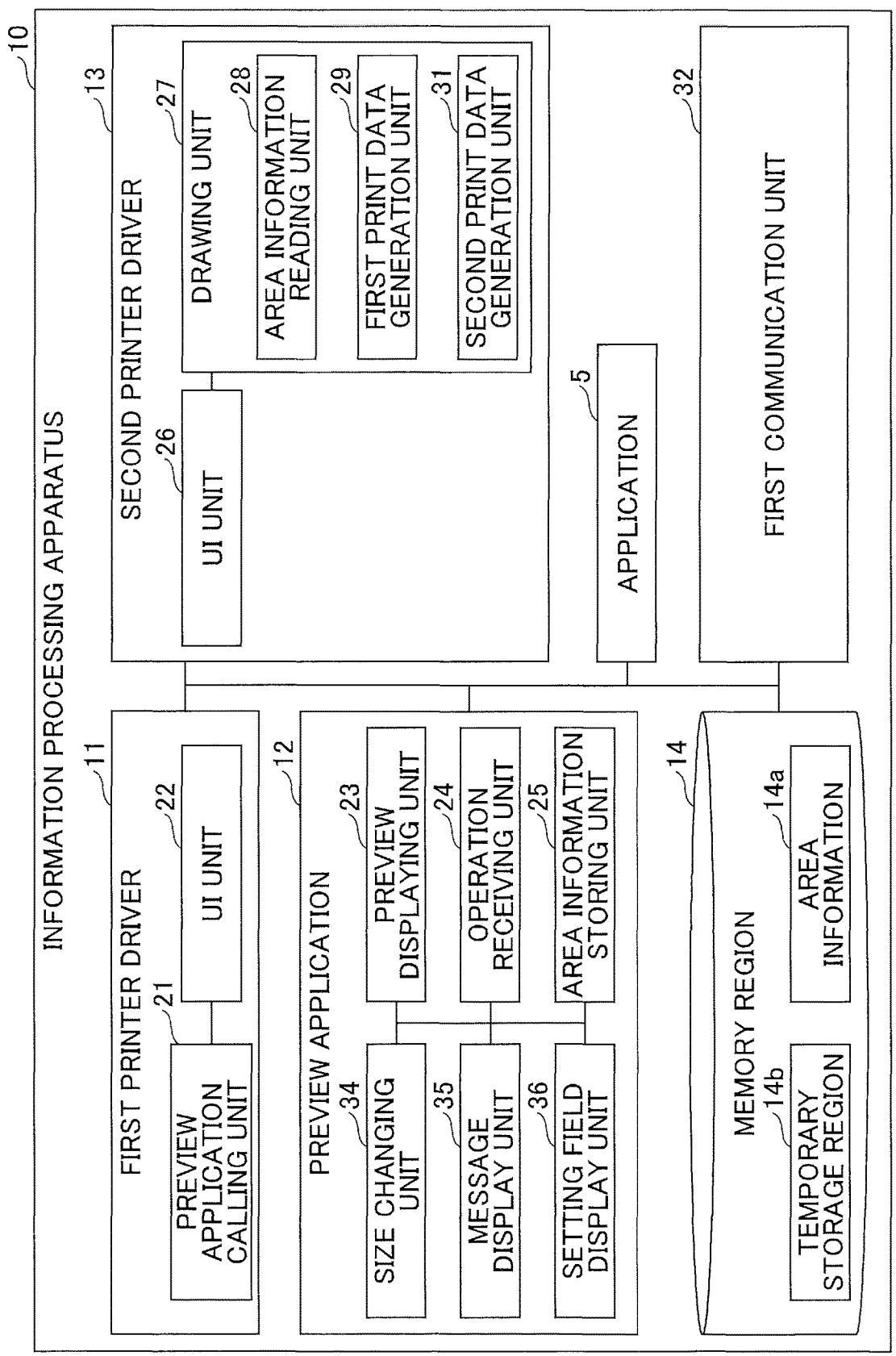
FIG. 7 illustrates an example of a functional block diagram of functions of an information processing apparatus in a block pattern.

FIG. 7 is an example of a functional block diagram showing functions of an information processing apparatus 10 in a block shape. In the information processing apparatus 10, three programs of the first printer driver 11, the preview application 12, and the second printer driver 13 are operated. The first printer driver 11 or the second printer driver 13 is called by one or more applications 5.

This application only needs to be able to call the printer driver. Examples include word processing software, presentation software, spreadsheet software, PDF software, and browser software. Each of these applications saves and reads files in the corresponding format. A document file in which the designated image 71 is printed with the specific color is also created in a format corresponding to the application used by the user.

In FIG. 7, the program of the information processing apparatus 10 is divided into three, but the first printer driver 11 may have the function of the preview application 12. The first printer driver 11 and the second printer driver 13 may have an integrated configuration to one printer driver. In this case, the user can specify which mode of operation the first printer driver 11 or the second printer driver 13 will operate in the print setting. Accordingly, the first printer driver 11, the preview application 12, and the second printer driver 13 may be one program.

When the document is printed, the user calls the first printer driver 11 and the first printer driver 11 automatically starts the preview application 12, in which the user can designate the size of the specific color area 72 (i.e., the designated image 71), the moving destination area 74, and the designated image 71. Accordingly, the conventional work of printing the documents on the application may be supplemented by designating the size of the specific color area 72, the moving destination area 74, and the designated image 71, and operability is not reduced.

<<First Printer Driver>>

The first printer driver 11 includes a preview application calling unit 21 and a UI unit 22. Each of these functions provided by the first printer driver 11 is a function or means by which any of the components illustrated in FIG. 5 is implemented by instructions from the CPU 501 in accordance with the first printer driver 11 deployed from the HD 504 to the RAM 503.

because the first printer driver 11 is recognized as a printer driver by the OS, when a user calls the first printer driver 11, the first printer driver 11 is started on the application, but the first printer driver 11 does not have a printer driver function.

That is, the printer driver typically includes a UI portion and a drawing portion, but the first printer driver 11 does not need to have functions of the UI portion and the drawing portion. The UI unit 22 illustrated in the drawing is described because a printer driver without the UI unit 22 cannot be created. However, the UI unit 22 may have a function that operates actually. For example, the XPS (XML Paper Specification) driver attached to the OS is used as the drawing part. The preview is displayed using electronic documents created by the XPS driver. XPS is an XML-based electronic document. XPS is a document format that can be displayed by the information processing equipment, regardless of the file created by any application. In addition to XPS, PDF or the like may be used.

The preview application calling unit 21 starts the preview application 12. That is, when the user calls the first printer driver 11 and the first printer driver 11 completes its start, the preview application calling unit 21 automatically starts the preview application 12 without performing the next operation by the user. The previewer application calling unit 21 sets the identification information on the OS of the preview application 12 (which may be the path of the executable file, the program ID, etc.), and the previewer application calling unit 21 designates the identification information and requests the OS to start.

<<Preview Application>>

The preview application 12 includes a preview displaying unit 23, an operation receiving unit 24, an area information storing unit 25, a size changing unit 34, a message display unit 35, and a setting field display unit 36. Each of these functions provided by the preview application 12 is a function or means implemented in which one of the components illustrated in FIG. 5 is operated by instructions from the CPU 501 in accordance with the preview application 12 deployed from the HD 504 to the RAM 503.

The preview displaying unit 23 reads out the electronic document generated by the XPS driver and displays the print image (preview screen) of the document to be printed that is displayed on the display 506 by the application that called the first printer driver 11.

The operation receiving unit 24 receives the user's operation on the preview screen or the setting field to be described later. An operation by a user is performed by a pointing device such as a mouse or touch panel to specify a range or coordinate input, and to designate the specific color area 72 and a moving destination area 74, and to input the size of the moving destination area 74. A rotation angle of the moving destination area 74 may be received.

The size changing unit 34 changes the size of the designated image 71 to the size of the moving destination area 74 received by the operation receiving unit 24. The differently, magnifying or minifying. For example, when the size of the input destination area 74 is 100×100, the size changing unit 34 changes to 100×100 irrespective of the size of the specific color area 72 (exceptions exist when the size protrudes the range of the moving destination area document, the reading device cannot read the image code, etc.).

The message display unit 35 displays a message indicating that the moving destination area 74 protrudes over the document (the print region including the white space may be the print region, but the print region is the range of the document hereinafter) due to the magnification. In this case, the size changing unit 34 adjusts the moving destination area 74 to a size that fits into the document.

The size change performed by the size changing unit 34 is also reflected in the moving destination area 74 where the preview displaying unit 23 is moved, but the actual size change or movement is performed by the image forming apparatus 30.

The area information storing unit 25 stores the coordinates of the specific color area 72 designated by the user, the coordinates of the moving destination area 74, the size of the specific color area 72, and the size of the moving destination area 74 in the memory region 14. The information stored by the area information storing unit 25 is hereinafter referred to as "area information". The area information storing unit 25 also stores temporary information.

The memory region 14 is a region such as the HD 504 or the registry of the information processing apparatus 10. In addition to the information processing apparatus 10, any location where data can be stored, such as a network folder or an area on a cloud, may be used. The area information storing unit 25 stores the area information in a predetermined URL (that is, the storage destination is predetermined) of the memory region 14. Alternatively, the area information is stored in a predetermined folder name (or directory name) of the memory region 14 using a predetermined file name. Accordingly, the second printer driver 13 can read out the area information.

The above-described area information 14a for reading by the second printer driver 13 is stored in the memory region 14. The memory region 14 includes a temporary storage region 14b for temporarily storing the coordinates and size of the specific color area 72 designated by the user and the coordinates and size of the moving destination areas set by the user.

<<Second Printer Driver>>

The second printer driver 13 includes a UI unit 26 and a drawing unit 27.

Each of these functions provided by the second printer driver 13 is a function or means implemented in which each of the components illustrated in FIG. 5 is operated by instructions from the CPU 501 in accordance with the second printer driver 13 deployed from the HD 504 to the RAM 503.

The UI unit 26 displays an item for receiving a selection of whether to enable "specific color area reading print" in the print setting screen to be described later. In addition, ordinary print settings items such as the number of copies to be printed, both sides, aggregation, etc. are displayed and the settings are accepted.

The drawing unit 27 further includes an area information reading unit 28, a first print data generation unit 29, and a second print data generating unit 31.

The area information reading unit 28 reads the area information stored in the area information storing unit 25 of the previewing application 12 from the memory region 14. However, when the UI unit 26 receives a setting to disable "specific color area reading print", the area information reading unit 28 does not read the area information because the area information is not necessary.

The first print data generation unit 29 converts the read area information into print data (an example of the first print data) described with a PDL interpreted by the image forming apparatus 30. The print data is a list of commands executed by the image forming apparatus 30. When the UI unit 26 receives a setting to disable "specific color area reading print", the area information is not converted to print data. Area information converted to print data may be referred to as "area information command" for convenience.

The second print data generation unit 31 reflects the printing setting in the document displayed by the information processing apparatus 10 and generates the printing data (an example of the second printing data) described in PDL that is interpreted by the image forming apparatus 30. Generates print data regardless of [Valid] or [Invalid] of [Characteristic area read printing].

The information processing apparatus 10 includes a first communication unit 32. The first communication unit 32 transmits print data connected to the network N and receives the state of the image forming apparatus 30 from the network N.

<Image Forming Apparatus>>

Figure 8:
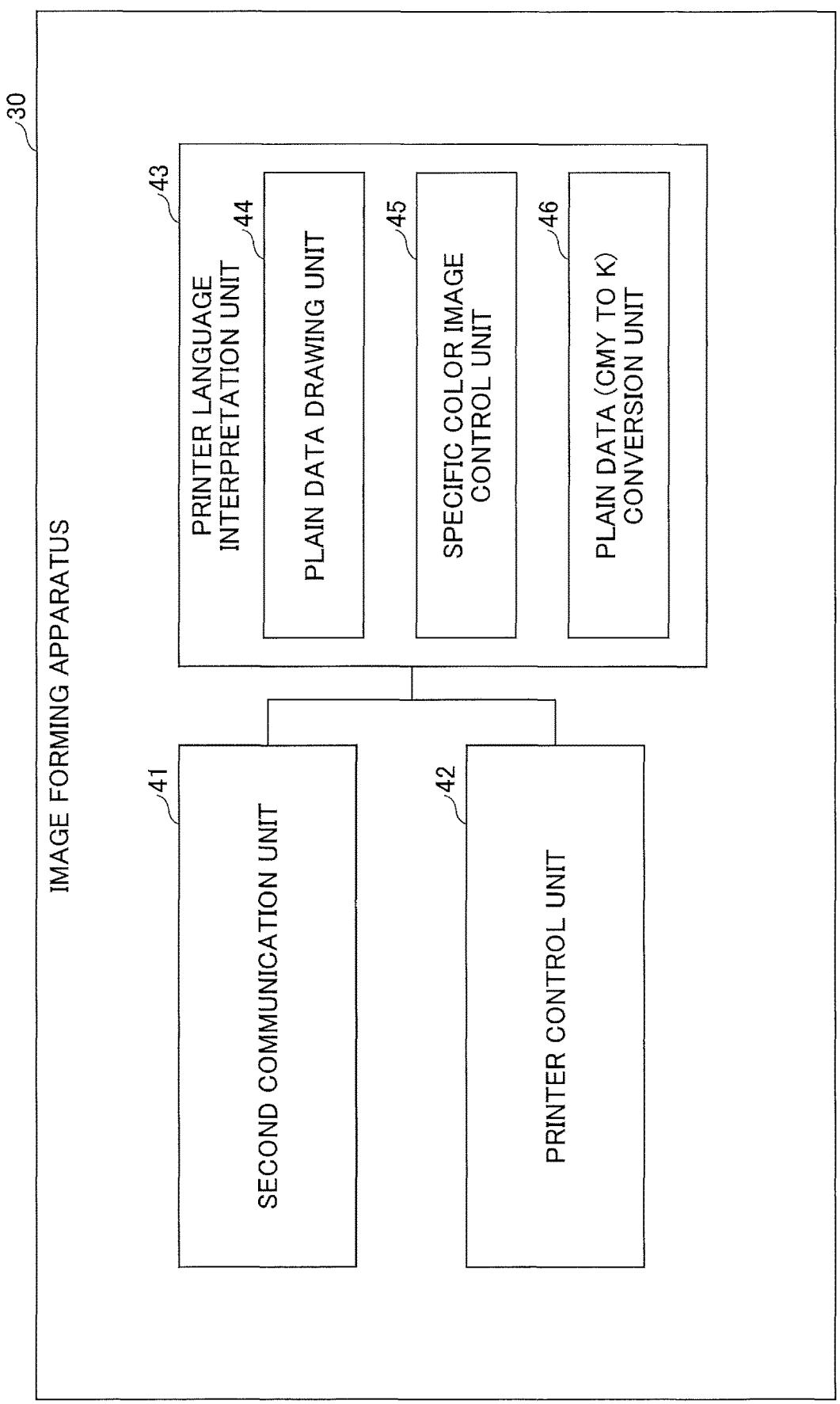
FIG. 8 illustrates an example of a functional block diagram of functions of an image forming apparatus in a block shape.

FIG. 8 is an example of a functional block diagram showing functions of the image forming apparatus 30 in a block shape. The image forming apparatus 30 includes a second communication unit 41, a printer control unit 42, and a printer language interpretation unit 43. Each of these functions provided by the image forming apparatus 30 is a function or a means in which one of the components illustrated in FIG. 6 is implemented by operating by a command from the CPU 901 according to a program expanded on the RAM 902b from the HD 909.

The second communication unit 41 receives the print data connected to the network N and performs network control for transmitting the state of the image forming apparatus 30 or the like to the network N.

The printer control unit 42 controls printing of the print data received by the second communication unit 41 or read through the storage medium. That is, plain images of the colors C, M, Y, and K are formed on the intermediate transfer body or the paper and discharged to the discharge tray via the fixing unit. A plain image is image data in which the presence or absence of pixels is represented by bit (1 or 0) for each single color of C, M, Y, and K.

The printer language interpretation unit 43 interprets the print data acquired from the printer control unit 42 and converts it into data (the plain image) that can be printed by the printer unit 932. The printer language interpretation unit 43 includes a plain data drawing unit 44, a specific color image control unit 45, and a plain data conversion unit 46.

The plain data drawing unit 44 interprets the print data and generates image data (bitmap data or raster data) on a page-by-page basis. Further, the color matching process and the screening process are performed to generate a plain image 81 that can be printed by the printer unit 932 for each of the C, M, Y, and K colors used for printing by the image forming apparatus 30. The color matching process is a process in which the input color (or monochrome) print data is converted with an optimum conversion ratio for printing with the four colors of C, M, Y, and K of the image forming apparatus 30. However, in this embodiment, K is assigned to the specific color and is converted to C, M, and Y (an example of a predetermined color). The print data input from the information processing apparatus 10 may be represented in the RGB color space or in the C, M, Y, and K color spaces. However, when a general application is used, the RGB color space is employed. The plain data drawing unit 44 converts the print data of the RGB color space into a device independent color space through color matching processing and then converts the printed data into a device color space corresponding to the specific color of the image forming apparatus 30, thereby converting the printed data into a CMYK color space (not using K).

The conversion equation from RGB to C, M, and Y is as follows. In this conversion, because the maximum value is 1, C, M, and Y are multiplied by the gradation (for example, 255).

$$C=1-(R/255)$$

$$M=1-(G/255)$$

$$Y=1-(B/255)$$

The conversion is ordinary, and it is preferable that the conversion be converted by a conversion formula optimum for the image forming apparatus 30.

The screening process is a pseudo-gamut method, such as a dither method, in which the size and density of the mesh point are changed to represent the difference in shading by using the illusion of the eye, and is a process in which the bit map data or the raster data are converted to the printable plain image 81 by the printer unit 932. In the plain image 81, 1 (ON: draw) or 0 (OFF: do not draw) is set for each dot corresponding to the pixel drawn as a point by laser or ink.

The specific color image control unit 45 performs processing regarding the specific color area 72 and the moving destination area 74 based on the area information stored in the memory region 14. First, the image data of the specific color area 72 of each of the plain images 81 of C, M, and Y is extracted, and the specific color area 72 is subjected to the zero-clearing. The zero-clearing means that the image data of the specific color area 72 is made zero. That is, nothing is printed on the specific color area 72. Any image (a corporate logo, icon of a mascot, company name, etc.) may be drawn after zero-clearing, or the zero-clearing may not be required.

The plain data conversion unit 46 converts the image data of the specific color area 72 extracted from the plane images 81 of C, M, and Y into the image data of K. Because the plain images 81 of C, M, and Y have 1 or 0, if C, M, or Y is equal to 1, K is converted like K=1. Even if one or more of C, M, or Y have 1, K may remain to be 1.

$$C=1 \rightarrow K=1$$

$$M=1 \rightarrow K=1$$

$$Y=1 \rightarrow K=1$$

The specific color image control unit 45 disposes image data of the specific color area 72 converted into C, M, and Y and converted into K in the moving destination area 74 of the plain image 81 of K. Therefore, the plain image 81 of K becomes the plain image 81 in which the designated image 71 is disposed only in the moving destination area 74. The specific color image control unit 45 changes the size of the designated image 71 of K based on the size of the moving destination area 74 included in the area information.

<Operation Procedure>

Figure 9:
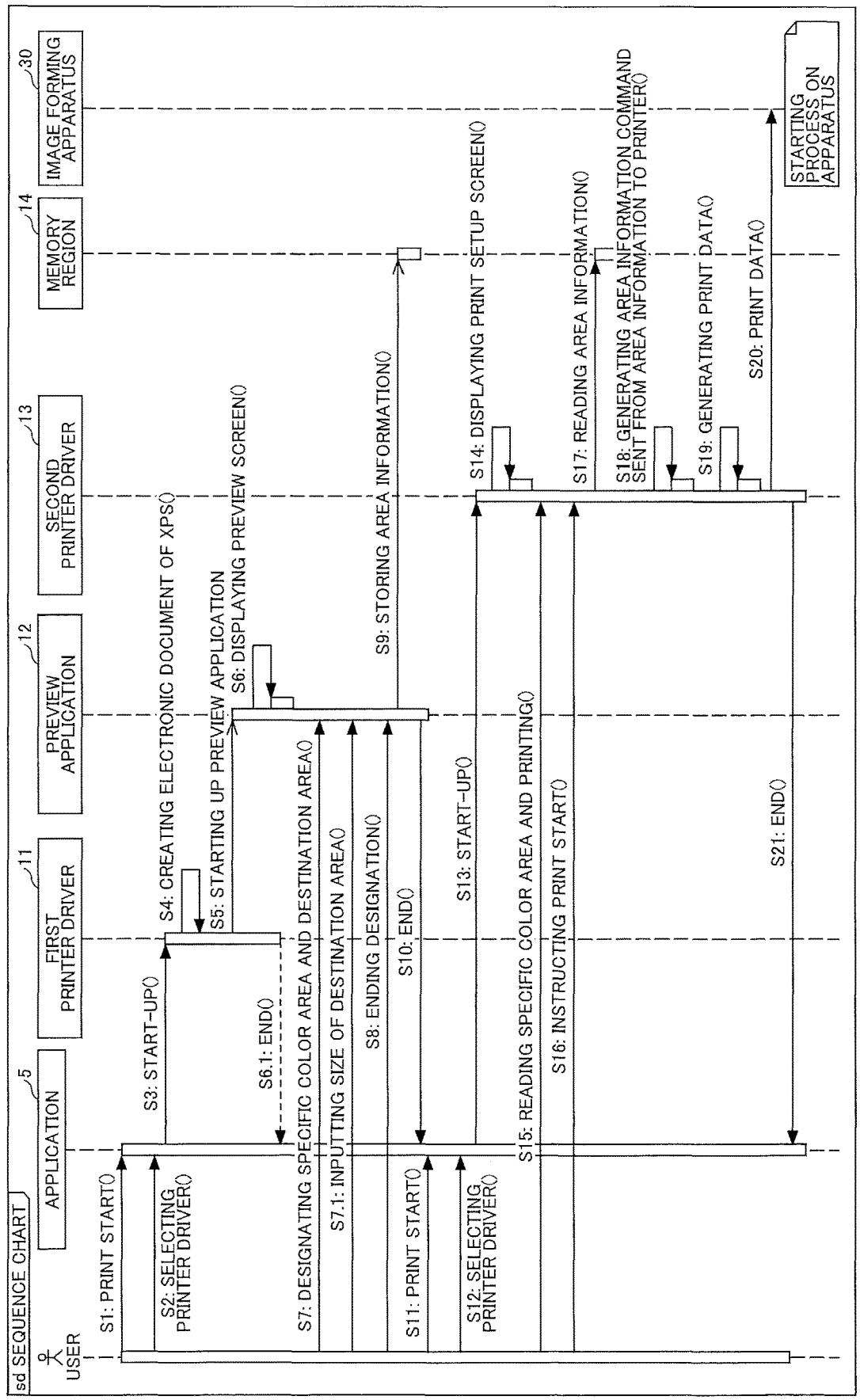
FIG. 9 illustrates an example of a flowchart of a procedure in which an information processing apparatus generates print data.

Next, a processing procedure in the information processing apparatus 10 will be described with reference to FIG. 9. FIG. 9 is an example of a flowchart illustrating a procedure in which the information processing apparatus 10 generates print data. FIGS. 10 to 23 are appropriately referred to.

Figure 10:
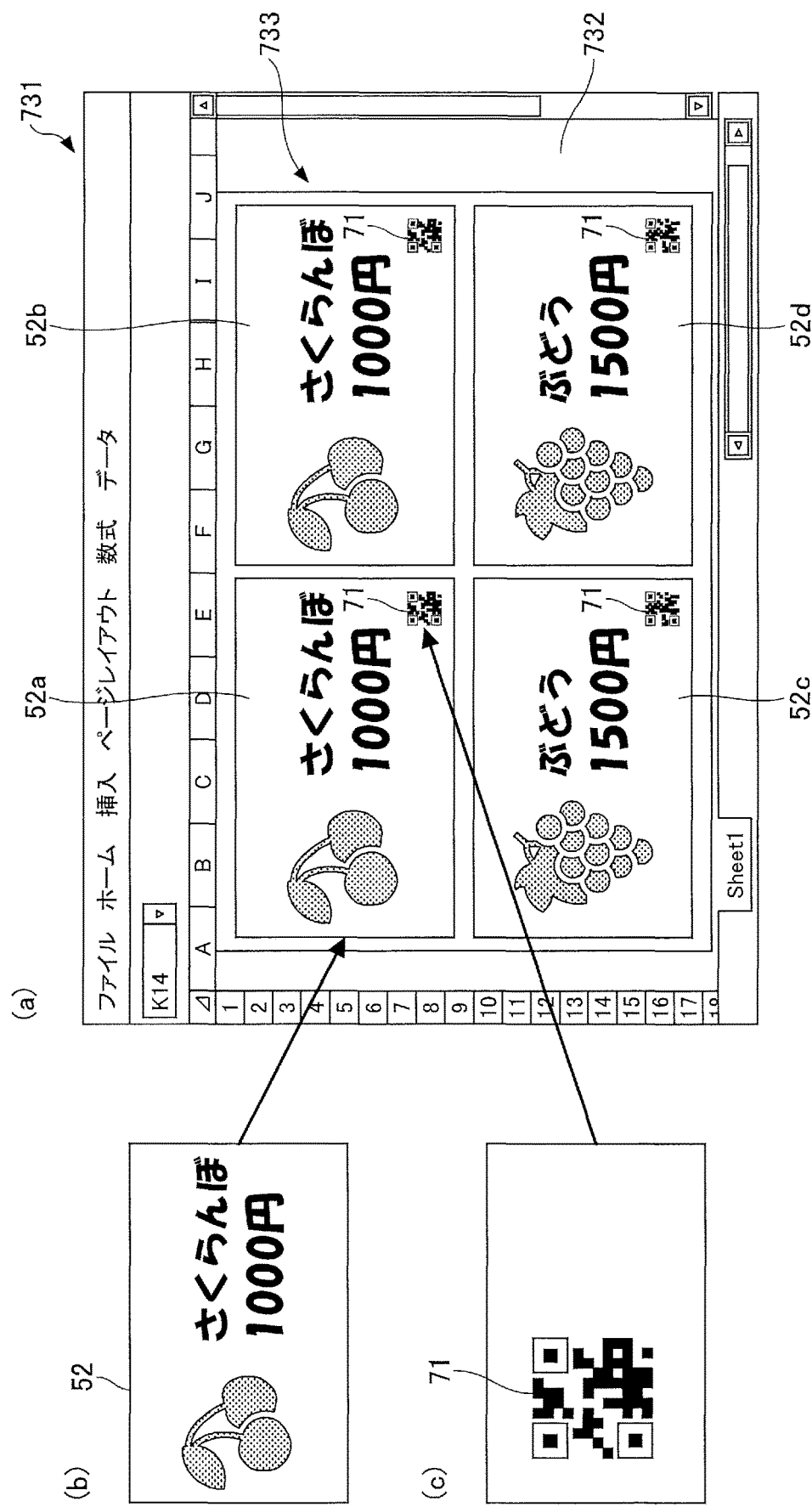
FIG. 10 is a diagram illustrating an example of a document screen on which a document created by an application is displayed.

S1: First, the user creates a document in an application or opens a previously created file to display the document. Then, a designated image such as a QR code ("QR code" is a registered trademark) is created in the document. The application accepts a user's operation and displays the designated image superimposed on the document. FIG. 10 illustrates an example of a document and a designated image displayed on the information processing apparatus 10. In FIG. 10, a spreadsheet application is used to create the document. The application may be for word processing and are not particularly restricted, such as paint, draw, or presentation software.

S1: The user starts printing the document from the state of the screen in FIG. 10. Specifically, an operation to call the print screen 701 is performed.

Figure 11:
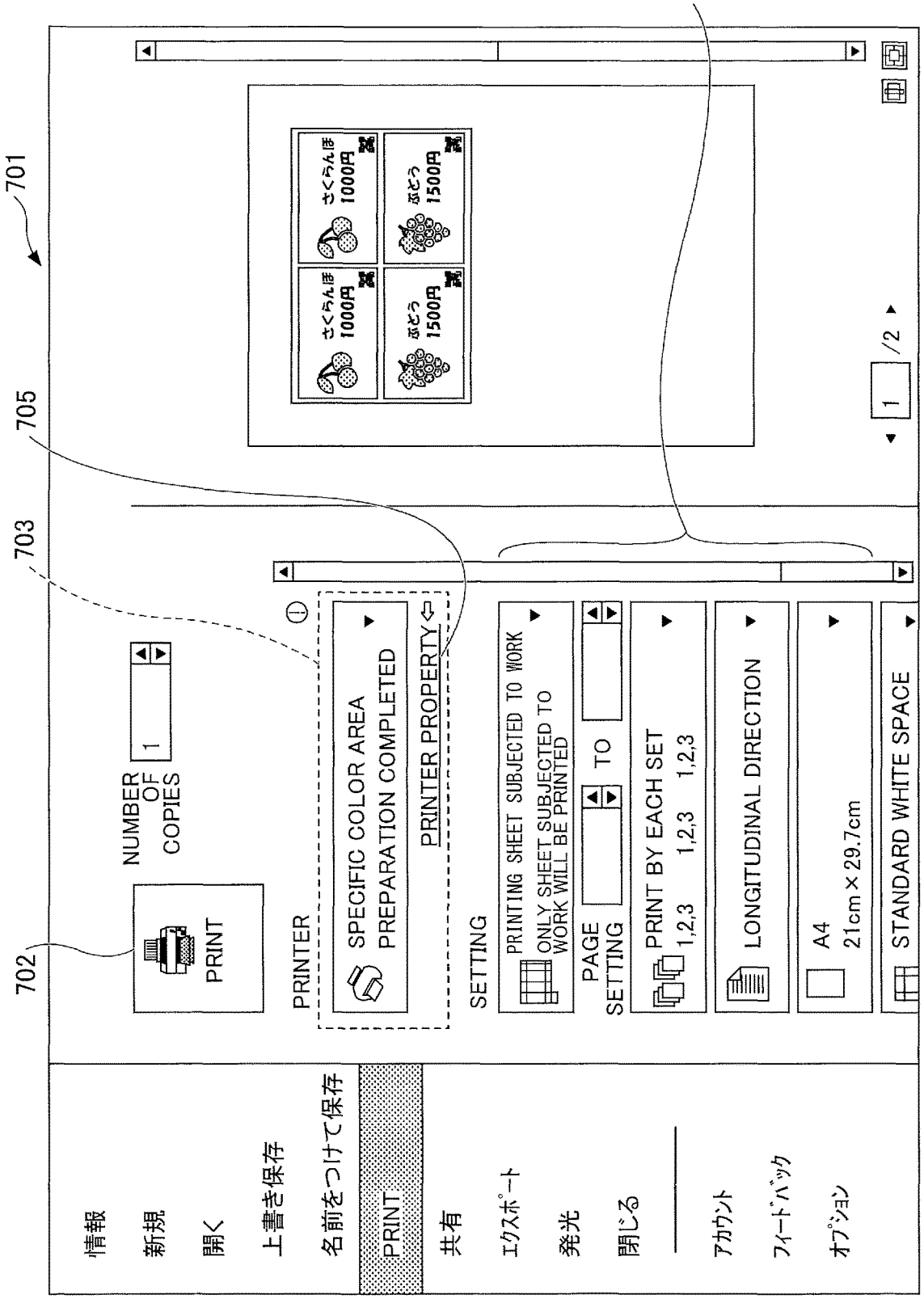
FIG. 11 is a diagram illustrating an example of a printing screen for a user to print a document displayed by an application.

S2: The application accepts this operation and displays the print screen 701 on the display 506. FIG. 11 illustrates an example of the print screen 701. The user selects the first printer driver 11 on the print screen 701 and depresses the print button 702.

S3: The application accepts the depression of the print button 702 and starts the first printer driver 11 (which may be displayed using the functions of the OS). As described above, the first printer driver 11 is a printer driver that does not transmit print data to the image forming apparatus 30 (there is no corresponding image forming apparatus 30).

S4: When the first printer driver 11 starts, the XPS driver generates an XPS electronic document for preview display. More simply, data for preview screens may be generated, such as by capturing application screens.

S5: Next, the preview application calling unit 21 starts the preview application 12. The user does not need to perform the call operation of the preview application 12, nor it is needed to be aware that another application will start. However, the preview application 12 may be started by an explicit user action.

Figure 12:
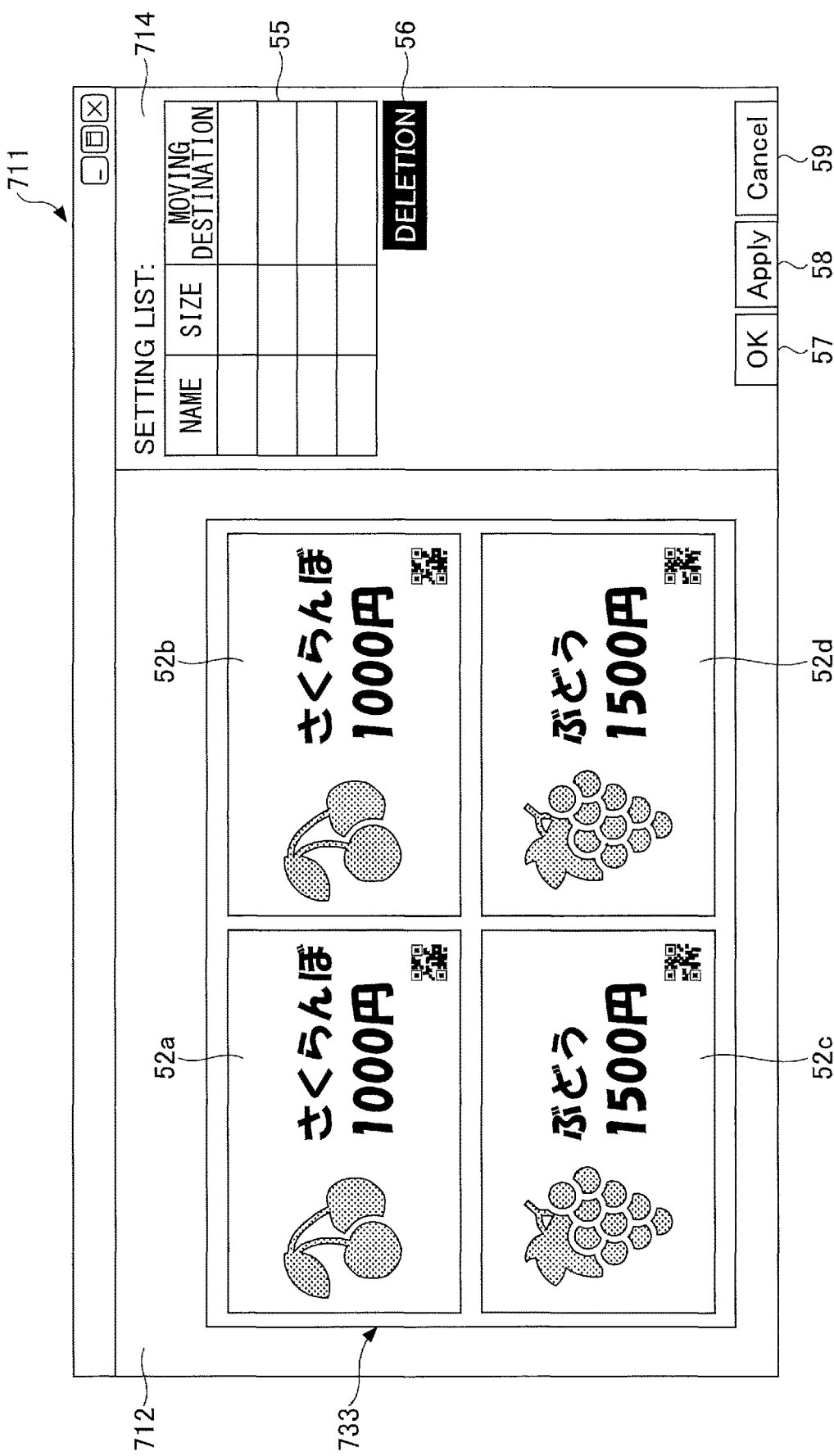
FIG. 12 is a diagram illustrating an example of a preview screen displayed by a preview application on a display.

S6: When the preview application 12 starts, the preview displaying unit 23 interprets the XPS electronic document and displays the preview screen on the display 506. An example of the preview screen 711 is illustrated in FIG. 12 and the like.

S6.1: The first printer driver 11 ends when the preview application 12 starts.

S7: A user operates the pointing device or keyboard to designate a specific color area 72 and a moving destination area 74 on the preview screen 711. The operation receiving unit 24 receives the designation of the specific color area 72 and the moving destination area 74. If it is not necessary to move the designated image 71 to be printed with the specific color, the moving destination area 74 may not be set.

S7.1: The user enters the size (size of the moving destination area) of the designated image 71 by operating the pointing device or the keyboard. The operation receiving unit 24 receives the entry of the size of the designated image. Entering the designated image size is not mandatory. The details will be described in FIG. 12, etc.

S8: When the designation of the specific color area 72 and the moving destination area 74 and the input of the size of the designated image 71 are completed, the user terminates the display of the preview screen 711. For example, in the preview screen, the OK button 57 is depressed. The operation receiving unit 24 receives the depression of the OK button 57.

When the OK button 57 is depressed in step S9, the area information storing unit 25 stores the area information in the memory region 14.

When the OK button 57 is depressed in step S10, the preview application 12 ends because the preview application 12 requests the OS to exit the software. Accordingly, the state becomes as illustrated in FIG. 10 again.

S11: Next, the user starts printing the document in the state of the screen illustrated FIG. 10. Similar to Step S1, an operation to call the print screen 701 is performed.

S12: The application receives this operation and displays the print screen 701 on the display 506 (see FIG. 22). The user selects the second printer driver 13 on the print screen 701 and depresses a button (for example, a property button 705) to display the print setting screen 721.

S13: The application receives the depression of the button for displaying the print setting screen 721 and starts the second printer driver 11. The second printer driver 13 is a printer driver corresponding to the image forming apparatus 30 that can print the specific color as, for example, a color of K.

S14: When the UI unit 26 of the second printer driver 13 starts, the print setting screen 721 is displayed on the display 506 (see FIG. 23).

S15: The user effectively sets the "specific color area reading print" 724 on the print setting screen. The "specific color area reading print" is setting to print the designated image 71 designated in the specific color area 72 having the specific color. The UI unit 26 receives this setting. because the setting contents are saved, it is not necessary to set "specific color area reading print" 724 every time. When the "specific color area reading print" 724 is not effective, the image forming apparatus 30 performs normal printing (converting RGB to C, M, Y, and K). The user can also perform other settings, such as aggregating and both-side printing, as well as normal printing without using the specific color.

S16: The user closes the printing setting screen 721 and depresses the print button 702 to start printing. The UI unit 26 receives the depression of the print button 702.

S17: First, because the "specific color area reading print" is effective, the area information 14a is read from the memory region 14 in which the area information reading unit 28 of the drawing unit 27 is predetermined.

S18: Meanwhile, "specific color area reading print" is effective, the first print data generating unit 29 converts the area information to print data (area information command) described in PDL that can be interpreted by the image forming apparatus 30. The first print data generation unit 29 preferably include an issue that "specific color area reading print is effective" in the command. Accordingly, the image forming apparatus 30 can detect an event that the designated image 71 designated by the specific color area 72 is printed with the specific color. Alternatively, the area information command may also be used to indicate that "specific color area reading print" is effective.

S19: The second print data generating unit 31 reflects the print setting to the document data illustrated in FIG. 10 by the application and generates the print data described in PDL.

S20: The first communication unit 32 transmits the area information command and the print data to the image forming apparatus 30.

S21: The second printer driver 13 ends after the second printer driver 13 performs a series of processes by depressing the print button 702. Accordingly, the state of FIG. 10 is recovered. Thereafter, the image forming apparatus 30 prints the print data.

<Screen Displayed by Information Processing Device>

Hereinafter, the screen referred in the sequence diagram of FIG. 9 will be described. FIG. 10 is an example of a document screen 731 on which a document created by the application is displayed. In (a) of FIG. 10, a document 733 edited by the user is displayed in the work area 732 of the application. The content of this document illustrates only one example.

In this embodiment, it is assumed that this application is an application that cannot designate the specific color (an application that can handle only RGB). However, the applications can be applied where the specific color is designated.

In FIG. 10, (b) is an example of a pre-prepared original image 52, and, in FIG. 10, (c) is an example of a designated image 71. The user creates the document 733, such as (a) of FIG. 10, by opening, copying, and pasting the file of the original image 52 and the designated image 71 in the application. Because the user describes the designated image 71 in a plain portion of the original image 52, it is understood that the designated image 71 is reduced in size. In (a) of FIG. 10, four original images 52a-52d are imposed for the purpose of explaining the embodiment. In the present embodiment, only one original image 52 is required.

As illustrated in (a) of FIG. 10A, the user describes a designated image 71 (e.g., copy and paste) to be printed with the specific color on a portion of the original image 52. The original image 52 and the designated image 71 are not one image but overlap the designated image 71 with the original image 52. The designated image 71 holds the number of pixels before being pasted.

In FIG. 10, the image code is described in the lower right of the original image 52 as the designated image 71. The location of the designated image 71 may be any place, preferably a plain-finish location. If this is not done, the background is extracted at the time of extraction from the plain images 81 of C, M, and Y, and the background is printed with the specific color. However, when the background color is light, only the designated image 71 to be printed with the specific color can be extracted by binarizing after extraction.

The designated image 71 to be printed with the specific color may be representable in two dimensions. Further, the information to be included in the image code includes the user name of the creator, the serial number, the creation date and time, and the identification information of the information processing apparatus 10. Any other information may be included in the image code.

The color of the designated image 71 to be printed with the specific color displayed in the application becomes the color of the specific color material at the time of printing. Therefore, any color may be used in the application. Further, even if one designated image 71 is described by a plurality of colors, at the time of printing, it becomes the color of the specific color material. In other words, the designated image 71 designated by the specific color area 72 becomes the designated image 71 to be printed with the specific color. Further, the number of the designated images 71 to be printed with the specific color may be plural.

When planed, document 733 of (a) of FIG. 10 is scheduled to be cut after printing, so that two identical original images 52a-52d are arranged in a total of four. The number of original images 52 may be any number and may be one if not cut. The document 733 is scheduled to be cut, so for each original image 52, the user describes a designated image 71, respectively. If the original image 52 is the same, the information retained by the designated image 71 may also be the same. Therefore, the moving destination area 74 may be limited to within the original image 52 in which the designated image 71 was disposed. Further, when the moving destination area 74 protrudes the original image 52, a portion of the designated image is missing due to cutting, and the reading device may not be able to read. Therefore, it is preferable that the whole of the designated image 71 be contained in the original image 52 (a process of limiting the moving destination area to the original image 52 will be described in Fifth Embodiment).

FIG. 11 is an example of a print screen 701 for a user to print a document displayed by an application. The printing screen 701 includes a print button 702, a printer selection button 703, other setting buttons 704, and a property button 705. First, the printer selection button 703 is a button for the user to select the image forming apparatus 30 used for printing documents (the image forming apparatus 30 selected here may not actually not have to exist). The user selects the image forming apparatus 30 on which the first printer driver 11 capable of specifying the specific color area 72 is called. The image forming apparatus 30 is known to the user.

The print button 702 is a button for calling the printer driver. When the user depresses the print button 702 after selecting the appropriate image forming apparatus 30, the first printer driver 11 is called and executed.

The other setting buttons 704 are buttons for the user to designate pages, perform page-order printing, set the printing direction, and set the paper size, and the like. However, because the first printer driver 11 does not perform actual printing, it is not necessary to set them.

The property button 705 is a button for displaying the print setting screen of the image forming apparatus 30. The user can set detailed printing settings that cannot be set in the printing screen 701.

FIG. 12 is an example of a preview screen 711 in which a preview application 12 is displayed on the display 506. The preview screen 711 includes a preview area 712 and a setting field 714. The preview area 712 is an area that displays a preview of the document on the screen. This preview differs from the ordinary preview of displaying layout on a sheet, because only images of the document are required to be displayed. The setting field 714 includes a setting list 55, a deletion button 56, an OK button 57, an application button 58, and a cancel button 59. The setting list 55 includes the name, size, and destination items. One line of the setting list 55 is called a single record. In FIG. 12, the number of records is 4, but the number of records may be one or more. The number of records may increase as the user fills in the record.

Figure 13:
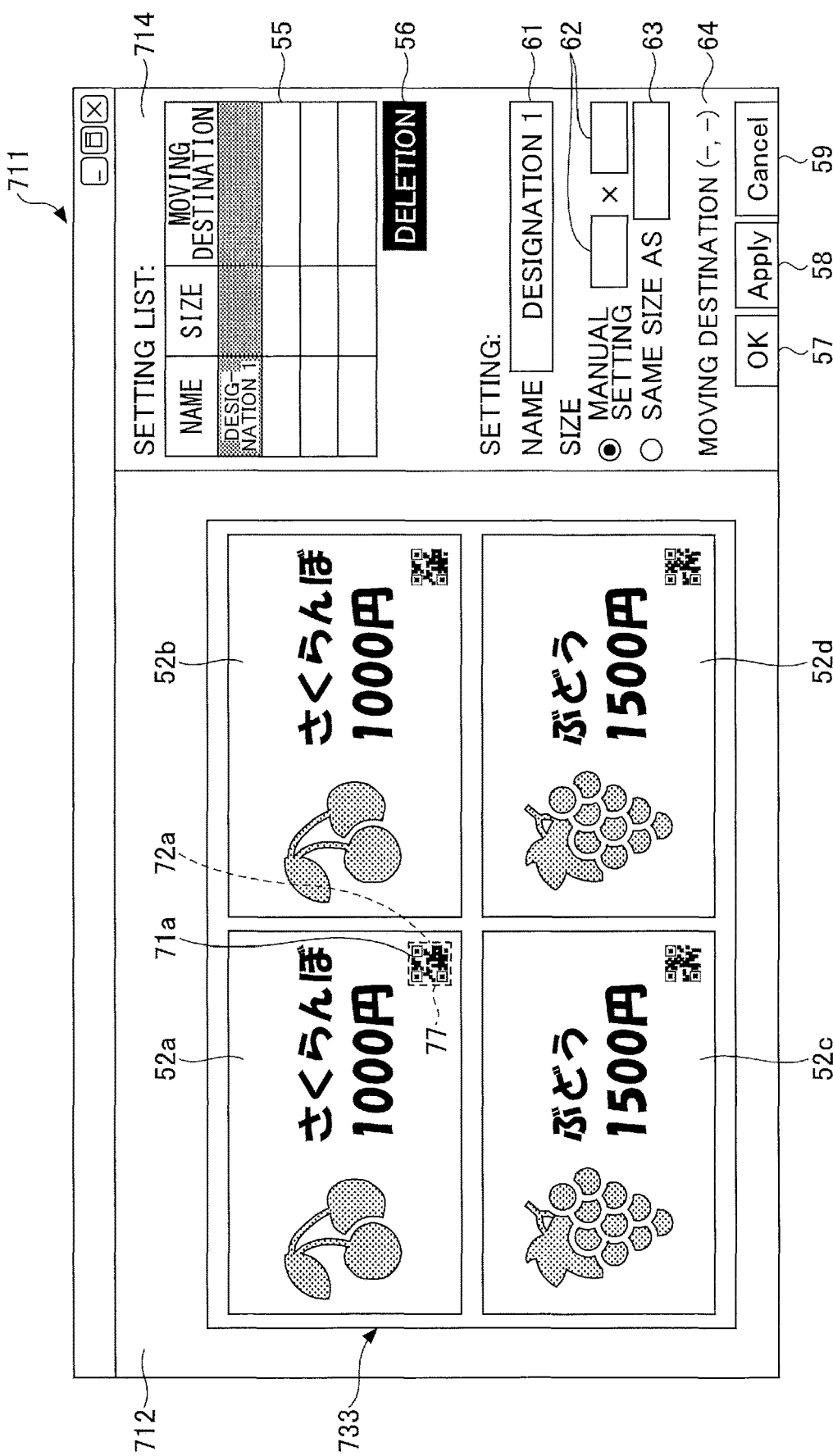
FIG. 13 illustrates an example of a preview screen in which a specific color area is designated.

When the user designates the specific color area 72 in the preview area 712, the preview screen of FIG. 13 is transitioned. FIG. 13 is an example of a preview screen 711 in which the specific color area is designated.

According to FIG. 13, the designated image 71a described in the original image 52a at the upper left is designated by the user. The user clicks at the upper left corner of the area to be designated in the specific color area 72a and drags to the lower right corner. The rectangular area designated by in the upper left corner and the lower right corner is the specific color area 72a. The preview displaying unit 23 displays the specific color area 72a by highlighting, for example, the dashed line frame 77. The image included in the specific color area 72a becomes the designated image 71a to be printed with the specific color. As illustrated in Table 1, the size and coordinates of the specific color area 72 are stored in the temporary storage region 14b.

TABLE 1

| NAME | SIZE | COORDINATE |
|---|---|---|
| DESIGNATION 1 | 10 × 10 | 200, 200 |
| DESIGNATION 2 | 10 × 10 | 400, 200 |
| DESIGNATION 3 | 10 × 10 | 200, 50 |
| DESIGNATION 4 | 10 × 10 | 400, 50 |

Table 1 is an example of the information stored in the temporary storage region 14b. As identification information to identify the name of the specific color area, the size and coordinates of the specific color area 72 are stored as many as the number of the specific color areas.

Referring back to FIG. 13, an explanation will be given. When the designated image 71 is designated, the operation receiving unit 24 accepts the user's operation and the setting field display unit 36 displays "Designation 1" in a name entry field 61.

The setting field display unit 36 automatically displays the distinct name in the setting list 55 in accordance with the designation of the designated image 71. The setting field display unit 36 displays "Designation 1" similarly to the item of the name of the setting list 55. The user can enter any name in the name entry field 61. The setting field display unit 36 determines whether the names are duplicated or not, and displays an error message when the names are duplicated.

A size entry field 62 is a field in which the user manually enters the size of the designated image. An identification information designation field 63 provided to omit a size entry when the user designates the name of a setting list 55 (the identification information that identifies the setting list 55) by the user. In addition, the coordinates of the moving destination area 74 designated by the user are displayed in a moving destination field 64. In FIG. 13, the moving destination field 64 is left blank because the user has not designated the moving destination area 74.

The item of the size of the setting list 55 displays the final size of the moving destination area 74. A value designated by the user in the size entry field 62 may be displayed, or a value adjusted so as not to protrude the document 733 may be displayed. The value of the moving destination field 64 is displayed in the item of the moving destination. In the setting list 55, records (each of the records is one set of a name, size, and destination) as many as the number of designated images are displayed.

Figure 14:
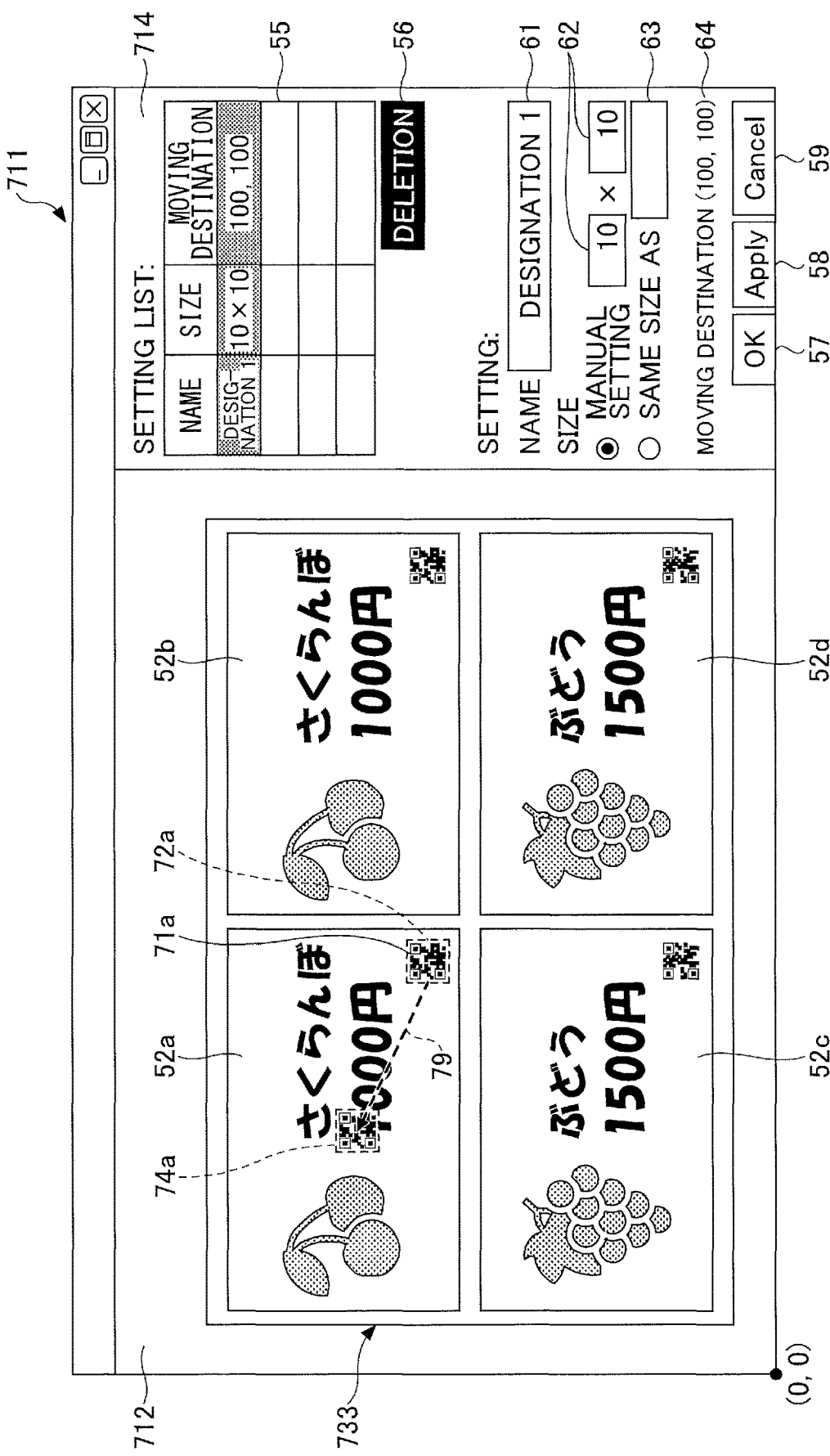
FIG. 14 is a diagram explaining the specification of a moving destination area.

Next, as illustrated in the preview screen 711 of FIG. 14, the user operates the pointing device to move the specific color area 72 to the moving destination area 74. The specific color area 72 and the moving destination area 74 are set in pairs, but the moving destination area 74 is not dispensable (it does not have to be moved).

When the moving destination area 74 is designated, the user drags a dashed frame 77 representing the specific color area 72 and drops it at the moving destination. In FIG. 14, the moving destination area 74a is formed in the substantially center of the original image 52a at the upper left of the document 733. The image forming apparatus actually moves the designated image 71a, but the preview displaying unit 23 displays the designated image 71 in the moving destination area 74 even in the preview screen 711 in consideration of user operability. An arrow 79 indicating the relationship between the specific color area 72 and the moving destination area 74 is displayed.

The operation receiving unit 24 accepts the coordinates of the lower left corner of the moving destination area 74 as the moving destination, and the setting field display unit 36 displays the moving destination in the moving destination field 64 of the setting field 714.

In FIG. 14, the coordinates are (100,100). These coordinates are based on a predetermined origin of document 733 (the whole without distinguishing four original images 52). In FIG. 14, the lower left corner of the preview area 712 is determined as the origin (0,0).

The setting field display unit 36 automatically displays the size of the moving destination area 74 in the size item of the setting list 55 and the size entry field 62. The size that is automatically displayed is the same as the size of the moving destination area 74. The size that is automatically displayed is the initial value and allows the user to change the size of the moving destination area 74. The setting field display unit 36 automatically displays the coordinates of the moving destination area 74 set by the user in the item of the moving destination of the setting list 55.

Figure 15:
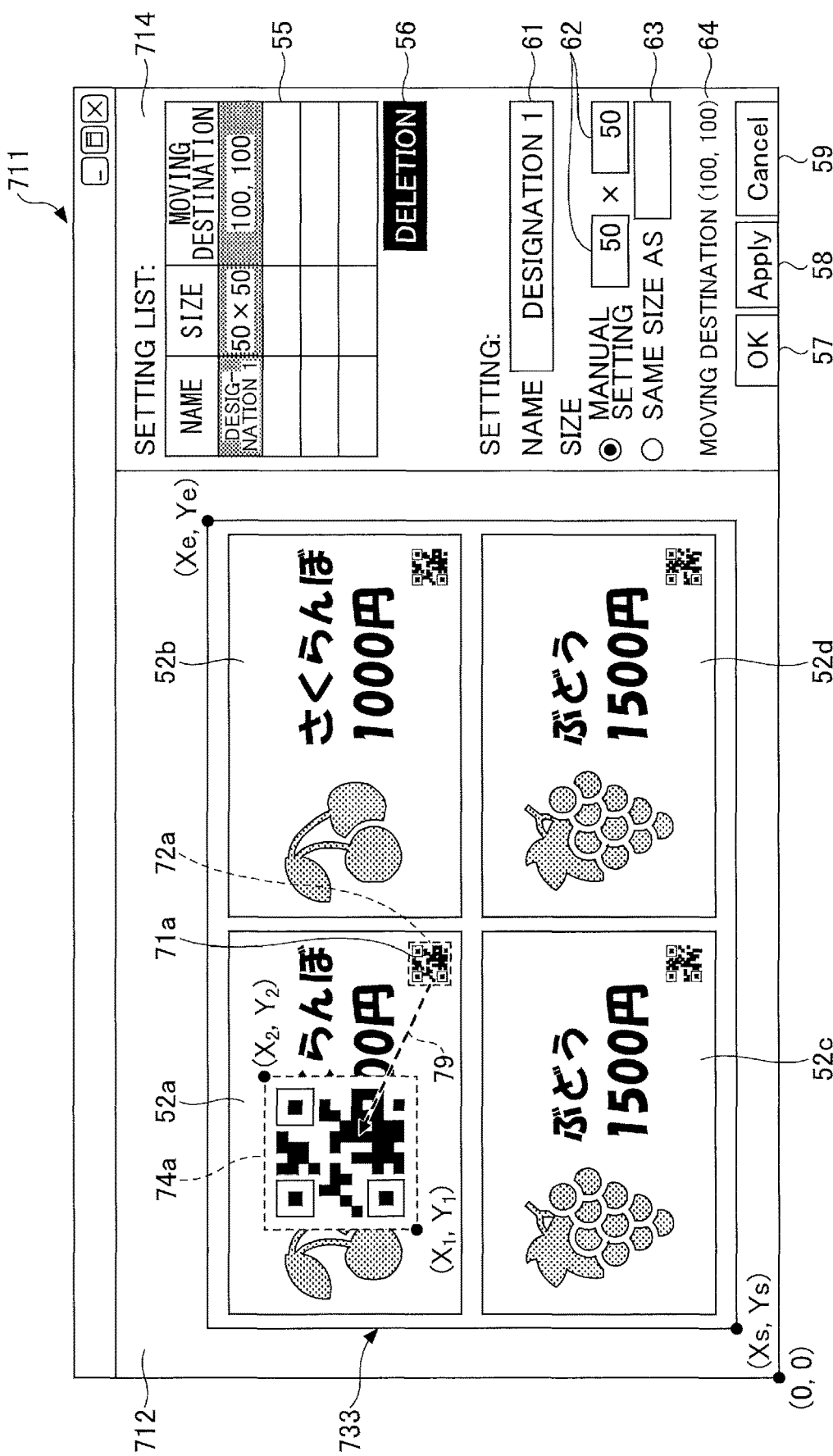
FIG. 15 is a diagram illustrating a method of changing a size of a specific color area by a user.

FIG. 15 is a diagram illustrating a method of changing the size of the specific color area 72 by the user. If the user wishes to change the size of the specific color area 72, for example, the user enters a desired size of the moving destination area 74 in the size entry field 62. For example, in FIG. 15, (50×50) is entered. When the operation receiving unit 24 receives the size entry in the size entry field 62, the size changing unit 34 multiplies the moving destination area (and the designated image). For example, when the size of the specific color area is (10×10) and the size entered in the size entry field 62 is (50×50), the size changing unit 34 multiplies the size of the moving destination area by 5.

FIGS. 16A to 16D are diagrams illustrating the movement of the specific color area and the magnification/minification of the moving destination area. In this embodiment, "coordinates" and "size" are independent information. Even if the coordinates of the size changing unit 34 are changed, the size does not change, and even if the size is changed, the coordinates do not change. Therefore, the specific color area moves when changing the coordinates, but the size of the specific color area does not change before and after moving. When the size is changed, the coordinates are fixed and the size of the moving destination area changes with reference to a point. The reference point of the moving destination area may be any one of the following: the lower left corner, lower right corner, upper left corner, upper right corner, or center.

Figure 16A:
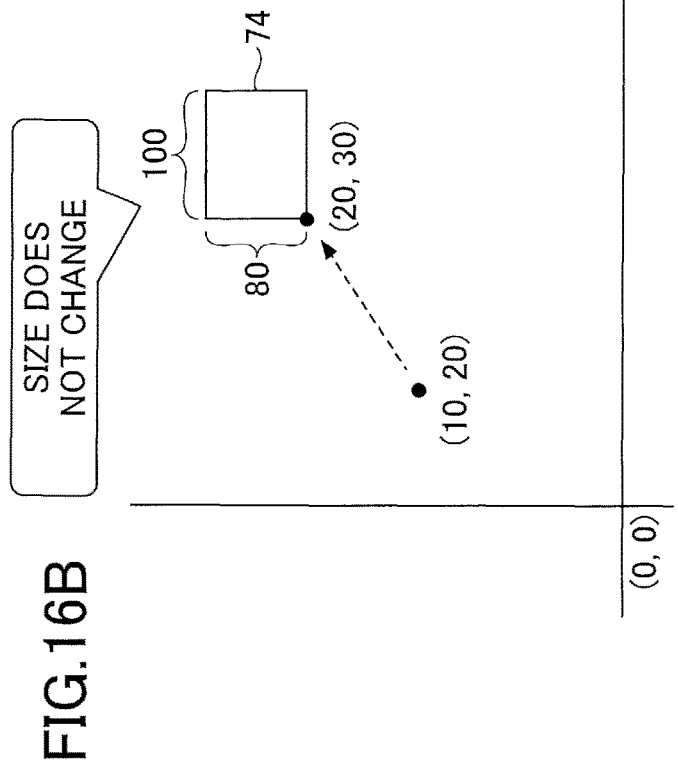
FIGS. 16A to 16D are diagrams explaining the movement of the specific color area and the multiplication of the moving destination area.
Figure 16B:
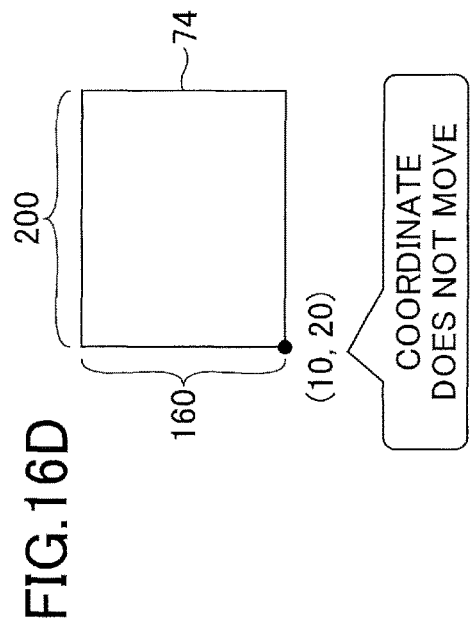

FIG. 16A illustrates a specific color area 72 before movement, and FIG. 16B illustrates a moving destination area 74. The coordinates (10, 20) in the lower left corner of the specific color area 72 are moved by the user to the coordinates (20, 30). In this case, the size (100×80) does not change.

Figure 16C:
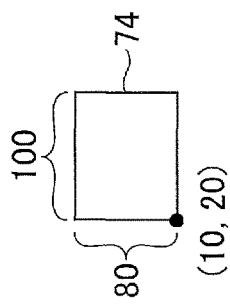
Figure 16D:
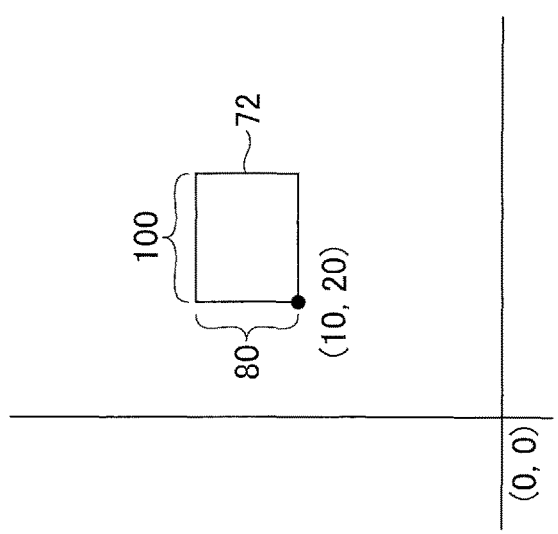

FIG. 16C shows the moving destination area 74 before the change, and FIG. 16D shows the moving destination area 74 after the change (twice). If the user changes size (100×80) to (160×200), the reference coordinates (10, 20) do not change.

As described in FIGS. 16A to 16D, the size changing unit 34 multiplies the moving destination area 74, but determines whether the moving destination area 74 is within the scope of the document 733. The scope of document 733 is the printed area and may contain some white spaces. As illustrated in FIG. 15, the lower left corner of the preview area 712 is the origin, and the coordinates of the lower left corner of the document 733 are (Xs, Ys) and the coordinates of the upper right corner are (Xe, Ye). The coordinates of the lower left corner of the moving destination area 74 after the size change is set to (X1, Y1) and the coordinates of the upper right corner are set to (X2, Y2). (X1,Y1) is determined by user operation and (X2, Y2) is the width of X2=X1+size entry field 62, Y2=Y1+size entry field 62 height.

The size changing unit 34 determines that the moving destination area 74 whose magnification has been changed is within the document 733, if the following equations are satisfied:

$$Xs \leq X1 \leq Xe \text{ and } Xs \leq X2 \leq Xe; \text{ and}$$

$$Ys \leq Y1 \leq Ye \text{ and } Ys \leq Y2 \leq Ye \qquad (1).$$

If satisfied, the moving destination area 74 is determined to be within document 733. In FIG. 15, it is determined that the moving destination area 74 is determined to be within document 733. When the moving destination area 74 is within the document 733, the preview displaying unit 23 multiplies the moving destination area 74 and the designated image 71 to display.

In this manner, the user can magnify or minify the moving destination area 74 compared to the specific color area 72. For example, if the specific color area 72 is reduced in size due to the imposition, the user can magnify the moving destination area 74 so that the reading device can read the designated image.

The user may rotate the moving destination area 74. In this case, when the dotted line frame 77 dropped on the moving destination is clicked so as to be selected, the operation receiving unit 24 can receive the rotation angle.

Figure 17A:
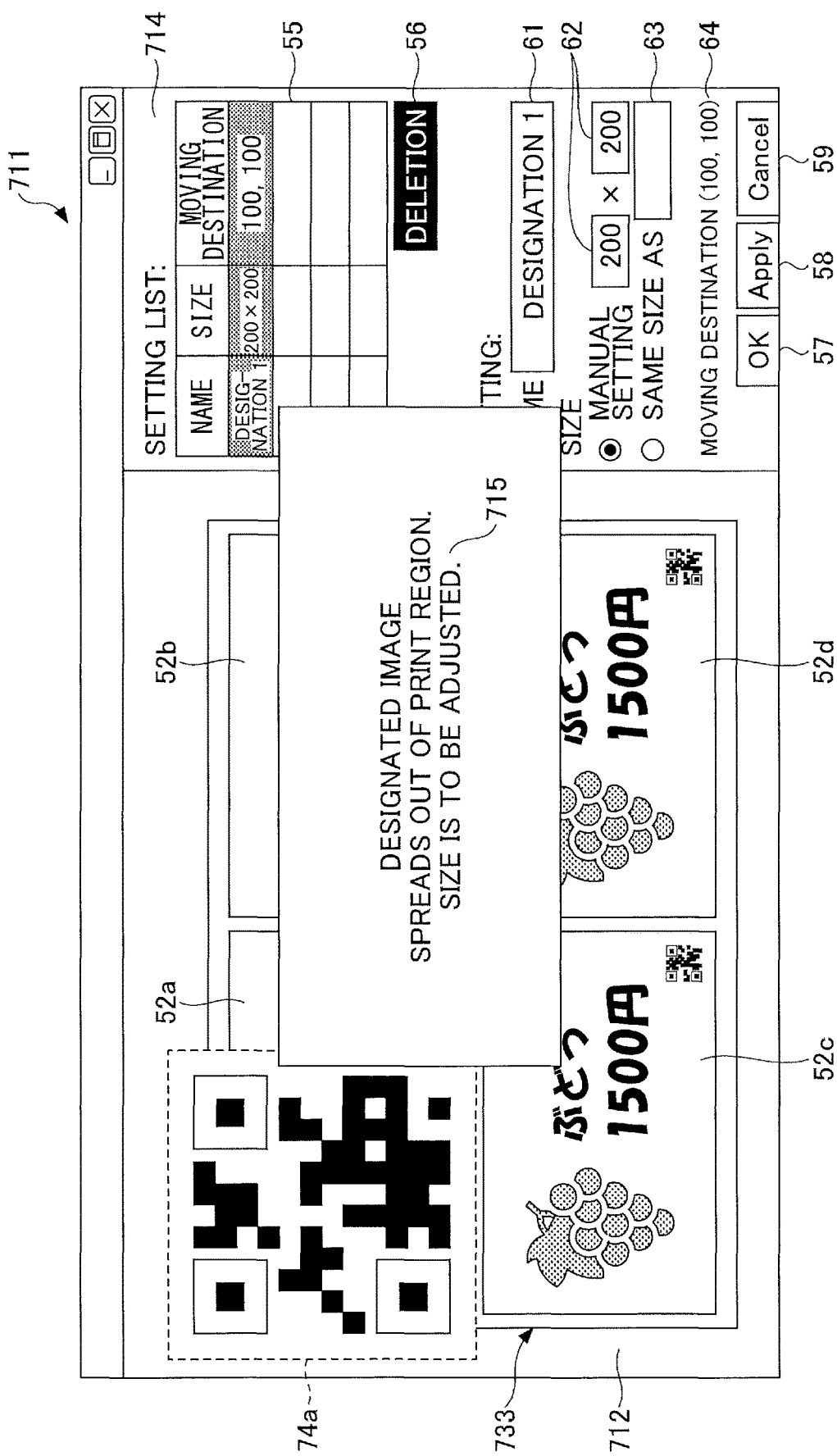
FIGS. 17A and 17B are diagrams illustrating an example of a moving destination area that has moved out of a document by multiplication and a moving destination area after size adjustment.
Figure 17B:
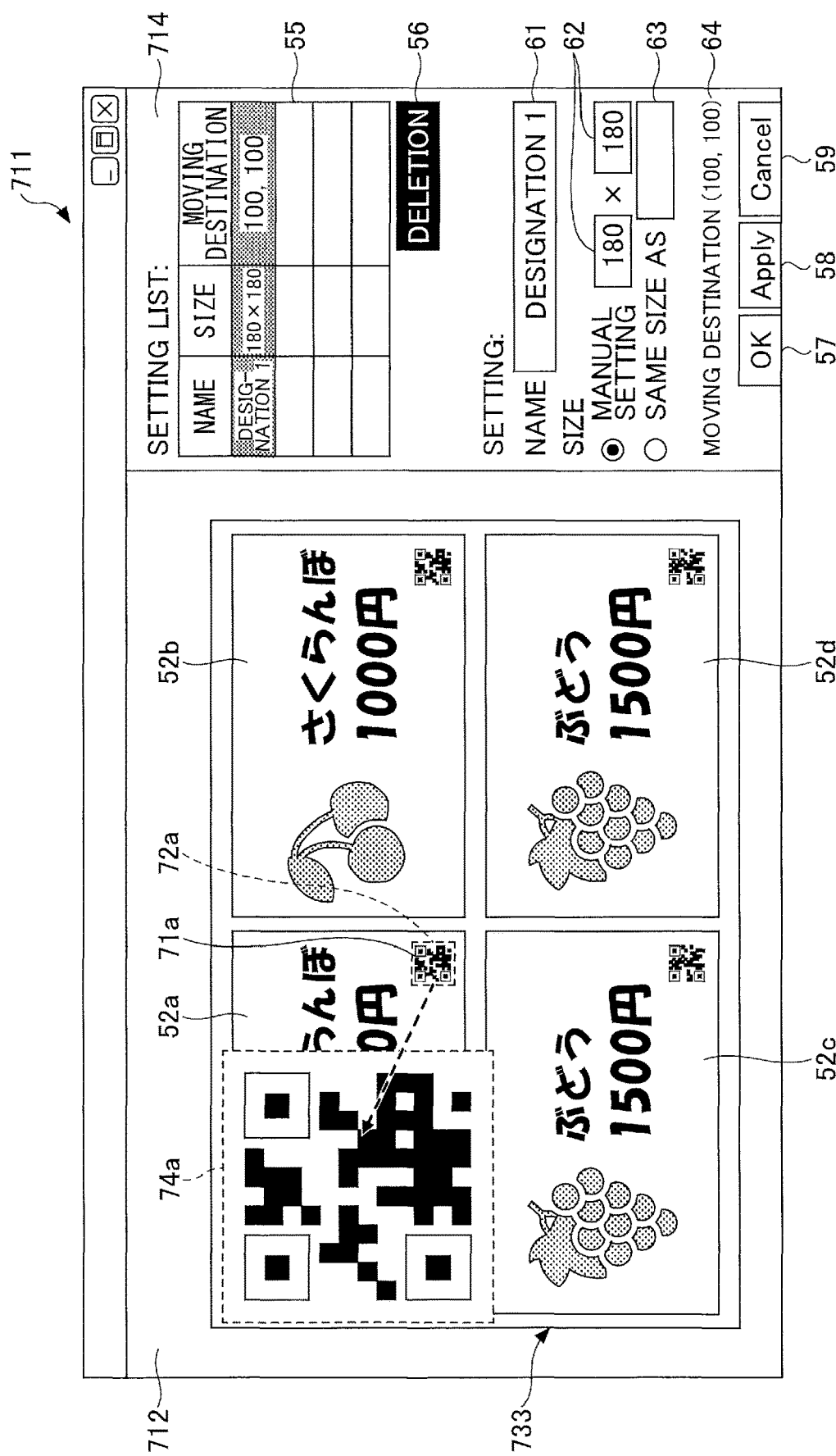

FIGS. 17A and 17B illustrates an example of a moving destination area 74 protruding and a moving destination area 74 that has been adjusted in size document 733 by multiplication. In FIGS. 17A and 17B, the user enters, for example, (200×200) into a size entry field 62. When the operation receiving unit 24 receives the size in the size entry field 62, the size changing unit 34 changes the multiplication of the moving destination area 74. For example, when the size of the specific color area is (10×10) and the size entered in the size entry field 62 is (200×200), the size changing unit 34 multiplies the size of the moving destination area by 20. As a result, in FIGS. 17A and 17B, a multiplied moving destination area protrudes from the document 733. According to the above-described condition (1), the size changing unit 34 determines that the moving destination area protrudes from the document 733.

When the moving destination area protrudes from the document 733, the preview displaying unit 23 does not display the magnified moving destination area, but it is displayed in FIGS. 17A and 17B for the sake of explanation. Alternatively, when the moving destination area protrudes from the document 733, the preview displaying unit 23 may display the magnified moving destination area by reducing or flashing the brightness.

When the moving destination area is out of the document 733, the message display unit 35 displays a message on the preview screen indicating that the designated image (destination area) is out of the document 733. In FIG. 17A, a message 715 is displayed stating, "The designated image is out of the print region. The size is adjusted."

When the moving destination area is out of the document 733, the size changing unit 34 adjusts the size of the moving destination area so that the moving destination area fits into the document 733 (FIG. 17B). Referring to FIGS. 18A to 20, a method of adjusting the size will be described.

FIG. 18 is a diagram illustrating a method of size adjustment (first diagram).

Figure 18A:
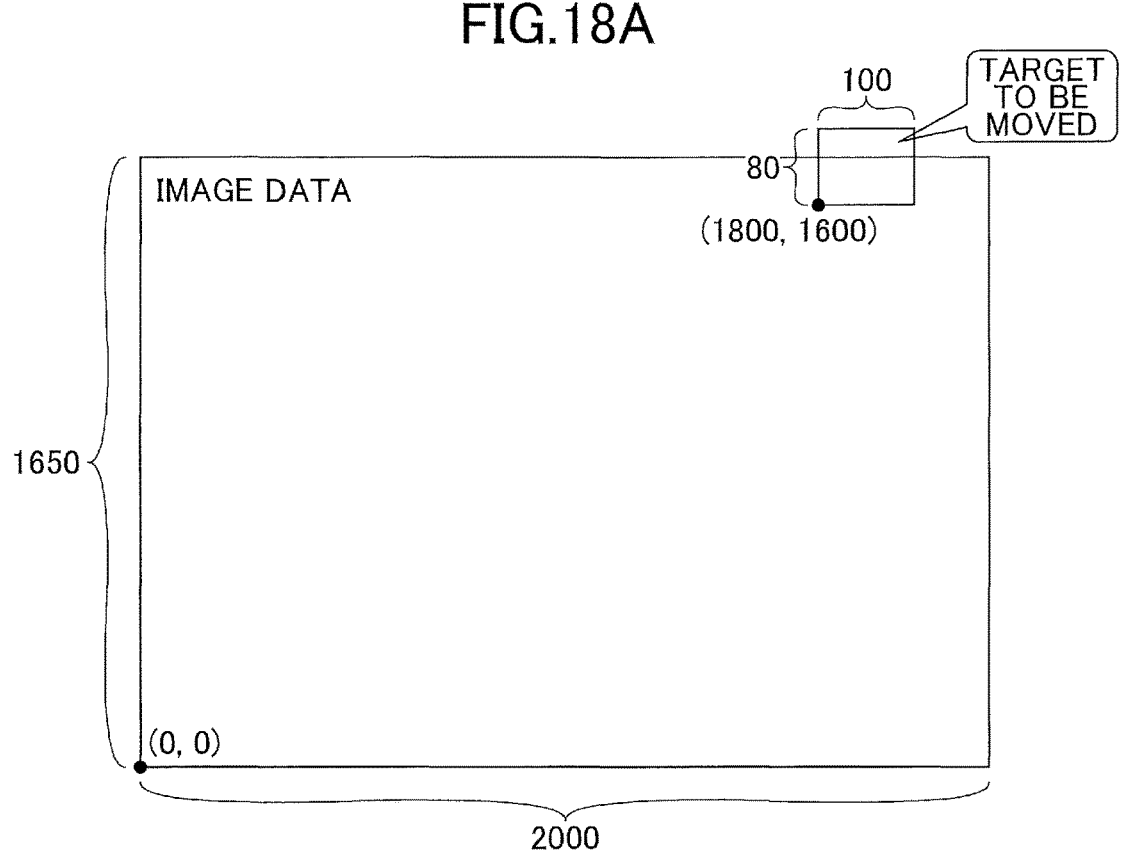
FIGS. 18A and 18B illustrate a method of size adjustment.

FIG. 18a shows the moving destination area being exceeded. For the coordinates (x=1800, y=1600) of the moving destination area and the size (width=100, height=80) of the moving destination area 74, the coordinates of the four corners of the moving destination area 74 are as follows.

Lower left corner: (1800, 1600)
Lower right corner: (1800+100=1900, 1600)
Upper left corner: (1800, 1600+80=1680)
Upper right corner: (1800+100=1900, 1600+80=1680)

Figure 18B:
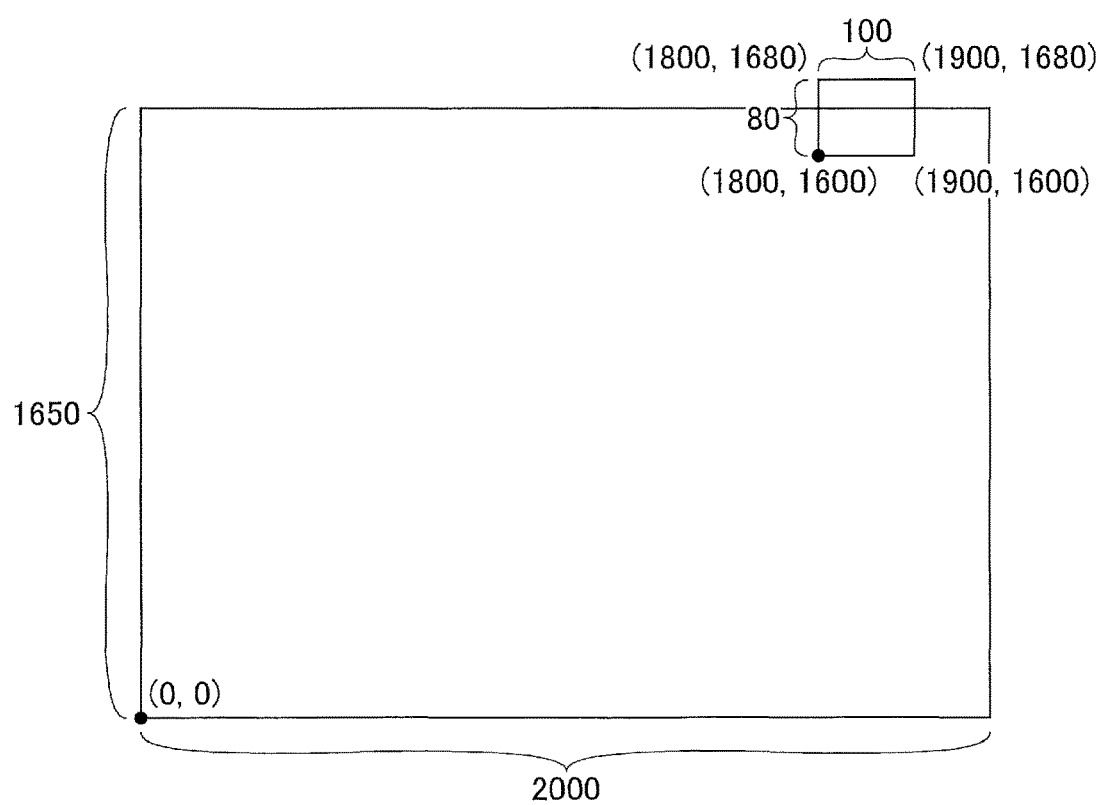

FIG. 18b shows the coordinates of the calculated destination area 74.

The coordinates of the four corners are illustrated in FIG. 18b.

Figure 19A:
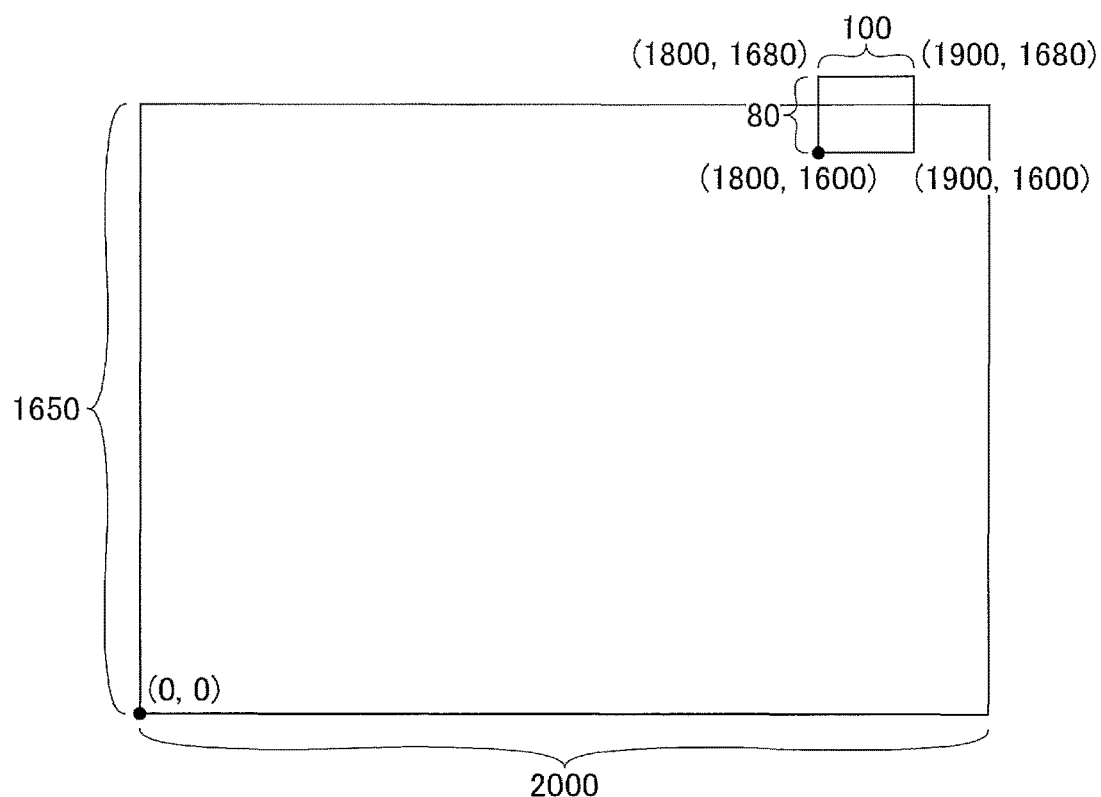
FIGS. 19A and 19B illustrate another method of size adjustment.

FIG. 19 is a diagram illustrating a method of size adjustment (FIG. 2). As illustrated in FIG. 19A, when the size of the document 733 is (width=2000, height=1650), the size changing unit 34 can determine that the Y coordinate (1680) of the upper left corner and upper right corner of the moving destination area 74 exceeds the height (1650) of the document 733. The size changing unit 34 retroactively calculates the size (width, height) of the moving destination area 74 that is not protruding from the coordinates of the moving destination area 74 and the range of the document 733 and adjusts the size (width, height) of the moving destination area 74.

Figure 19B:
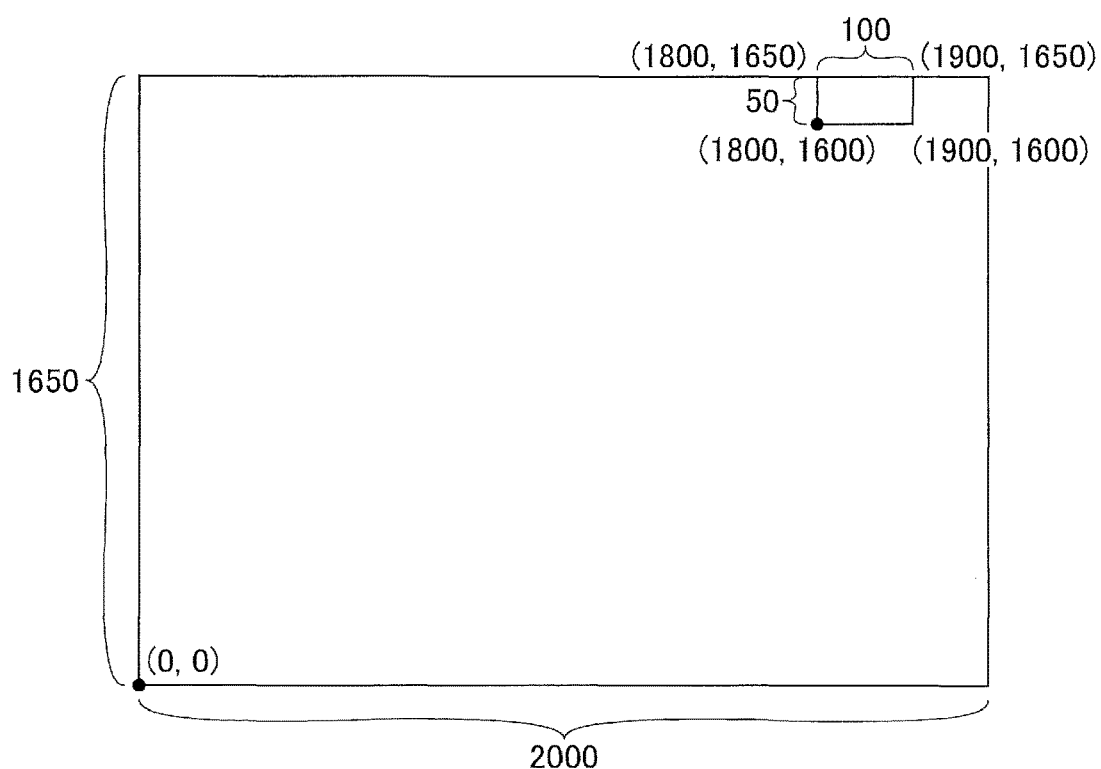

FIG. 19B illustrates a moving destination area 74 that has been changed in height so as not to protrude from the document 733. From the coordinates of the moving destination area (X=1800, Y=1600) and the size of the document 733 (width=2000, height=1650), the height of the moving destination area in which the moving destination area 74 does not protrude can be calculated as "the height of the document 733 of 1650 minus the coordinate of the lower side of the moving destination area of 1600 equals to 50". Therefore, the size changing unit 34 changes the height of the moving destination area to 50.

Figure 20:
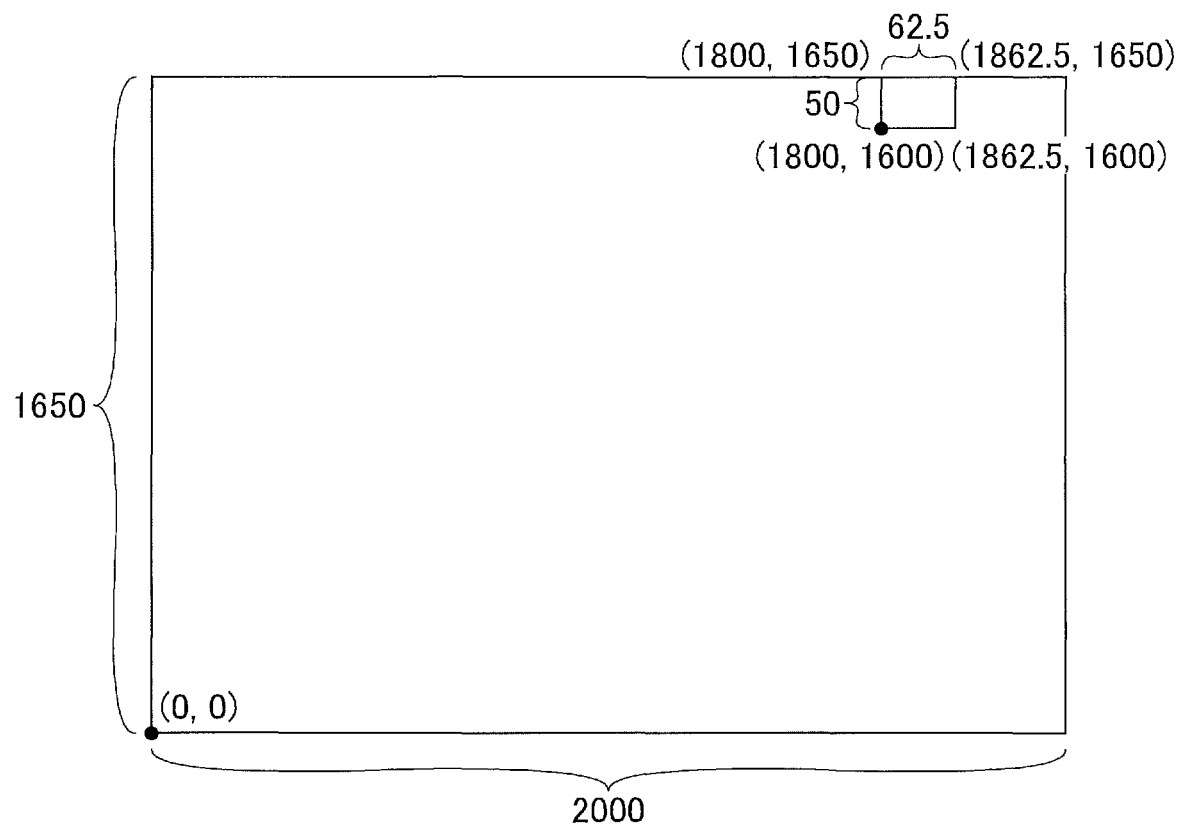
FIG. 20 illustrates another method of size adjustment.

FIG. 20 is a diagram illustrating a method of size adjustment. When the height of the moving destination area 74 becomes 50, the size changing unit 34 adjusts the width of the moving destination area 74 in order to maintain the aspect ratio. Because the aspect ratio of the specific color area 72 is originally "width:height=100:80", when calculated so that "100:80=new width:50," the width of the moving destination area to maintain the aspect ratio is as follows.

New width=100×50÷80=62.5

Therefore, the size of the moving destination area 74 is (62.5, 50).

Thus, the moving destination area 74 extending from the document 733 in FIG. 17a fits into the document 733, as illustrated in FIG. 17b.

Thus, the moving destination area 74a has been set for one source image 52a, so that the user performs the work described in FIGS. 12 to 17 for the four original images 52.

On the other hand, for the second and subsequent original images 52, the setting field 714 can reduce the user's work. In this case, the user enters "Designation 1" in the identification information designation field 63 of the setting field 714.

Figure 21:
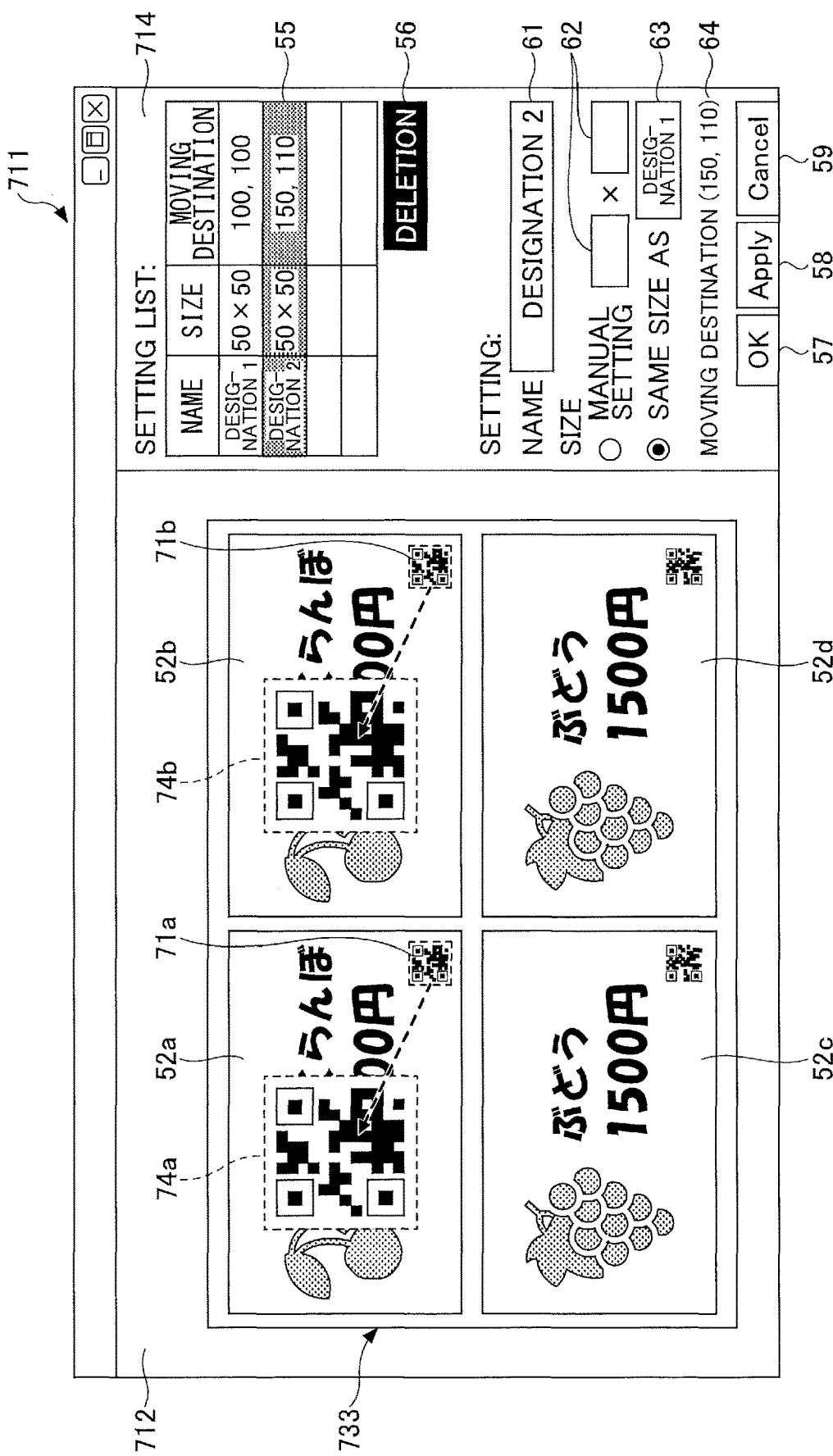
FIG. 21 illustrates an example of a preview screen explaining an example of input to an identification information designation field.

FIG. 21 is a preview screen 711 explaining an example of an entry to the identification information designation field 63. FIG. 21, the user designates the specific color area 72b and the moving destination area 74b in the second original image 52b. For this reason, "Designation 2" is displayed in the name entry field 61. The "Designation 2" is displayed in the item of the name of the setting list 55, and the coordinates of the moving destination area 74b designated by the user are displayed in the item of the moving destination. The coordinates of the moving destination area 74b designated by the user are also displayed in the moving destination field 64.

Next, the user enters "Designation 1" in the identification information designation field 63. The operation receiving unit 24 receives that the size of the moving destination area 74 of Designation 2 is the same as that of Designation 1. The setting field display unit 36 sets the size corresponding to Designation 1 of the setting list 55 to the item of the size of Designation 2.

As described above, when the user sets the moving destination area 74a for the first original image 52a, the size entry of the moving destination area 74b to 74d can be omitted for the second and subsequent original images 52b to 52d.

The configuration of the setting field 714 illustrated in FIG. 12 or the like, is only one example, and the setting field 714 may be popped up in the preview area 712.

Figure 22:
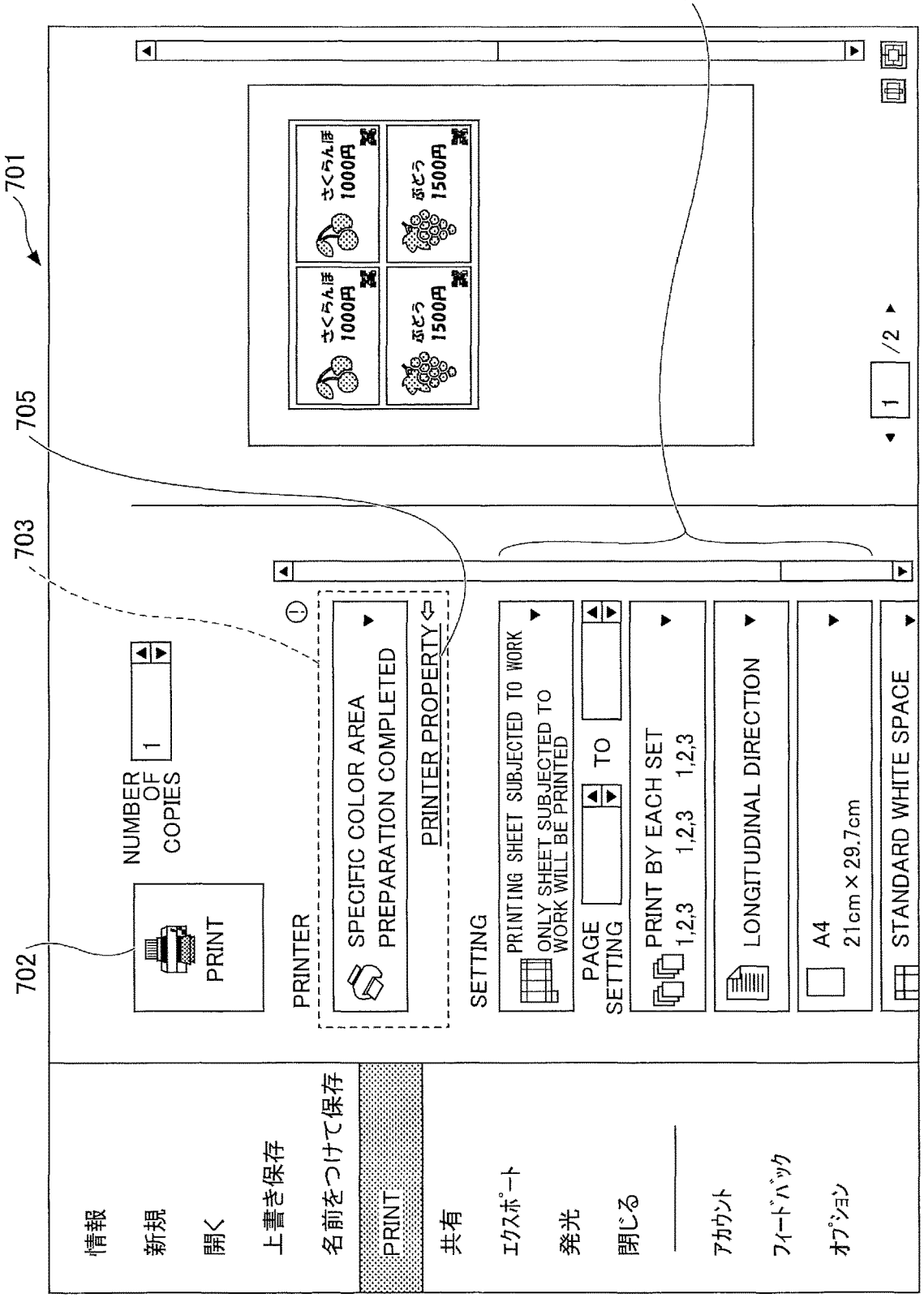
FIG. 22 is a view illustrating an example of a printing screen of a second printer driver.
Figure 23:
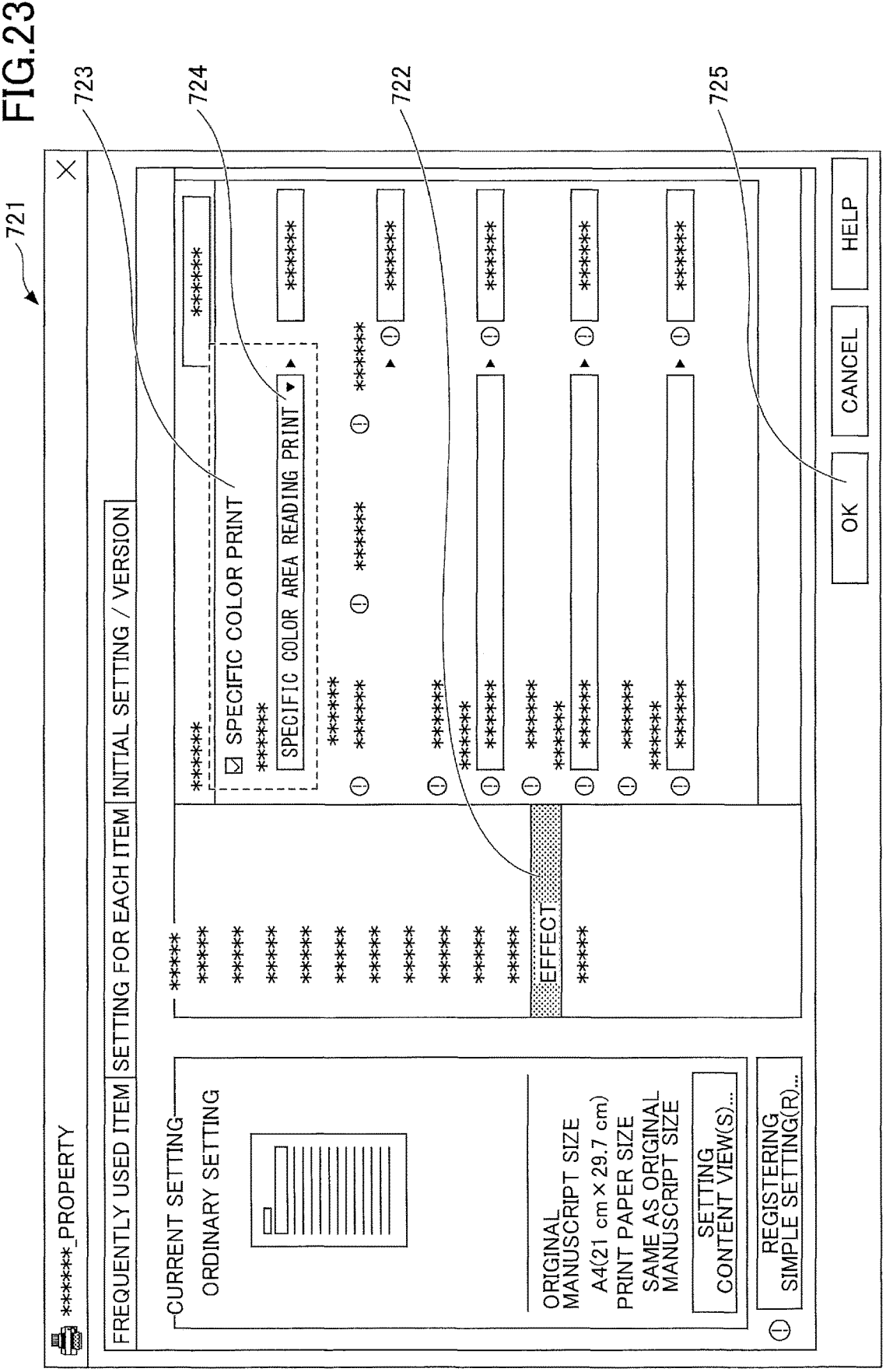
FIG. 23 is a diagram illustrating an example of a printing setting screen of a second printer driver.

FIG. 22 illustrates an example of the printing screen 701 and the printing setting screen 721 of the second printer driver 13.

When the OK button 57 is depressed in the preview screen 711 of FIG. 10 or the like, the print screen 701 illustrated in FIG. 22 is displayed. The printing screen 701 is the same as that of FIG. 10, but the printer selected by the user is different. The user who designates the area information in the preview screen 711 selects the image forming apparatus 30 having the specific color assigned to K. The image forming apparatus 30 is known by the user.

When the image forming apparatus 30 is selected, settings regarding the specific color material can be made. The user depresses the property button 705 to display the print setting screen 721 illustrated in FIG. 23 on the display 506. The user activates "effect"→checking a check button 723 of specific color area→selecting "specific color area reading print 724" in order to effectively set "specific color area reading print".

When the user depresses the OK button 725, the print setting screen 721 returns to the print screen 701.

When the user depresses the print button 702 on the print screen 701, a second printer driver 13 corresponding to the image forming apparatus 30 in which the specific color is assigned to K is called and implemented. Accordingly, print data is generated and transmitted to the image forming apparatus 30.

In addition, the user can set the page designation, the part unit printing, the printing direction, the paper size, etc. by using the setting button 704, and can also set the double side printing or the aggregate printing on the printing setting screen 721.

<Print Data Generated from Area Information>

Next, the area information (the specific color area 72 and the moving destination area 74) set by the user in the preview screen 711 and the print data (the area information command) generated from the area information will be described.

FIG. 24A shows an example of the area information stored in the memory region 14 by the area information storing unit 25. Description D1 and D2 indicate one area information respectively. The contents of description D1 and D2 are as follows. The coordinates of the corner are not limited to the upper left. The "src_x" is the X-coordinate of the upper left corner of the specific color area 72. The "src_y" is the Y-coordinate in the upper left corner of the specific color area 72. The "width" the width of the specific color area 72 (pixels). The "height" is the height (pixel) of the specific color area 72. The "dst_x" is the X-coordinate of the upper left corner of the moving destination area 74. The "dst_y" is the Y coordinate in the upper left corner of the moving destination area 74. The "dst_width" is the width (pixel) of the moving destination area 74. The "dst_height" is the height (pixel) of the moving destination area 74. The "rot" is the rotation angle (clockwise) of the moving destination area 74 relative to the specific color area 72.

FIG. 24B is an example of print data (area information command) in which the area information read from the memory region 14 by the first print data generation unit 29 is described by a PDL. The description D3 illustrated in FIG. 24B is print data generated from the description D1 of FIG. 24A, and the description D4 of FIG. 24B is print data generated from the description D2 of FIG. 24A.

The image forming apparatus 30 to which the specific color is assigned to K corresponds to the area information command, and the designated image 71 of the specific color area 72 can be moved to the moving destination area 74. In FIG. 24B, the area information command is followed by the printed data of the document. However, the area information command may be located anywhere.

<Operation Procedure of Image Forming Apparatus>

Figure 25:
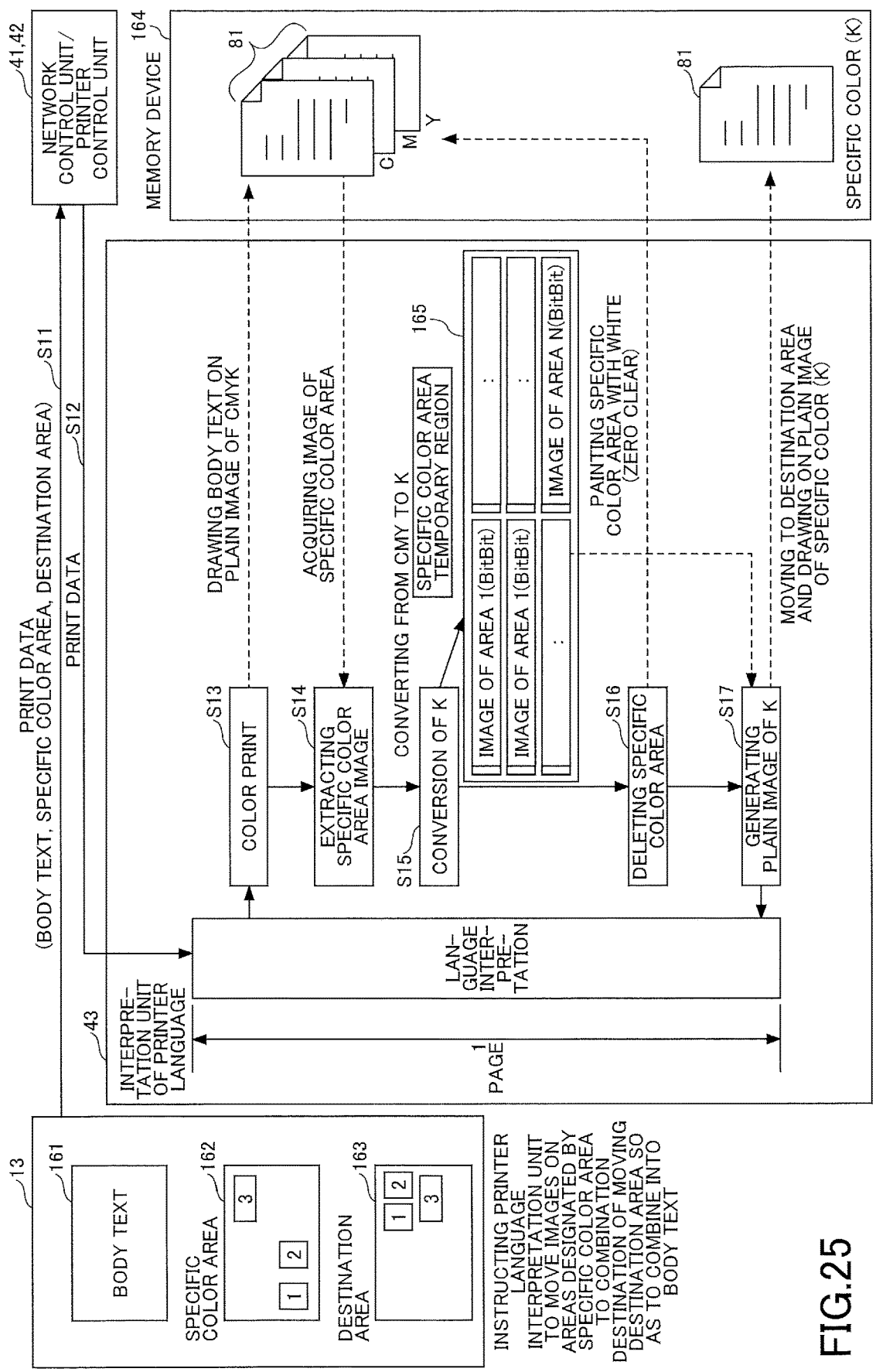
FIG. 25 is a flowchart illustrating a procedure for printing a designated image in which an image forming apparatus prints a designated image designated by a specific color with a specific color material and schematically illustrating various types of data used in the procedure.

Next, a procedure for printing the designated image having the specific color by the image forming apparatus 30 that has received the print data will be described with reference to FIG. 25. FIG. 25 is a flowchart diagram illustrating a procedure in which the image forming apparatus 30 prints the designated image with the specific color material and schematically illustrates various types of data used in the procedure.

S1: The second printer driver 13 transmits the print data. The print data includes the body text 161 of the document, the coordinates 162 of the specific color area 72, and the coordinates 163 of the moving destination area 74. The second communication unit 41 of the image forming apparatus 30 receives the print data. The printer control unit 42 starts the control of printing the designated image with the specific color on the basis of the coordinates 162 of the specific color area 72 and the coordinates 163 (area information command) of the moving destination area 74 included in the print data or on the basis of the fact that the designated image is printed with the specific color.

S12: The printer control unit 42 acquires the print data from the second communication unit 41 and requests a printer language interpretation unit 43 to interpret the print data.

The printer language interpretation unit 43 performs the following processing in page units.

S13: The plain data drawing unit 44 of the printer language interpretation unit 43 first performs color printing. Color printing means that the color matching and screening processes described above are performed to produce plain images 81 of the C, M, and Y colors. No plain image 81 of K is generated. The C, M, and Y plain images 81 are stored in a memory device 164 (MEM-C 907, HD 909, etc.) of the image forming apparatus 30.

S14: Next, the specific color image control unit 45 extracts image data of the specific color area 72 from the plain images 81 of C, M, and Y respectively based on the specific color areas 72 included in the print data. This results in the shape of the designated image 71 to be printed with the specific color.

S15: Next, the plain data conversion unit 46 converts the image data extracted from the specific color area 72 to K. The image data of K is stored in a temporary region 165 (for example, MEM-C907, HD 909, or the like) provided for the designated image 71 of the specific color area 72.

S16: Next, the specific color image control unit 45 deletes (zero clears) each image of the specific color area 72 from the plain images 81 of C, M, and Y stored in the memory device 164 based on the specific color area 72 included in the print data. This is because the designated image 71 of the specific color area 72 is printed to the moving destination and not printed in the specific color area 72. However, when the designated image 71 of the specific color area 72 is also printed, it is not necessary to delete it.

Next, S17: The specific color image control unit 45 acquires the image data of the designated image 71 converted to the K stored in the temporary area 165 and disposes the image data of the specific color area 72 converted to C, M, and Y in the moving destination area 74 of the plain image 81 of K based on the moving destination area 74 included in the print data. The K plain image 81 is also stored in a storage device 164. The specific color image control unit 45 is magnified (may be minified) the image data of the specific color area 72 up to the size included in the moving destination area 74 (dst_width and dst_height in FIG. 24).

When the printer language interpretation unit 43 generates the plain images 81 of C, M, Y, and K, the printer control unit 42 is notified. Therefore, the printer control unit 42 performs the printing process and prints the plain images 81 of C, M, Y, and K on the paper.

In the present embodiment, the overprint is designated at the time of printing.

Overprint refers to the printing of another color on top of another color.

Further, in the case of the image forming apparatus 30 capable of specifying the specific color, the processing in FIG. 25 is modified as follows.

Figure 26:
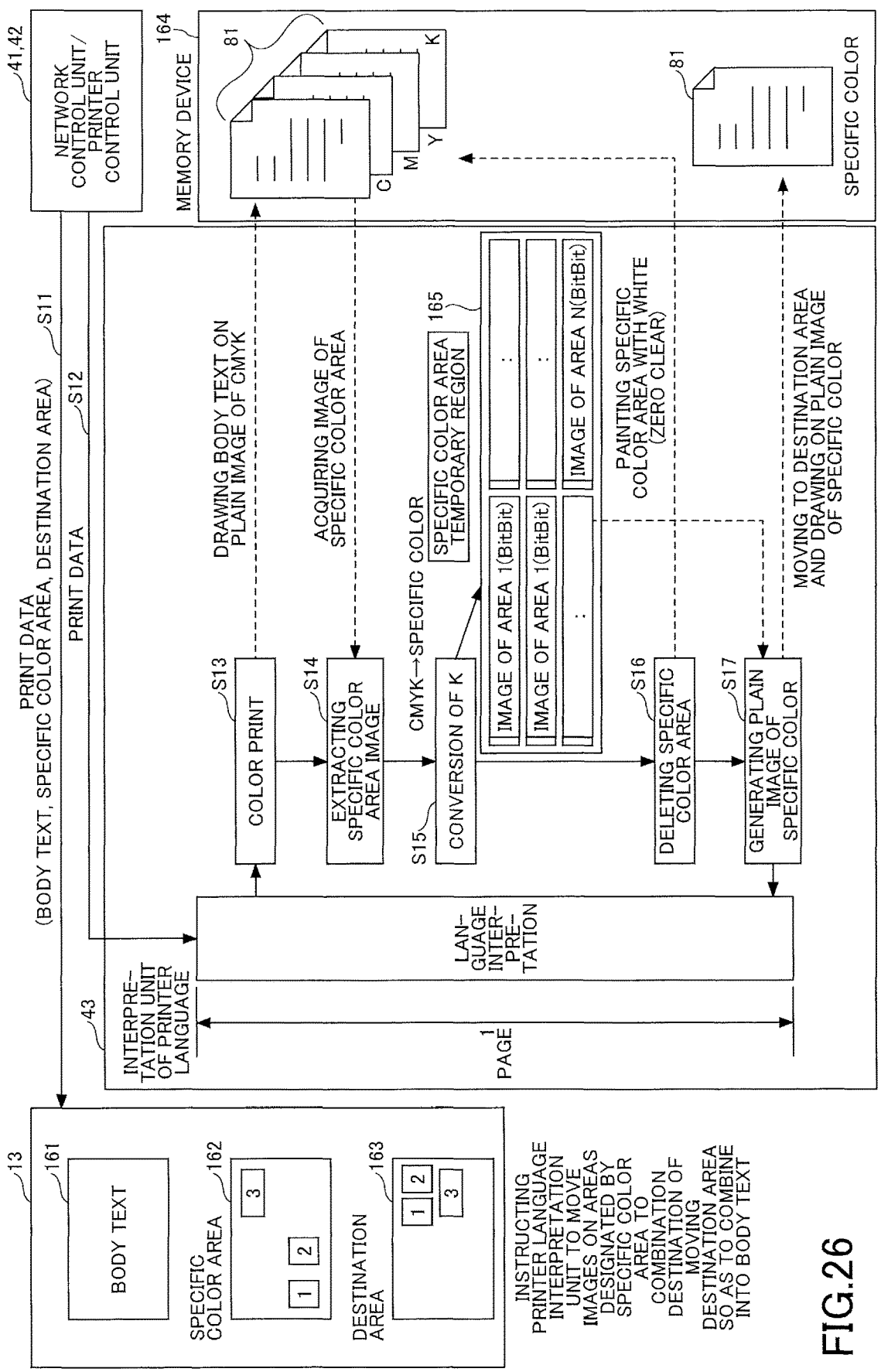
FIG. 26 is a flowchart diagram of a procedure for printing a designated image having characteristics specified by the image forming apparatus with a specific color material in an image forming apparatus enabled to designate a specific color and a diagram schematically illustrating various types of data used in the procedure.

FIG. 26 is a flowchart diagram illustrating a procedure in which the image forming apparatus 30 prints a designated image with a specific color material in the case of the image forming apparatus 30 capable of specifying a characteristic, and schematically shows various types of data used in the procedure. In the description of FIG. 26, the difference from FIG. 25 will be mainly explained. The image forming apparatus 30 illustrated in FIG. 26 is an image forming apparatus capable of designating the specific color other than C, M, Y, and K. A K toner does not absorb infrared light.

The processes of steps S11 and S12 are the same as those of FIG. 25. In step S13, a plain data drawing unit 44 of the printer language interpretation unit 43 generates not only the plain images 81 of the C, M, and Y colors but also a plain image 81 of K.

In Step S14, the specific color image control unit 45 extracts image data of the specific color area 72 from the plain images 81 of C, M, Y, and K, respectively, based on the specific color area 72 included in the print data.

In Step S15, the plain data conversion unit 46 converts the image data extracted from the specific color area 72 to the specific color. Although the specific color is transparent, it is a primary color other than C, M, Y, and K that can be designated by the image forming apparatus 30.

The processing of step S16 is the same as that of FIG. 25. In Step S17, the specific color image control unit 45 acquires the image data of the designated image 71 converted into the specific color stored in the temporary area 165 and disposes the image data of the specific color area 72 converted into the specific colors from C, M, Y, and K in the moving destination area 74 of the specific color plain image 81 based on the moving destination area 74 included in the print data. This specific color plain image 81 is also saved in the memory device 164.

As a result, the plain image 81 having the specific color, C, M, Y, and K have been created. Therefore, the image forming apparatus 30 prints the C, M, Y, K and the specific color.

<Details of Preview Application Processing>

Figure 27:
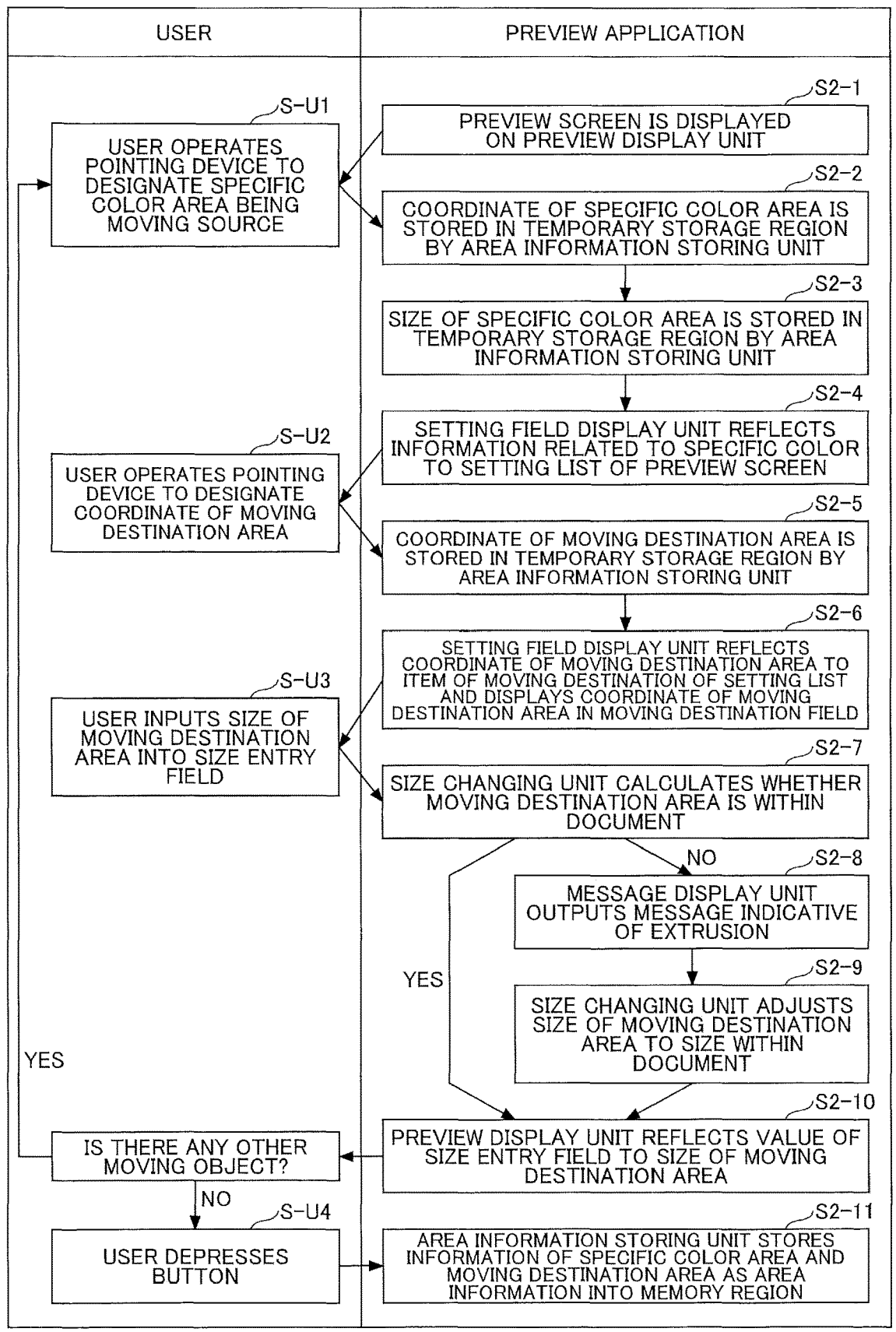
FIG. 27 is

Subsequently, the process performed by the information processing apparatus 10 described in FIG. 9 will be described in detail. FIG. 27 is a flowchart illustrating details of the process performed by the preview application 12 in steps S2 to S3.1 of FIG. 9.

S2-1: The preview displaying unit 23 displays the preview screen 711 on the display 506 (see FIG. 12).

S-u1: The user manipulates the pointing device to designate the specific color area 72 from which the device is moved. The operation receiving unit 24 receives the coordinates of the specific color area 72 (see FIG. 13).

S2-2: The area information storing unit 25 stores the X and Y coordinates of the specific color area in the temporary storage region 14b.

S2-3: The area information storing unit 25 stores the size (width and height) of the specific color area 72 in the temporary storage region 14b.

The setting field display unit 36 of the S2-4 reflects information regarding the specific color area 72 in the setting list 55 of the preview screen. In FIG. 13, "Designation 1" is displayed in the name entry field 61.

S-u2: The user manipulates the pointing device to specify the coordinates of the moving destination area 74. The operation receiving unit 24 receives the coordinates of the moving destination area 74 (see FIG. 14).

The S2-5: area information storing unit 25 stores the coordinates (X and Y coordinates) of the moving destination area 74 in the temporary storage region 14b.

The S2-6: The setting field display unit 36 reflects the coordinates of the moving destination area 74 in the item of the moving destination in the setting list 55 and displays the coordinates of the moving destination area 74 in the moving destination field 64. Further, the setting field display unit 36 sets the item of the size of the setting list 55 and the size entry field 62 as the initial value (same as the specific color area 72) of the size of the moving destination area 74.

S-u3: The user enters the size of the moving destination area 74 in the size entry field 62 (see FIG. 15). The operation receiving unit 24 receives the input of the size. The area information storing unit 25 stores the size of the moving destination area 74 in the temporary storage region 14b.

S2-7: The size changing unit 34 calculates whether the moving destination area 74 is within the document 733. This calculation method is described in FIG. 18. When the moving destination area 74 is not out of the document 733, the setting field display unit 36 displays the value of the size entry field 62 entered by the user in the size item of the setting list 55.

S2-8: When the moving destination area 74 is out of the document 733, the message display unit 35 outputs a message 715 indicating that the message display unit 35 is out of the document 733 (FIG. 17A).

S2-9: The size changing unit 34 adjusts the size of the moving destination area 74 to a size that fits within the document 733 (see FIGS. 19A, 19B, and 20).

S2-10: Subsequent to step S2-7 or step S2-9, the preview displaying unit 23 reflects the value of the size entry field 62 in the size of the moving destination area 74 (see FIG. 17B).

S-u4: When the user works on other original images 52, the process returns to step S-u1. If the user does not work on another source image, the user depresses OK button 57 on the preview screen.

S2-11: The area information storing unit 25 stores the specific color area of each original image 52 and the information of the moving destination area stored in the temporary storage region 14b as the area information 14a in the memory region 14.

<When Name is Designated in Identification Information Designation Field as Illustrated in FIG. 21>

Based on FIG. 28, the process performed by the information processing apparatus when the name is designated in an identification information designation field 63 of the setting field 714 will be described.

Figure 28:
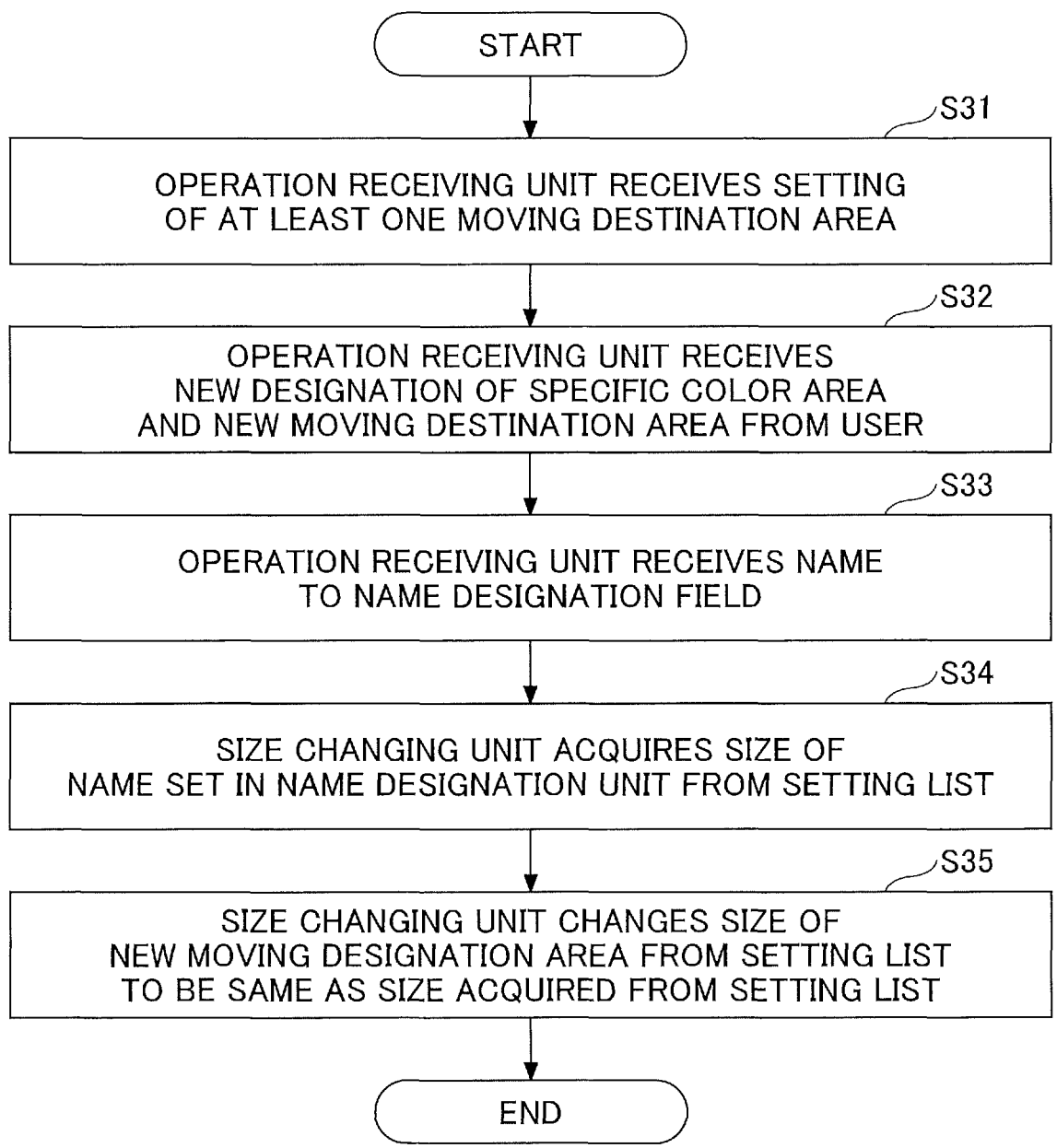
FIG. 28 illustrates an example of a flowchart illustrating the details of the preview application processing in Steps S2 to S3.1 of FIG. 9 when a name is designated in the identification information designation field.

FIG. 28 is a flowchart illustrating details of processing of a preview application in steps S2 to S3.1 of FIG. 9 when a name is designated in an identification information designation field.

The operation receiving unit 24 receives the setting (size and coordinates) of at least one destination area 74 (S31).

Because the user newly designates the specific color area 72 and the moving destination area 74, the operation receiving unit 24 receives the specific color area 72 and the moving destination area 74 which are newly designated by the user (S32). The temporary storage region 14b stores the size and coordinates of the specific color area 72 and the moving destination area 74. The setting field display unit 36 adds the name of the new moving destination area 74 and the moving destination to the setting list 55. "Designation 2" is displayed in the name entry field 61. The new coordinates of the moving destination area 74 are set in the moving destination field 64.

Next, the operation receiving unit 24 receives the setting of the name in the identification information designation field 63 (S33)

The size changing unit 34 acquires the size of the name set in the identification information designation field 63 from the setting list 55 (S34).

The size changing unit 34 adjusts the size of the new moving destination area 74 to the size acquired from the setting list 55 (S35). The setting field display unit 36 sets the size of the new moving destination area 74 determined in step S35 to the item of the size of the new designation (Designation 2) of the setting list 55. The preview displaying unit 23 changes the moving destination area to the size of the new moving destination area set in the setting list 55 and displays the new moving destination area.

SUMMARY

As described above, in the printing system 100 according to the present embodiment, in the work in which the user calls a printer driver on an ordinary application and designates the specific color area 72 and the moving destination area 74, even without providing the image forming apparatus 30 capable of designating the specific color and/or an application capable of designating the specific color, printing using the specific color can be implemented. When the user enters the size of the moving destination area 74, the size of the moving destination area 74 (the designated image 71) can be changed.

Second Embodiment

The present embodiment further describes a printing system 100 capable of efficiently designating the moving destination area by the user.

In the present embodiment, the hardware configuration diagram of FIGS. 5 and 6 and the functional block diagram of FIGS. 7 and 8 described in First Embodiment will be described as a reference.

<About Preview Screen of this Embodiment>

Figure 29:
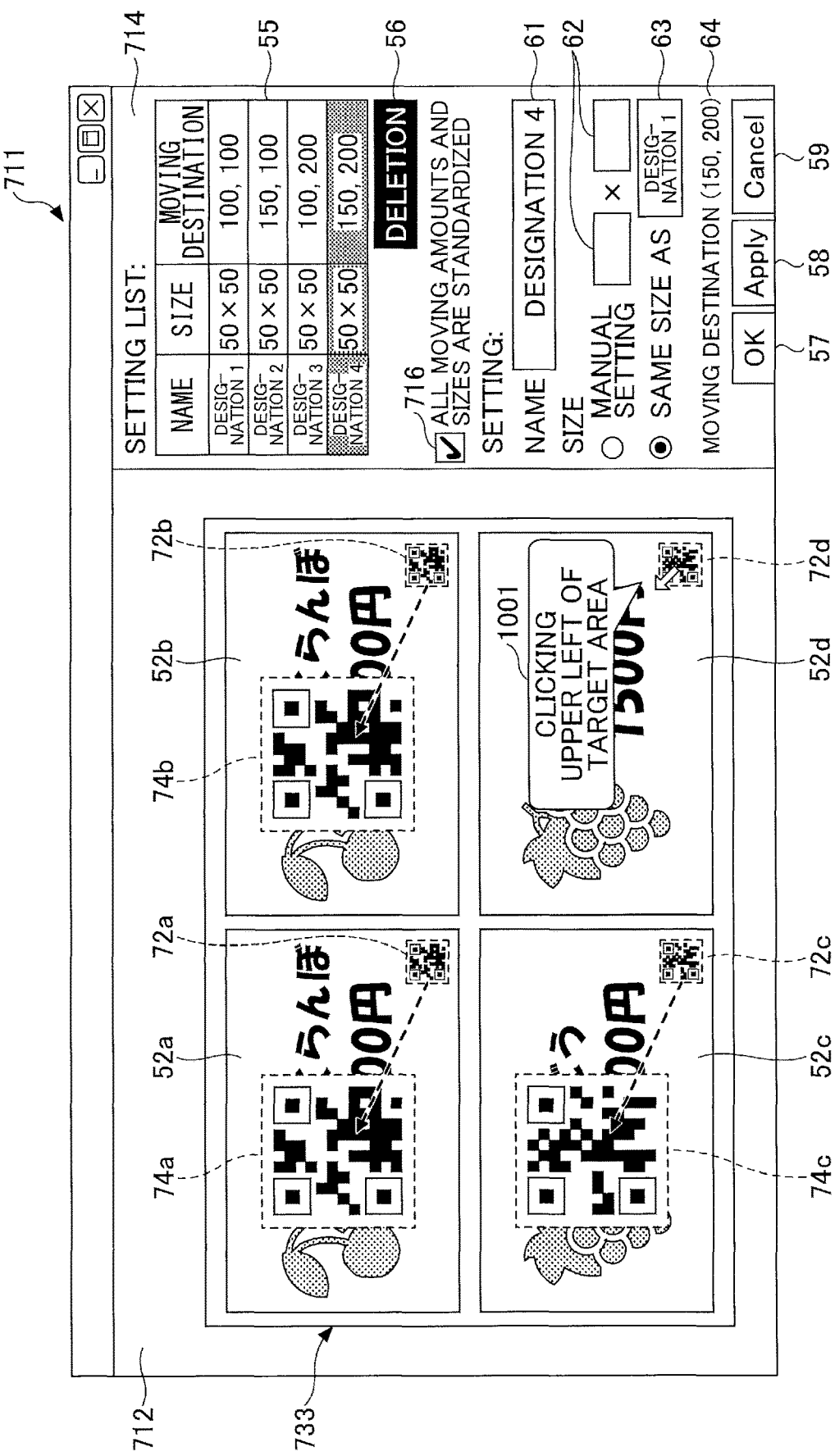
FIG. 29 is a view illustrating an example of a preview screen of a second embodiment.

FIG. 29 illustrates an example of the preview screen 711 of the present embodiment. In the description of FIG. 29, because the components having the same reference numerals in FIG. 14 perform the same function, only the main components of the present embodiment may be described. In the preview screen 711 of FIG. 29, a check box 716 is provided in the setting field 714 to accept that "all travel amounts/sizes are standardized".

The user enters "Designation 1" in the identification information designation field 63 while designating the coordinates and sizes of the moving destination area 74 for at least one of the original image 52 (three original images 52a to 52c have been set in FIG. 29). Designation 1 designates the specific color area 72a and the moving destination area 74a, as references. The user enters checks into a checkbox 716 of the "all moving amounts/sizes" and depresses the upper left corner of the specific color area 72d (the specific color area in which the destination is required) with the pointing device according to a message 1001. The upper left corner is an example and can be clicked at a predetermined location for the specific color area 72, such as the lower left corner.

The operation receiving unit 24 receives the coordinates of the upper left corner of the specific color area 72d, and the size changing unit 34 applies the same size and a relative position as Designation 1 set in the identification information designation field 63 to the specific color area 72d. For this reason, the setting field display unit 36 does not overlap the name of the new record of the setting list 55 and sets the same size as Designation 1 in a size item, and sets the coordinates of the upper left corner of the moving destination area 74d that is determined at the relative positions of the specific color area 72a of Designation 1 and the moving destination area 74a in the moving destination item.

The setting field display unit 36 displays "Designation 4" in the name entry field 61. the moving destination field 64 sets the coordinates of the moving destination area 74d determined based on the relative position.

Figure 30:
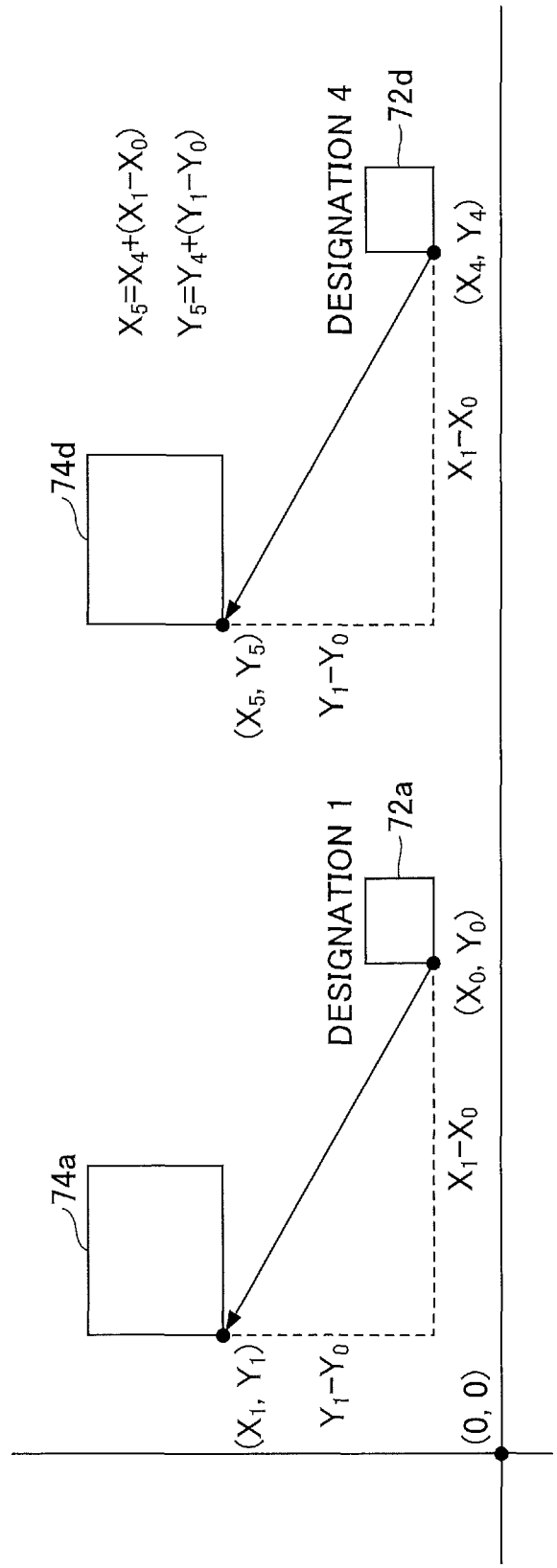
FIG. 30 is a diagram illustrating a relative position of a specific color area and a moving destination area.

FIG. 30 is a diagram illustrating a relative position of the specific color area 72 and the moving destination area 74 in accordance with FIG. 30. There is a difference in the relative positions of "X1−X0" in the X direction and "Y1−Y0" in the Y direction from the coordinates of the specific color area 72a and the moving destination area 74a with respect to Designation 1. When this difference exists in Designation 4, it is considered that the user uses the identification information designation field 63. Therefore, if the user designates the specific color area 72d of Designation 4, the coordinates (X4, Y4) of the moving destination area 74d of Designation 4 are determined. Therefore, the coordinates (X5, Y5) of the moving destination area 74d can be obtained as follows.

$$X5=X4+(X1-X0)$$

$$Y5=Y4+(Y1-Y0)$$

Figure 31:
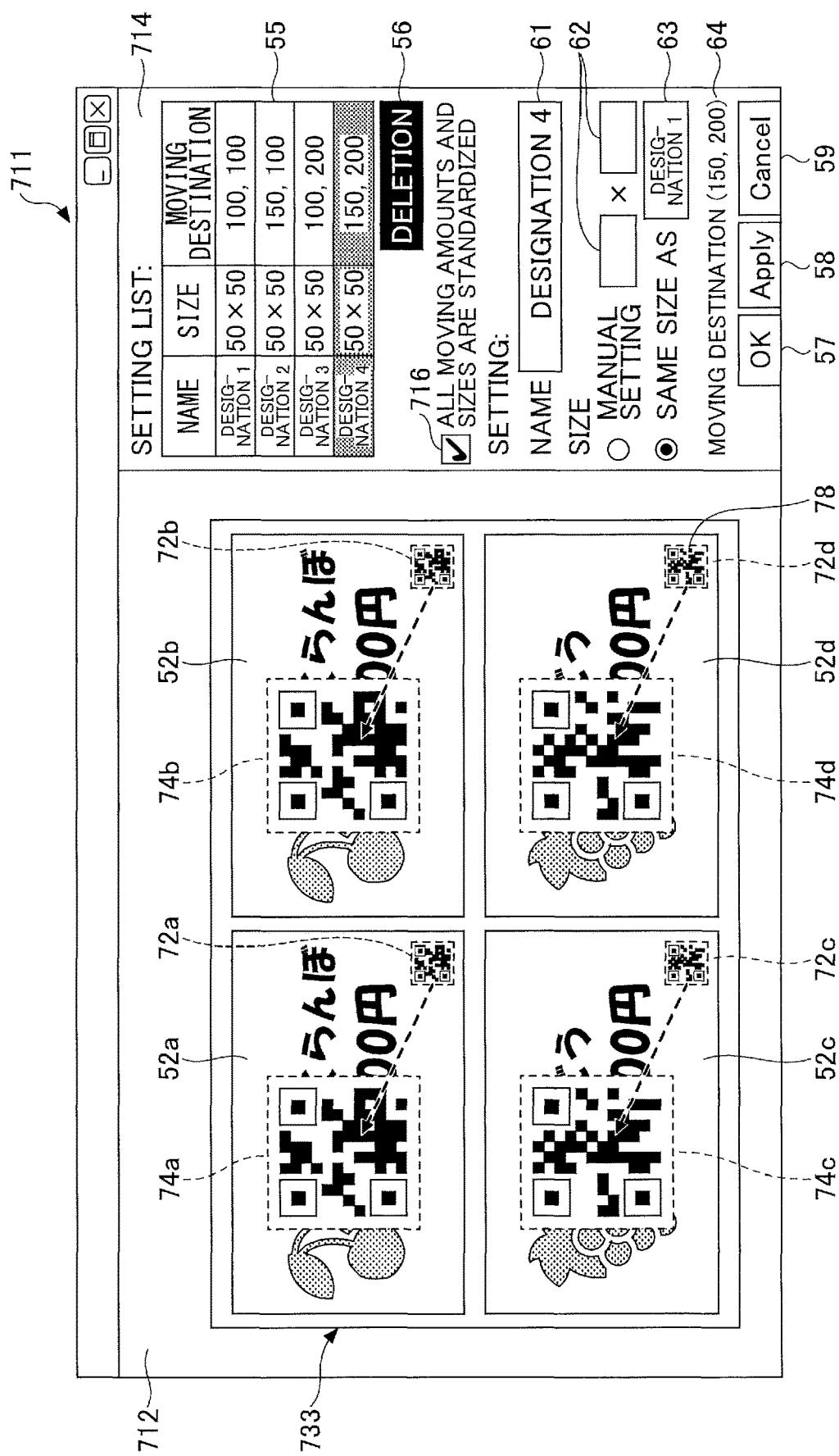
FIG. 31 is a diagram illustrating an example of a preview screen displaying the moving destination area in the original image.

FIG. 31 illustrates a preview screen 711 in which the moving destination area 74d is displayed on the original image 52d. As illustrated in FIG. 31, the setting field display unit 36 sets the coordinates (X5, Y5) of the moving destination area 74d calculated on the basis of the relative position as the item of the moving destination designated 4 in the setting list 55. The item of the size may be the same as that of specification 1.

Because the size of the specific color area 72a of Designation 1 causes the size of the specific color area 72d of Designation 4 to be determined, the preview displaying unit 23 can specify the specific color area 72d of the original image 52d and highlight it with a border 78. Further, the preview displaying unit 23 displays the moving destination area 74d on the original image 52d based on the size and destination of the designation 4 in the setting list 55. In this way, the moving destination area can be designated in a small number of steps when many original images 52 are handled by the user, such as 40 planes in the same layout.

<Operation Procedure>

Figure 32:
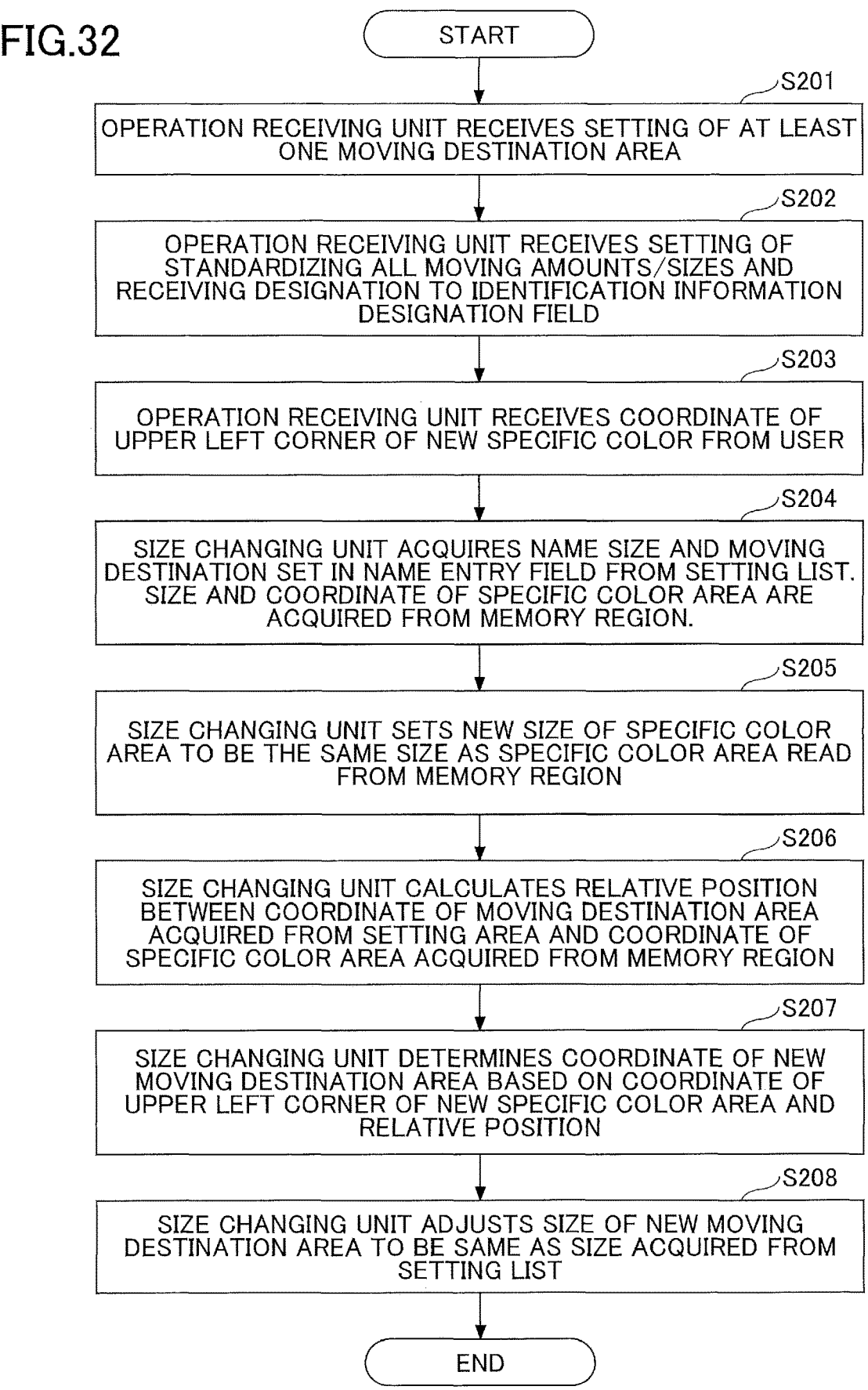
FIG. 32 is a flowchart illustrating details of the process performed by the preview application in Steps S2 to S3.1 in FIG. 9 (second embodiment).

Because the overall flow of operation may be the same as that of FIG. 9, the process performed by the previewer application will be described. FIG. 32 is a flowchart illustrating details of the process performed by the preview application in steps S2 to S3.1 of FIG. 9.

First, as described in First Embodiment, the operation receiving unit 24 accepts the setting of one or more destination areas 74 (S201).

In addition, the operation receiving unit 24 receives the setting (check box 716) that unifies all travel amounts/sizes and accepts the designation of a name in the identification information designation field 63 (S202).

Next, the operation receiving unit 24 accepts the coordinates of the upper left corner of the new specific color area 72d designated by the user as the pointing device (S203).

The size changing unit 34 acquires the size of the designated 1 set in the name input field 61 and the moving destination from the setting list 55 (S204). The size and coordinates of the specific color area 72a of this name are acquired from the temporary storage region 14b.

The size changing unit 34 sets the size of the new specific color area 72d to the same size as the specific color area 72a read from the temporary storage region 14b (S205).

The size changing unit 34 computes a relative position from the coordinates of the moving destination area 74a acquired from the setting list 55 and the coordinates of the specific color area 72a acquired from the temporary storage region 14b (S206).

The size changing unit 34 determines the coordinates of the new moving destination area 74d based on the coordinates and relative positions of the upper left corner of the new specific color area 72d (S207).

The setting field display unit 36 adjusts the size of the new moving destination area 74d to the size of the moving destination area 74a acquired from the setting list 55 (S208). The preview displaying unit 23 changes the size of the moving destination area 74d based on the changed size and displays it.

SUMMARY

According to the present embodiment, in addition to the effect of the first, the moving destination area can be designated in a small number of procedures when many original images 52 are handled by the user, such as 40 planes in the same layout.

Third Embodiment

In the present embodiment, a printing system capable of determining whether the magnified designated image 71 can be read by the reading device will be described. In this way, it is possible to prevent the image forming apparatus from printing while the designated image is deteriorated due to the magnification and cannot be read.
<Function>

Figure 33:
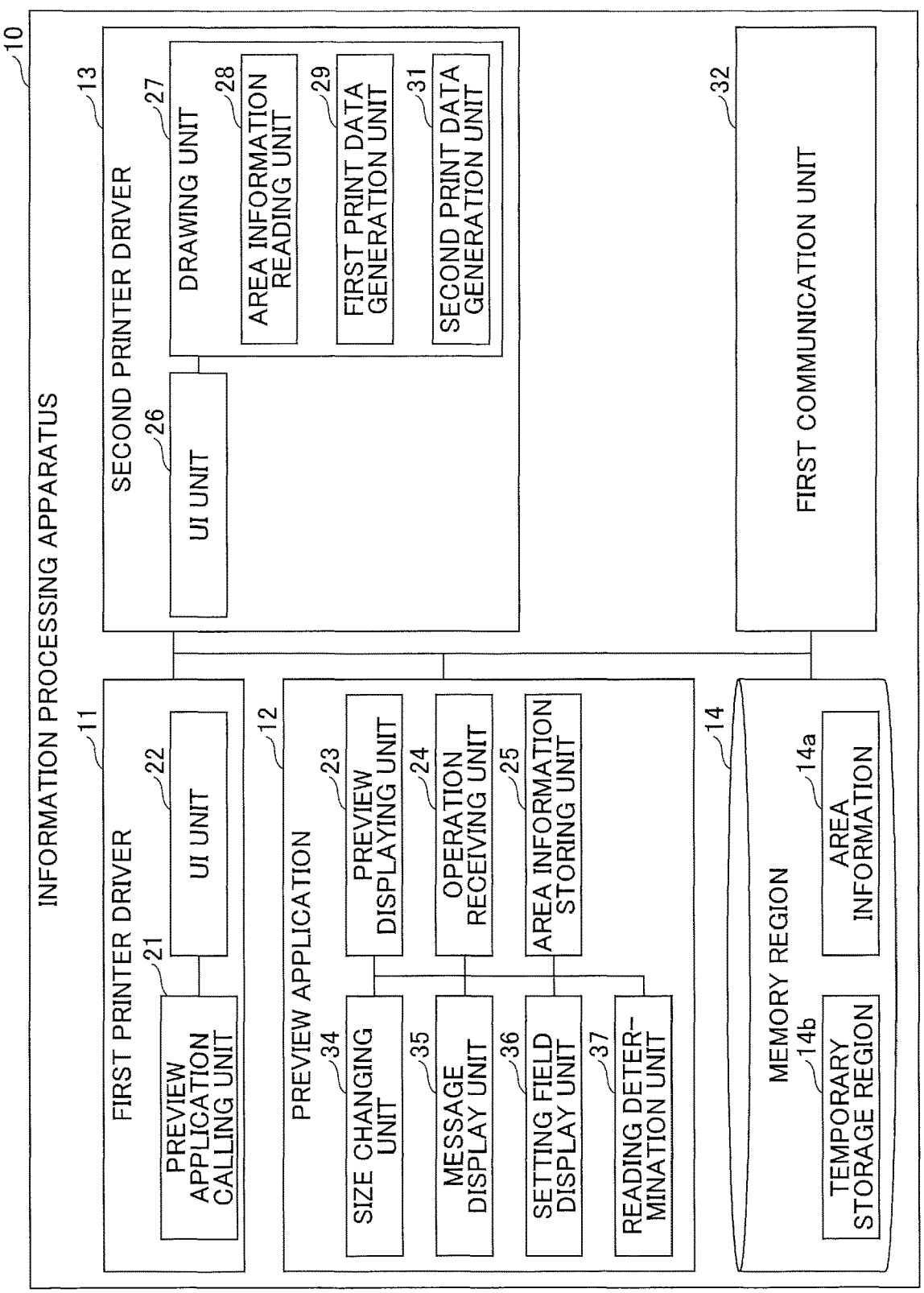
FIG. 33 illustrates an example of a functional block diagram illustrating the functions of an information processing apparatus by dividing into blocks (third embodiment).

Because the function of the image forming apparatus may be the same as that of the first embodiment, the function of the information processing apparatus 10 will be described. FIG. 33 is an example of a functional block diagram showing the functions of an information processing apparatus according to the present embodiment in a block-like manner. With reference to the description of FIG. 33, because the identically signed components of FIG. 7 perform similar functions, only the main components of the present embodiment may be described.

The preview application 12 according to the present embodiment includes a reading determination unit 37. The reading determination unit 37 determines whether the designated image 71 can be read by the read device by attempting to read (decode). For example, in the case of a two-dimensional code, it is judged whether the logging symbol can be detected, the timing pattern can be detected, the alignment pattern can be detected, and the format information (error correction function) can be detected to determine whether it can be read. If the information can be read, some information can be decoded. Therefore, the reading determination unit 37 determines that it can be read when some information can be decoded. When it is determined that a specific information (such as a predetermined character string) is included in the image code, it may be determined that the image code was read when the information is included.
<About the Preview Screen of this Example>

Figure 34:
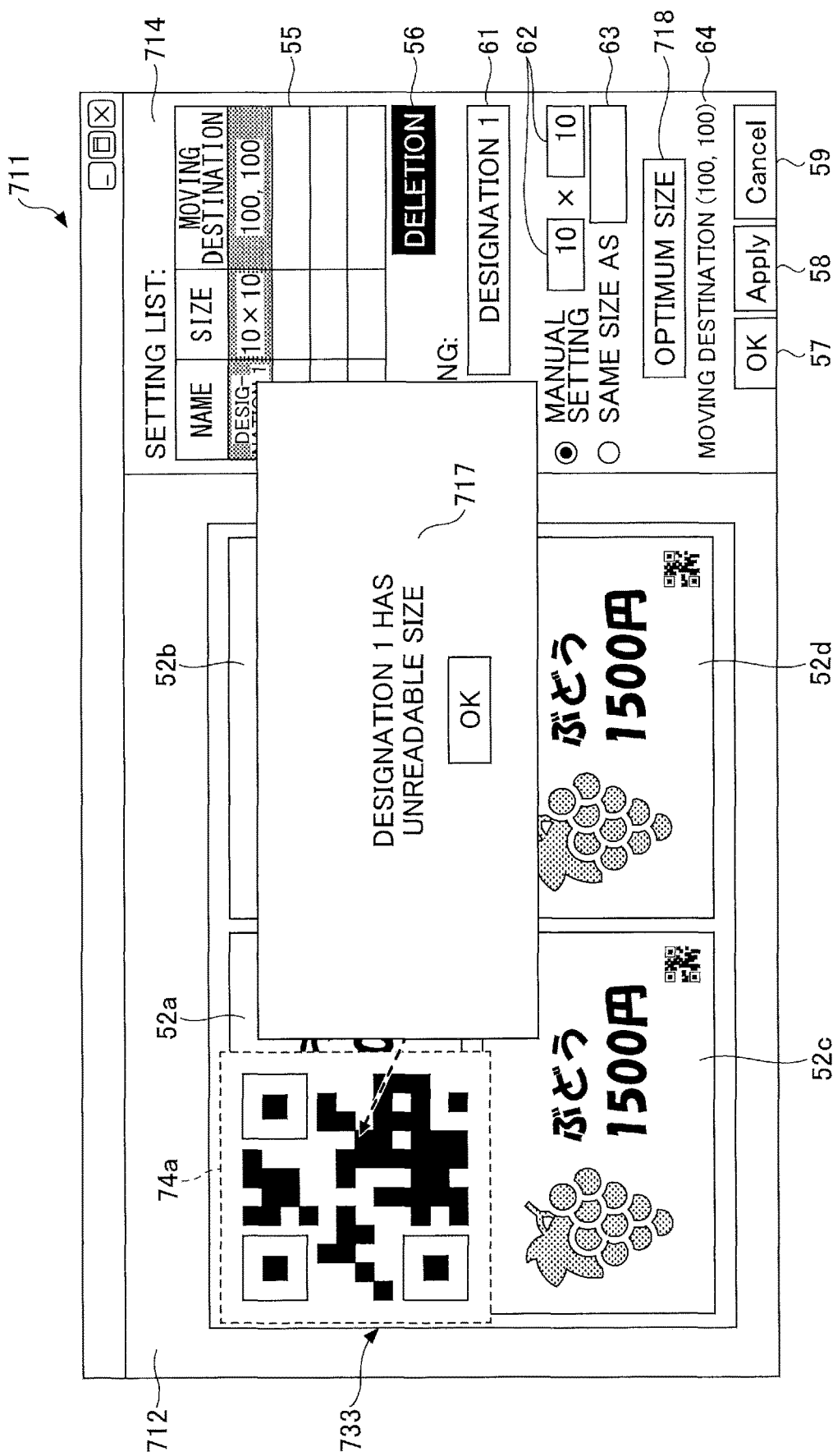
FIG. 34 is a diagram illustrating an example of a preview screen of the third embodiment.

FIG. 34 shows an example of a preview screen 711 of the present embodiment. In the description of FIG. 34, because the components having the same reference numerals in FIG. 14 perform the same function, only the main components of the present embodiment may be mainly described.

In FIG. 34, one record is set in the setting list 55. When the moving destination area 74 is not out of the document 733, after the display of the moving destination area 74, when the moving destination area 74 is out of the document 733, the size changing unit 34 adjusts the size of the moving destination area 74, displays the moving destination area 74, and then determines whether the read determining unit 37 can read the designated image.

In FIG. 34, because the reading determination unit 37 determines that the designated image cannot be read, the message display unit 35 displays a message 717 stating "the size of Designation 1 that cannot be read". Accordingly, the user may re-enter the size of the moving destination area 74.
<Operation Procedure>

Figure 35:
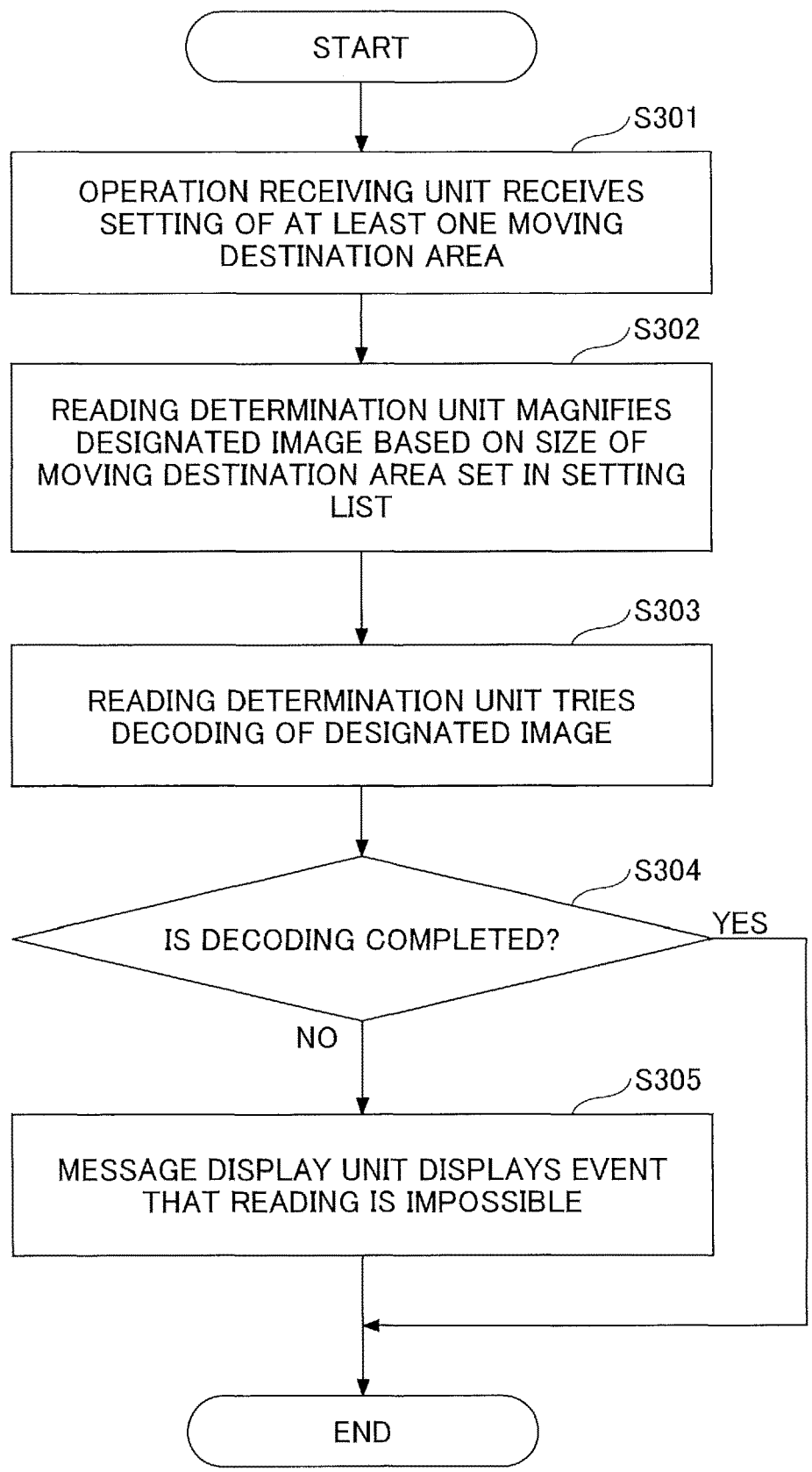
FIG. 35 is a flowchart illustrating details of the process performed by the preview application in Steps S2 to S3.1 in FIG. 9 (third embodiment).

Because the overall flow of operation may be the same as that of FIG. 9, the process performed by the previewer application will be described. FIG. 35 is a flowchart illustrating details of the process performed by the preview application in steps S2 to S3.1 of FIG. 9.

First, as described in Example 1, the operation receiving unit 24 accepts the setting of one or more destination areas 74 (S301).

The reading determination unit 37 magnifies the designated image 71 based on the size of the moving destination area 74 set in the setting list 55 (S302). The size is adjusted if it is out of the document 733.

The reading determination unit 37 attempts to decode the magnified designated image 71 (S303). The reading determination unit 37 determines whether the reading was read (whether decoding was possible) (S304).

When the message display unit 35 cannot be read, the message display unit 35 cannot read (S305).

SUMMARY

According to the present embodiment, in addition to the effect of the first embodiment, it is possible to suppress printing while the designated image is deteriorated due to the magnification and cannot be read.

In the present embodiment, it is determined whether the image code can be read, but the reading determination unit 37 may determine whether the characters, numbers, alphabets, or symbols can be read. In this case, the reading determination unit 37 performs OCR (Optical Character Recognition) on the designated image 71 to determine whether the conversion probability is equal to or more than the threshold value.

Fourth Embodiment

In the present embodiment, a printing system that gradually magnifies the designated image 71 and magnifies the maximum designated image 71 that can be read by the reading device will be described. This reduces the user's trouble of finding the size of the moving destination area 74 by trial and error, and avoids the size of being small enough to be printable, such as collapsing details during printing.

In the present embodiment, a functional block diagram of FIG. 33 described in Example 3 will be described as a reference.
<About the Preview Screen of this Example>

Figure 36:
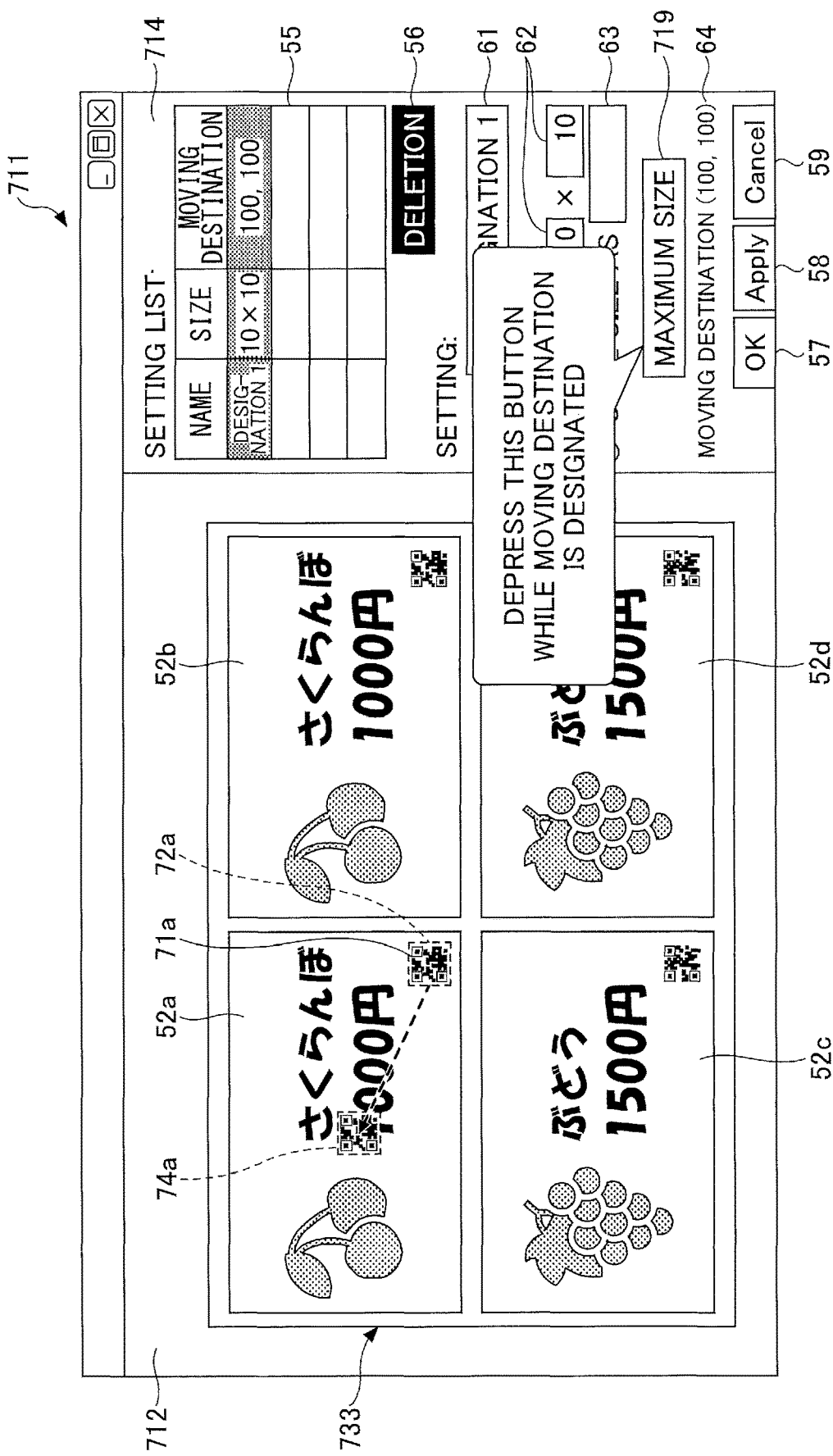
FIG. 36 is a view illustrating an example of a preview screen according to Example 4.

FIG. 36 shows an example of a preview screen of the present embodiment. In the description of FIG. 36, because the components having the same reference numerals in FIG. 14 perform the same function, only the main components of the present embodiment may be mainly described.

In FIG. 36, a setting field 714 has a maximum size button 719. The maximum size button 719 is a button for automatically magnifying the moving destination area 74 to the maximum designated image that the size changing unit 34 can read. When the maximum size button 719 is depressed, the reading determination unit 37 magnifies the designated image by a constant amount so that the document 733 does not protrude, and determines whether the reading determination unit 37 can read. The size changing unit 34 then multiplies (in many cases magnifies) the moving destination area 74 with the maximum magnification that can be read.

Figure 37:
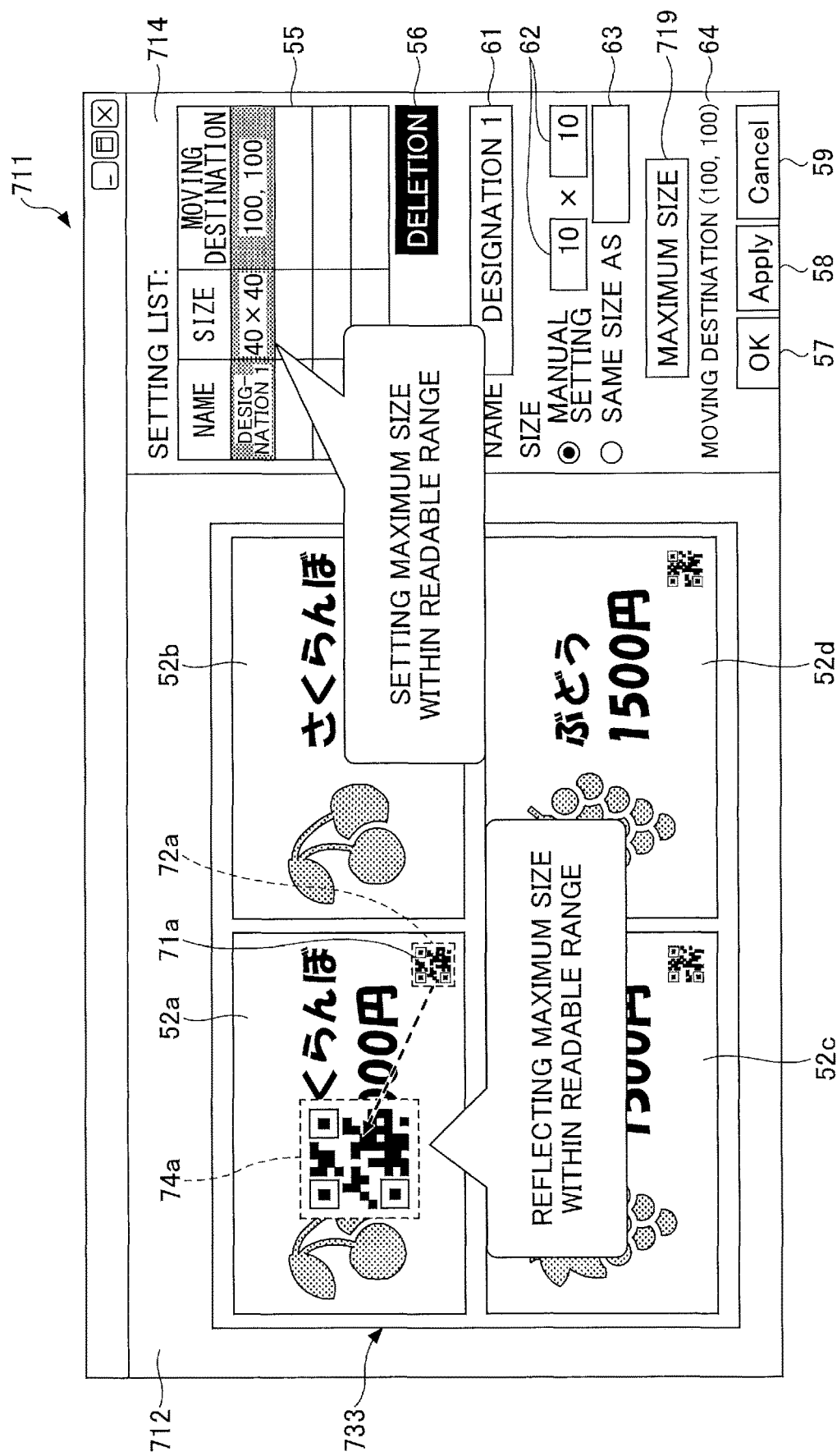
FIG. 37 illustrates an example of a preview screen displaying the moving destination area magnified at the maximum magnification that the size changing unit can read.

FIG. 37 shows a preview screen 711 in which the moving destination area 74 is magnified with the maximum magnification that the size changing unit 34 can read. The user performs the operation of specifying the moving destination area 74 and depresses the maximum size button 719. Thus, the user can magnify the moving destination area 74 to the optimum size without specifying a size in the size entry field 62. The size of the set-up list 55 is indicated by the size determined in this manner.

<Operation Procedure>

Figure 38:
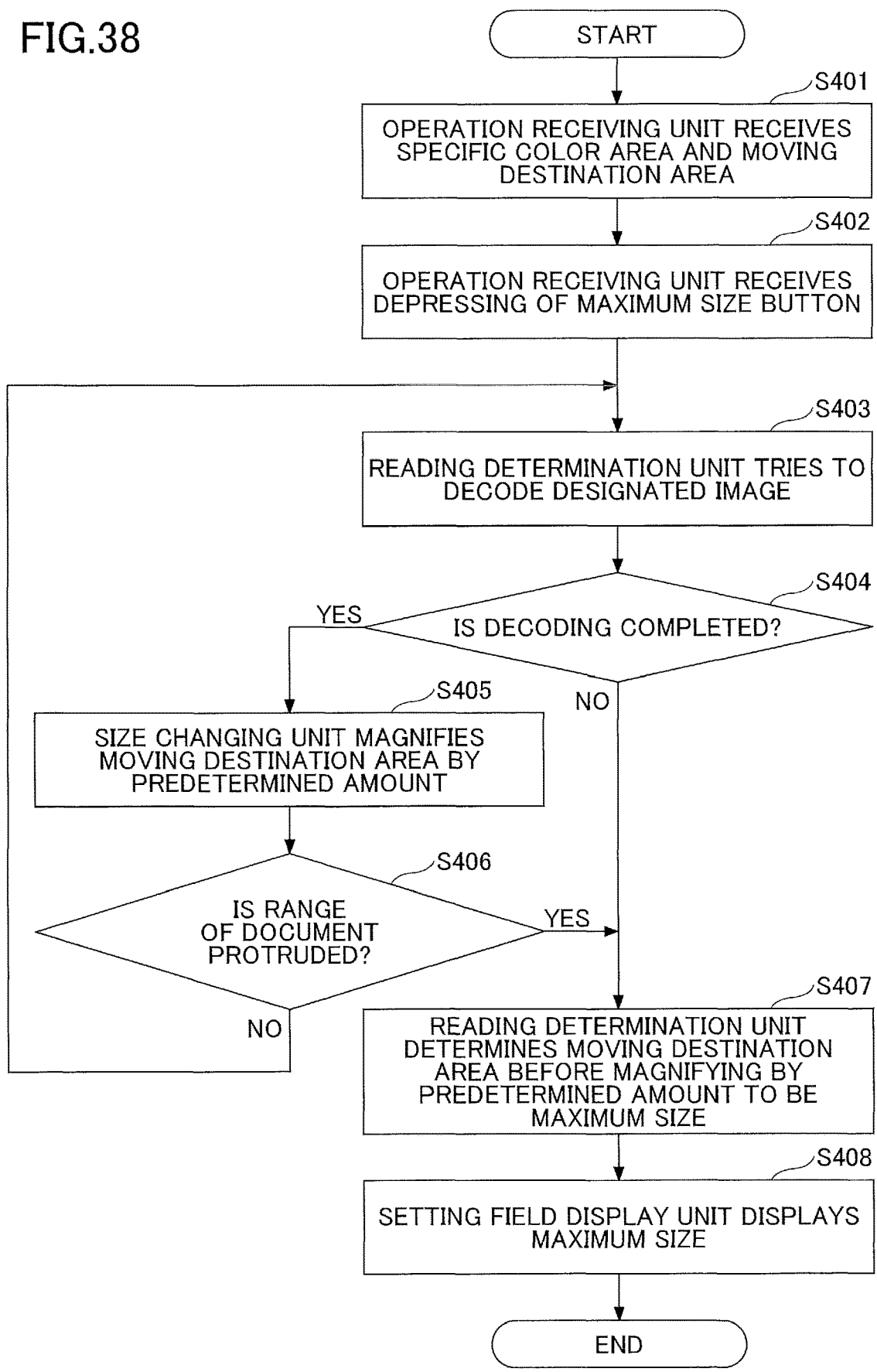
FIG. 38 is a flowchart illustrating details of the process performed by the preview application in Steps S2 to S3.1 in FIG. 9 (fourth embodiment).

Because the overall flow of the operation may be the same as that of FIG. 9, the process performed by the preview application 12 will be described. FIG. 38 is a flowchart illustrating details of the process performed by the preview application 12 in steps S2 to S3.1 of FIG. 9. This process repeats whether a reading determination unit 37 can read the moving destination area 74 by gradually increasing the size.

First, the operation receiving unit 24 receives the designation of the specific color area 72 and the moving destination area 74 (S401). The user need not set the size of the moving destination area 74.

Further, the operation receiving unit 24 receives the depressing of the maximum size button 719 (S402).

First, the reading determination unit 37 attempts to decode the designated image 71 (S403). The reading determination unit 37 determines whether decoding was possible (whether reading was possible) (S404). If the data cannot be read, the process proceeds to step S407.

When the image is read, the reading determination unit 37 magnifies the moving destination area 74 (the designated image 71 is also magnified) by a constant amount (S405). For example, increase by 5 percent.

Next, the size changing unit 34 determines whether the moving destination area 74 exceeds the range of the document 733 (S406). If the moving destination area 74 is not beyond the scope of document 733, the process returns to step S403.

When the moving destination area 74 exceeds the range of the document 733, the reading determination unit 37 determines a fixed amount of the moving destination area 74 to be the maximum size.

The setting field display unit 36 displays the maximum size in the item of the size of the setting list 55 (S408). The coordinates of the moving destination area received by the operation receiving unit 24 are set in the item of the moving destination in the setting list 55.

In the process of FIG. 38, the case in which the designated image 71 is too small to be read is not described. However, as a method to deal with the case in which the designated image 71 is too small, there is a method in which the designated image 71 is magnified to the minimum size in step S403, for example. Alternatively, when the number of magnifications is recorded by the reading determination unit 37 and the number of magnifications is less than the threshold value and cannot be decoded, there is a method of continuing the magnifications.

SUMMARY

According to the present embodiment, in addition to the effect of the first embodiment, it is possible to reduce the amount of trouble for the user to find the size of the moving destination area which can be read by trial and error, and it is possible to avoid the size of the size which cannot be printed, such as collapse of details due to printing.

Fifth Embodiment

The present embodiment will be described with reference to a printing system that can magnify the image to the maximum designated image that can be read by the reading device even when the surface is set. This reduces the user's difficulty in finding the size of the moving destination area by trial and error, and also avoids the size of the moving destination area that cannot be printed, such as collapsing details during printing.

<Function>

Figure 39:
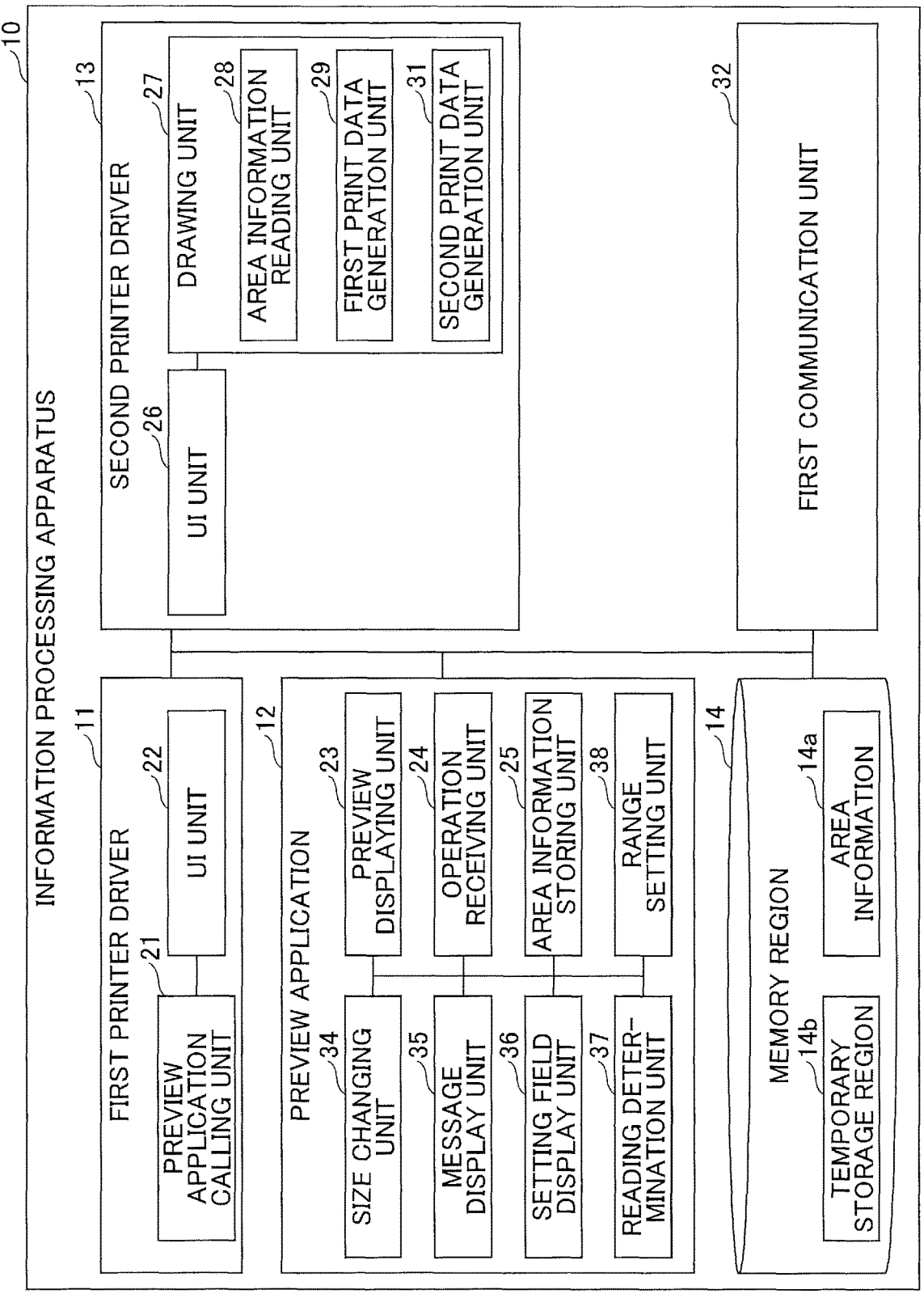
FIG. 39 illustrates an example of a functional block diagram illustrating the functions of the information processing apparatus according to the fifth embodiment by dividing into blocks.

Because the function of the image forming apparatus may be the same as that of the first embodiment, the function of the information processing apparatus will be described. FIG. 39 is an example of a functional block diagram showing the functions of the information processing apparatus according to the present embodiment in a block-like manner. With reference to the description of FIG. 39, the identically signed components of FIG. 33 perform similar functions and may be described primarily only with respect to the main components of the present embodiment.

The preview application 12 according to the present embodiment includes a range setting unit 38. The range setting unit 38 notifies the reading determination unit 37 of the range of one original image 52 when the document 733 is imposed so that the reading determination unit 37 can magnify the moving destination area 74 within the range of the original image 52.

<About Preview Screen of this Embodiment>

Figure 40:
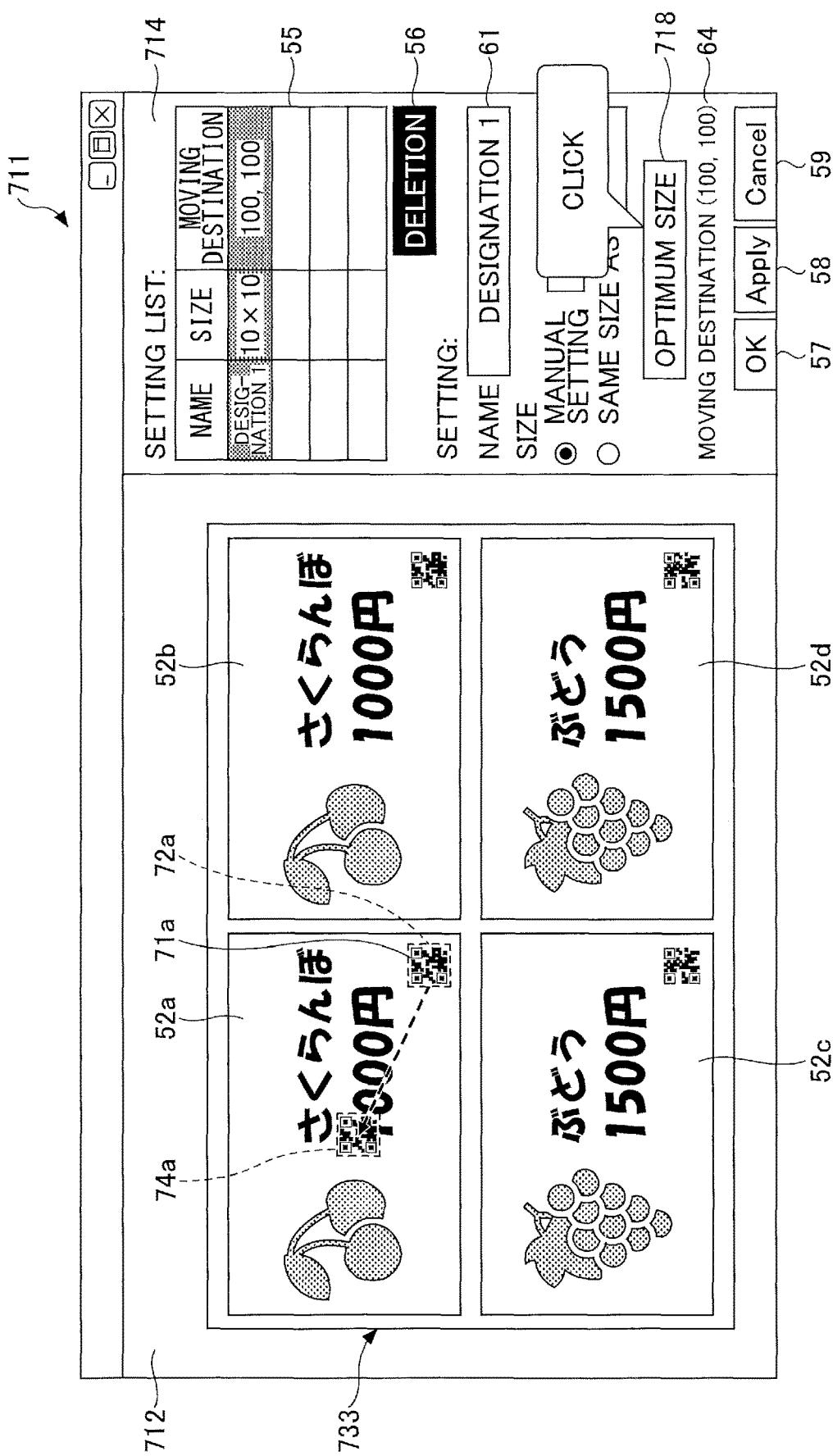
FIG. 40 is a view illustrating an example of a preview screen of a fifth embodiment.

FIG. 40 illustrates an example of a preview screen of the present embodiment. In the description of FIG. 40, because the components having the same reference numerals in FIG. 14 perform the same function, only the main components of the present embodiment may be mainly described.

In FIG. 40, a setting field 714 has an optimum size button 718. The optimum size button 718 is a button for inquiring the user whether the document 733 is imposed and for magnifying the moving destination area 74 to the maximum designated image that the reading device can read by automatically magnifying the reading determination unit 37 in each case where the range setting unit 38 is not imposed.

If it is not imposed, the process is similar to the fourth embodiment. When the image is imposed, the operation receiving unit 24 receives the range of the original image 52. Therefore, the reading determination unit 37 magnifies the designated image by a fixed amount so as not to protrude from the original image 52, and determines whether the reading determination unit 37 can read the image. Then, the size changing unit 34 multiplies (in many cases magnifies) the designated image with the maximum magnification that enabling to read.

Figure 41:
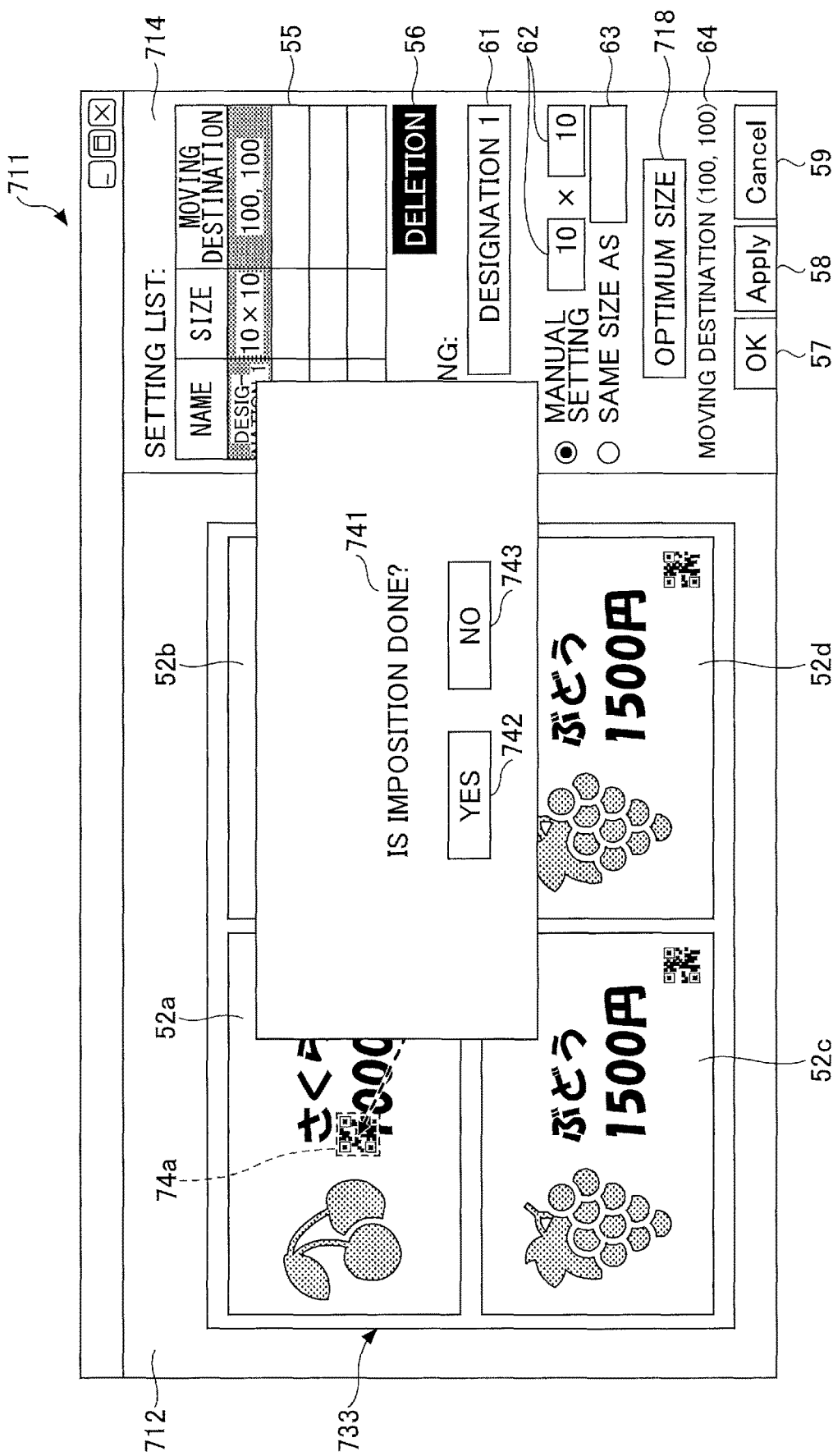
FIG. 41 is a diagram illustrating an example of a preview screen in which a message inquiring whether imposition is present is displayed.

FIG. 41 is a preview screen 711 in which a message 741 for inquiring whether the imposition is present. When the user displays message 741, first, the user designates the specific color area 72 and the moving destination area 74 for one original image 52. Next, when the optimum size button 718 is depressed, a message 741, a Yes button 742, and a No button 743 are displayed in which the range setting unit 38 displays "Is imposition done?". The operation receiving unit 24 receives the depression of the Yes button 742 and No button 743.

When the No button 743 is depressed, the reading determination unit 37 determines the optimum size of the moving destination area 74 in a range that does not protrude from the document 733 in a manner similar to the fourth embodiment. Therefore, the setting field display unit 36 displays the optimum size for the item of the size of the setting list 55.

Figure 42:
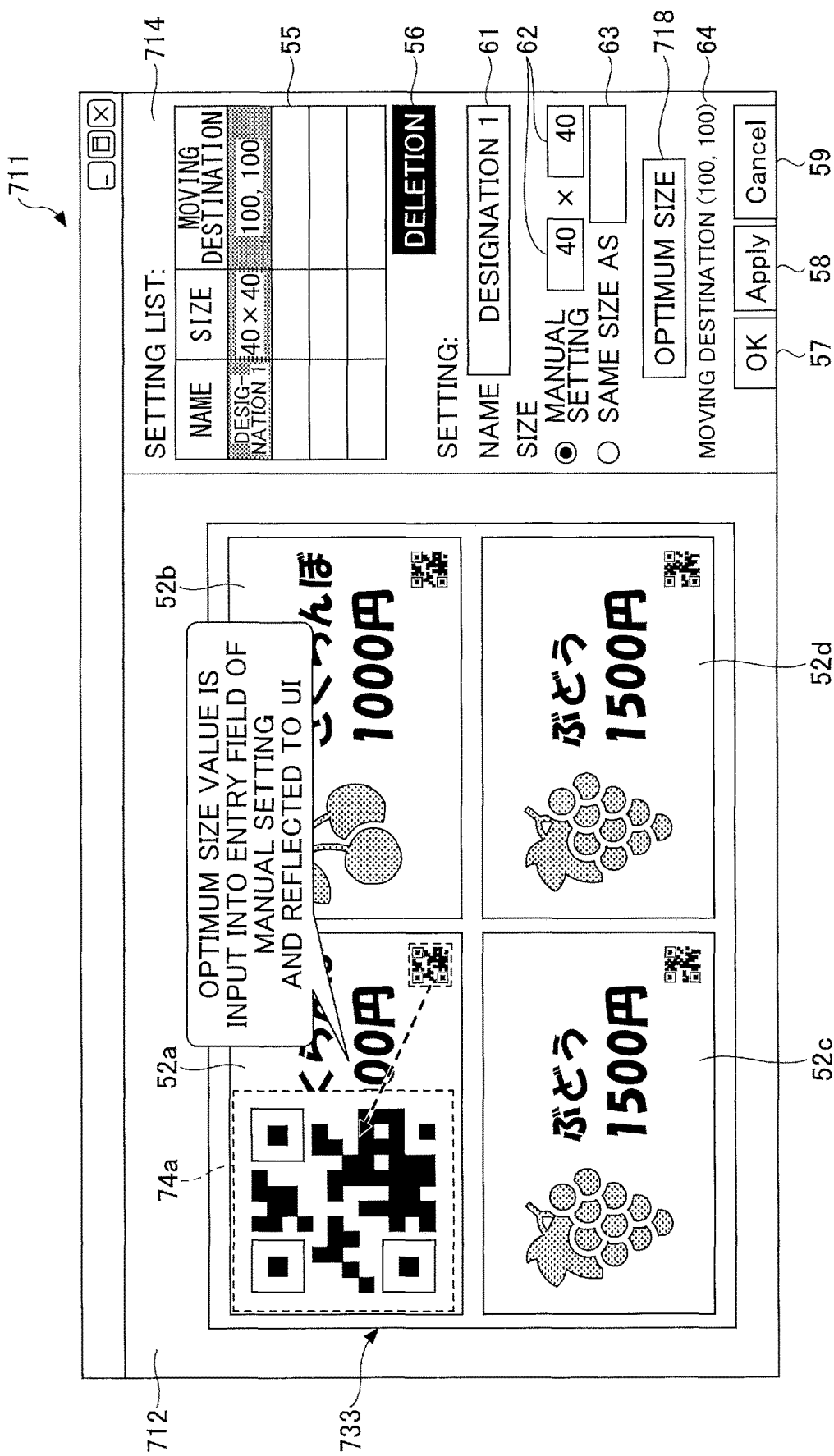
FIG. 42 is a diagram illustrating an example of a preview screen having the moving destination area magnified to the optimum size.

FIG. 42 is a preview screen 711 with the moving destination area 74 magnified to the optimum size. The optimum size is set for the item of size in the setting list 55. The moving destination area 74 is magnified and displayed.

Figure 43:
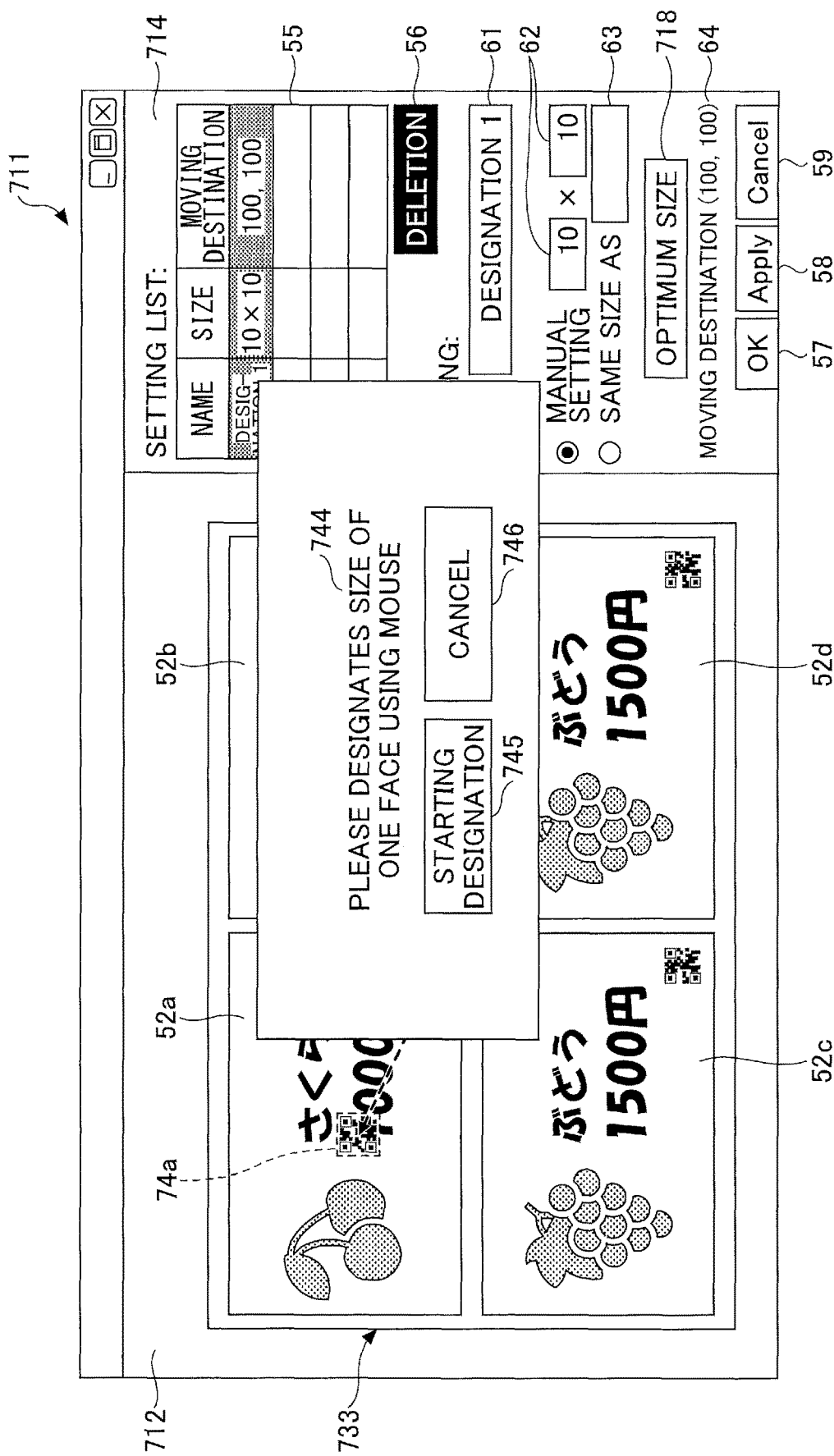
FIG. 43 illustrates an example of a preview screen displaying a message prompting to designate the range of the original image using a pointing device.

When the Yes button 742 is depressed, the range setting unit 38 displays a message 744 prompting to designate a range of one original image 52 using the pointing device. FIG. 43 is an example of a preview screen 711 in which a message 744 is displayed to prompt the range of the original image 52 to be designated by the pointing device. In FIG. 43, a message 744 stating "Please designates the size of the original image 52 using a mouse", a designation start button 745, and a cancel button 746 are included. When the user depresses the cancel button 746, the message 744 disappears and nothing is changed.

Figure 44:
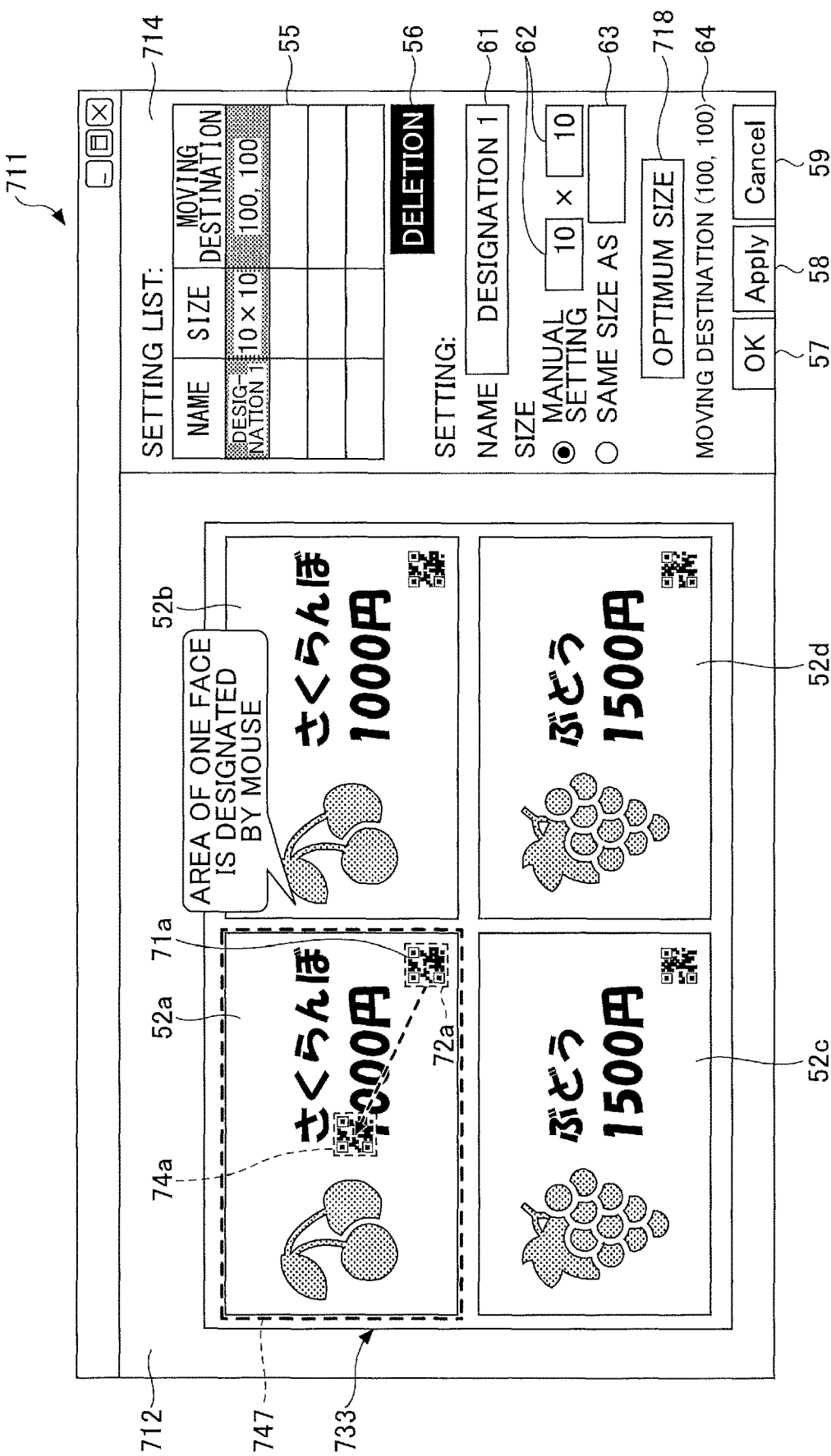
FIG. 44 is a diagram illustrating an example of a preview screen on which the range of the original image can be received.

When the user depresses the designation start button 745, the operation receiving unit 24 receives the depression. This allows the user to designate the range of the original image 52. FIG. 44 is an example of a preview screen 711 that can accept the range of the original image 52. The user designates the range of the one original image 52 by dragging with the mouse. The operation receiving unit 24 receives the range of the original image 52 on the preview screen. The range setting unit 38 displays a border line 747 representing the range of the original image 52.

Figure 45:
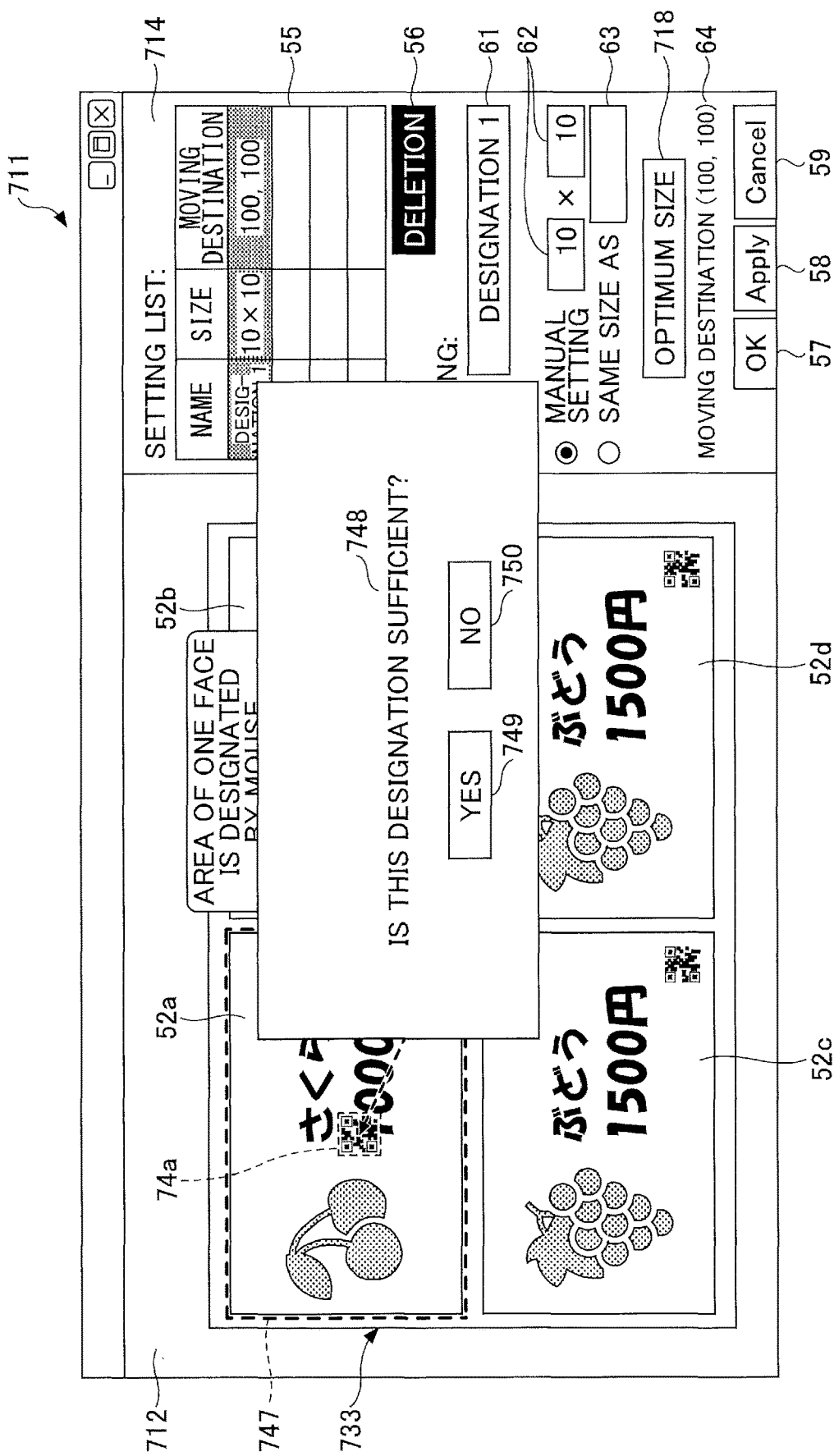
FIG. 45 is a diagram illustrating an example of a preview screen displaying a message for confirmation of designation.

When the operation receiving unit 24 receives the designation of the range of the original image 52, the range setting unit 38 displays the message 748 of a designation confirmation. FIG. 45 is an example of a preview screen 711 in which a message 748 for designation confirmation is displayed. In FIG. 45, there is a message 748, a Yes button 749, and a No button 750 stating, "Is this designation sufficient?". The operation receiving unit 24 receives the depression of the Yes button 749 or No button 750. When the Yes button 749 is depressed, the operation receiving unit 24 accepts the range of the original image 52 (confirmation), and when the No button 750 is depressed, the operation receiving unit 24 discards the range of the original image 52. In either case, the range setting unit 38 deletes the message 748.

When the Yes button 749 is depressed, the reading determination unit 37 magnifies the moving destination area 74 by a constant amount so as not to extrude from the original image 52 designated by the border line 747. Then, it is determined whether the reading determination unit 37 can read. The size changing unit 34 multiplies the designated image 71 with the maximum magnification that can be read.

Figure 46:
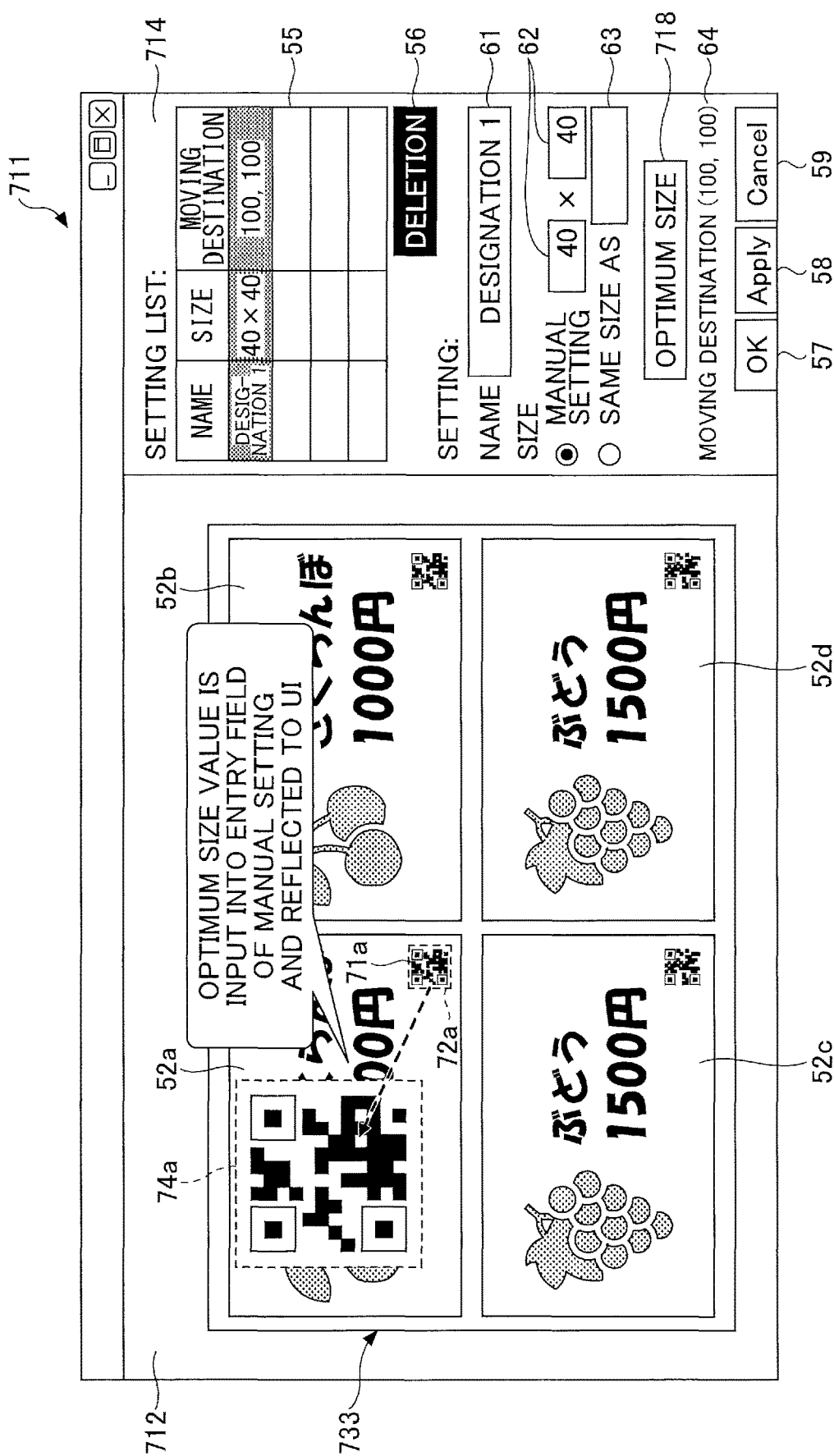
FIG. 46 illustrates an example of a preview screen in which the moving destination area is magnified to a range without protruding over the original image.

FIG. 46 is a preview screen in which the moving destination area 74 is magnified in a range that does not extrude from the original image 52. The setting field display unit 36 sets the optimum size to an item of the size of the setting list 55 and displays the optimum size. The preview displaying unit 23 magnifies the moving destination area 74 and displays it.

<Operation Procedure>

Figure 47:
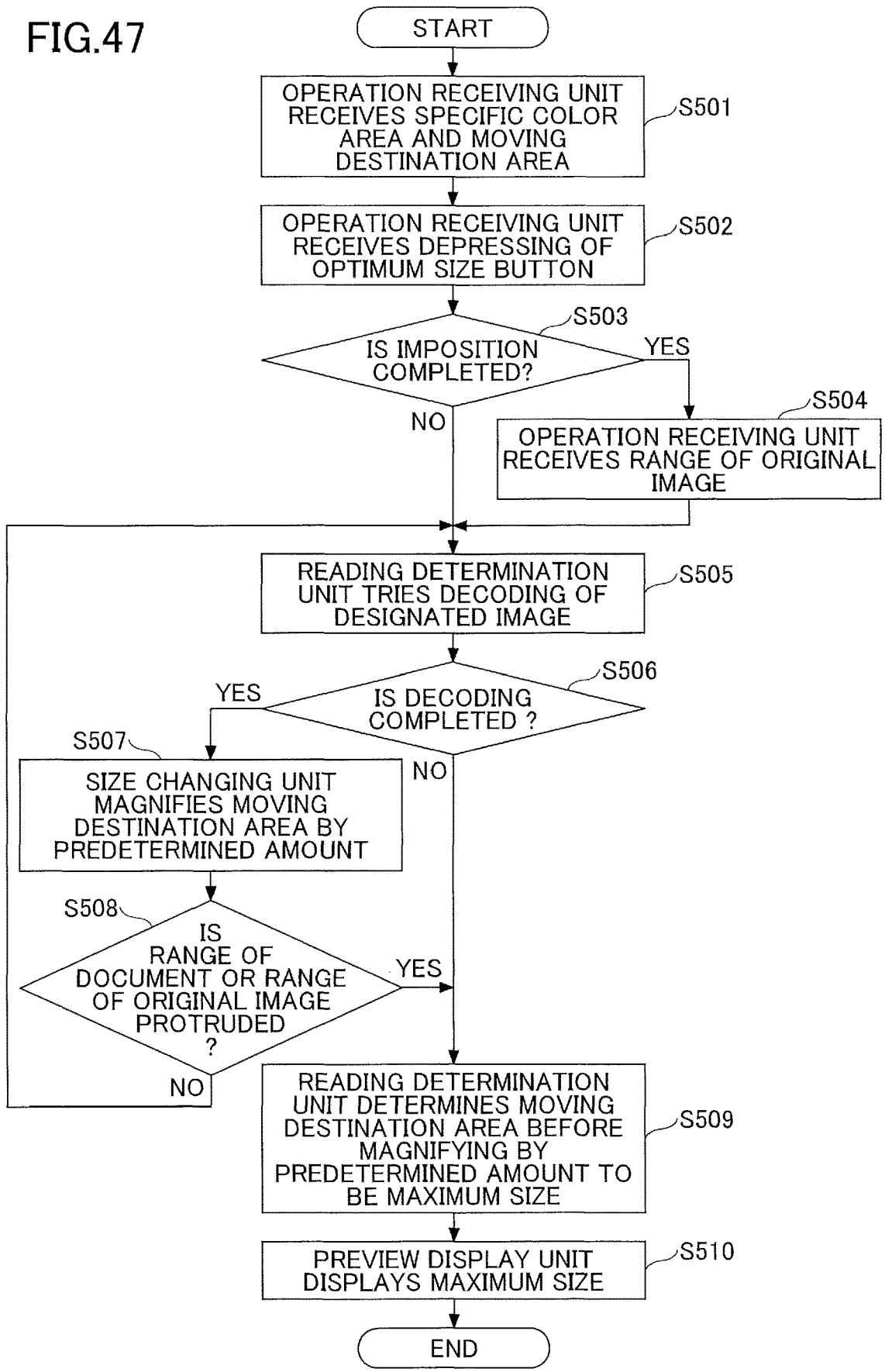
FIG. 47 is a flowchart illustrating details of the process performed by the preview application in Steps S2 to S3.1 in FIG. 9 (fifth embodiment).

Because the overall flow of operation may be the same as that of FIG. 9, the process performed by the preview application will be described. FIG. 47 is a flowchart illustrating details of the process performed by the preview application in steps S2 to S3.1 of FIG. 9.

First, the operation receiving unit 24 receives the designation of the specific color area 72 and the moving destination area 74 (S501).

Further, the operation receiving unit 24 receives the depression of the optimum size button 718 (S502).

The range setting unit 38 displays a message 741 inquiring whether imposition is present and receives whether the operation receiving unit 24 is imposed (S503).

When the operation receiving unit 24 is received as being imposed, the operation receiving unit 24 receives the range of the original image 52 (S504). The range setting unit 38 notifies the reading determination unit 37 of the range of the original image 52 received by the operation receiving unit 24.

Next, the reading determination unit 37 attempts to decode the designated image 71 (3505). The reading determination unit 37 determines whether decoding was possible (whether reading was possible) (3506). If the data cannot be read, the process proceeds to step S509.

When reading was possible, the reading determination unit 37 magnifies the moving destination area by a certain amount (3507). For example, the moving destination area is magnified by every 5 percent.

Next, the reading determination unit 37 determines whether the moving destination area 74 protrudes the range of the document or the range of the original image 52 (S508). If the moving destination area does not protrude from the scope of the document or the original image 52, the process returns to step S505.

When the moving destination area protrudes the range of the document or the range of the original image, the reading determination unit 37 determines the moving destination area before the magnification to be the optimum size (S509).

The setting field display unit 36 displays the optimum size in the item of the size of the setting list 55 (S510). The coordinates of the moving destination area 74 received by the operation receiving unit 24 are set as items of the moving destination in the setting list 55.

SUMMARY

According to the present embodiment, in addition to the effect of the first exemplary embodiment, it is possible to reduce the amount of trouble for the user to find the size of the moving destination area which can be read by trial and error, and it is possible to avoid the size which cannot be printed, such as collapse of details due to printing.

<Other Applications>

While the preferred embodiment of the present invention has been described with reference to examples, various modifications and substitutions may be made thereto without departing from the spirit and scope of the invention.

For example, although transparent toner is printed on visible light in this embodiment, colors other than C, M, Y, K, such as gold, silver, or white may be printed.

In the present embodiment, the designated image 71 printed with the specific color is described in the document to be printed, but the designated image 71 printed with the specific color may be prepared as a document other than the document to be printed. In this case, plug-in printing may be used. In this case, the user writes the file name of an object in another document and saves the file of the object with the same file name. The object can be printed anywhere in the document to be printed by performing insert printing with the file name specified in the document to be printed. It is useful if you want to print multiple documents but to differ the objects of each document.

In this embodiment, printing is mainly performed using an electrophotographic technique. However, the present invention is also suitably applied to a printing device using an ink jet technique for ejecting droplets.

Further, a configuration example of FIGS. 7 and 8 is divided according to a main function in order to facilitate understanding of processing by the information processing apparatus 10 and the image forming apparatus 30. The invention is not limited by the way the processing unit is divided or its name. Further, the process performed by the information processing apparatus 10 and the image forming apparatus 30 can be further divided into a greater number of processing units according to the processing contents. Alternatively, one processing unit can be split to include more processes.

The functions of the embodiments described above may also be implemented by one or more processing circuits. As used herein, a "processing circuit" includes a processor programmed to perform each function by software, such as a processor implemented by electronic circuits, an ASIC (Application Specific Integrated Circuit) designed to perform each function as described above, a digital signal processor (DSP), a field programmable gate array (FPGA), or a conventional circuit module.

DESCRIPTION OF SYMBOLS

10: Information processing apparatus
30: Image forming apparatus
72: Specific color area
74: Moving destination area
100: Printing system It is possible to print a specific color without a need for an application that can designate the specific color.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority or inferiority of the invention. Although the program, Information processing apparatus, image forming apparatus, and printing system have been described in detail, it should be understood that various changes, substitutions, and alterations could be made thereto without departing from the spirit and scope of the invention.

The order of the method of the embodiment of the present invention is not limited to the order of processes of the method disclosed by this disclosure.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device.

The computer software can be provided to the programmable device using any storage medium for storing processor readable code such as a floppy disk, hard disk, CD ROM, magnetic tape device or solid state memory device.)

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

What is claimed is:

1. A non-transitory recording medium for an information processing apparatus having a computer program that, when executed by a hardware circuitry of the information processing apparatus, causes the information processing apparatus to request an image forming apparatus to print a document by executing processes of:
    receiving data of the document to be printed;
    receiving a position, a size, and a moving destination area of a specific color area that is printed with a specific color; and
    causing the information processing apparatus to display a setting field that enables setting of the size of the specific color area;
    changing a size of the moving destination area to the size of the specific color area set in the setting field;
    displaying the moving destination area at the changed size of the moving destination area; and
    sending information of the specific color area including die received position and the size of the specific color area and received data of the document to the image forming apparatus, the size of the specific color area sent to the image forming apparatus being the size set in the setting field.

2. The non-transitory recording medium according to claim 1, wherein
    the received size of the specific color area is a size of the specific color area at a time of printing.

3. The non-transitory recording medium according to claim 1, wherein the computer program further the information processing apparatus to:
    display a preview screen of the document to be printed.

4. The non-transitory recording medium according to claim 3, wherein the computer program further causes the information processing apparatus to:
    receive identification information in an identification information designation field for receiving identification information of the moving destination area whose size is already set; and
    display, when the identification information of the specific color area is set in the identification information designation field, a size of another moving destination area whose position is received, in the setting field so as to conform to the size of the moving destination area identified by the identification information.

5. The non-transitory recording medium according to claim 4,
wherein the setting field can receive a setting in addition to the identification information designation field, the setting including
a same size as the moving destination area whose size is already set; and
a relative position between the moving destination area whose size is already set and a moving source are applied to the another specific color area, and
wherein, in response to the setting, the size of the another moving destination area, whose position is received, is conformed to the size of the moving destination area identified by the identification information, and the position of the another moving destination area is determined based on the relative position, and displayed in the setting field.

6. The non-transitory recording medium according to claim 4, wherein the computer program further causes the information processing apparatus to:
displaying the preview screen of the document after changing the size of the another moving destination area whose position is received to a size displayed in the setting field.

7. The non-transitory recording medium according to claim 3, wherein the computer program further causes the information processing apparatus to:
causing the information processing apparatus to determine whether an image included in the moving destination area can be read, and
displaying a message in a case where it is determined that the image included in the moving destination area whose size is changed cannot be read.

8. The non-transitory recording medium according to claim 7, wherein the computer program further causes the information processing apparatus to:
repeating determinations of whether the image can be read while gradually increasing the image included in the moving destination area to determine a maximum size enabling to read the image;
displaying the moving destination area in the size of the determined maximum size; and
displaying the moving destination area of the changed maximum size.

9. The non-transitory recording medium according to claim 8, wherein the computer program further causes the information processing apparatus to:
receiving an area of one original image in a case where a setting of imposing multiple original images in the document is received;
repeating the determinations of whether the image can be read while gradually increasing the image of the moving destination area within a range of the original images; and
repeatedly determining whether the image can be read while gradually magnifying the image of the moving destination area within the range of the document, in a case where the setting of imposing the multiple original images in the document is not received.

10. An information processing apparatus that requests an image forming apparatus to print a document, the information processing apparatus comprising hardware circuitry configured to execute a computer program that causes the hardware circuitry to:
receive data of the document to be printed;
receive a position, a size, and a moving destination area of a specific color area that is printed with a specific color;
cause the information processing apparatus to display a setting field that enables setting of the size of the specific color area;
change a size of the moving destination area to the size of the specific color area set in the setting field;
display the moving destination area at the changed size of the moving destination area; and
send information of the specific color area including the received position and the size of the specific color area and the received data of the document to the image forming apparatus, the size of the specific color area sent to the image forming apparatus being the size set in the setting field.

11. A printing system comprising:
an image forming apparatus; and
an information processing apparatus that requests the image forming apparatus to print a document, wherein
the information processing apparatus comprises first hardware circuitry configured to execute program instructions that cause the first hardware circuitry to:
receive data of the document to be printed;
receive a position, a size, and a moving destination area of a specific color area that is printed with a specific color;
cause the information processing apparatus to display a setting field that enables setting of the size of the specific color area;
change a size of the moving destination area to the size of the specific color area set in the setting field; and
display the moving destination area at the changed size of the moving destination area; and
send information of the specific color area including the received position and the size of the specific color area and the received data of the document to the image forming apparatus, the size of the specific color area sent to the image forming apparatus being the size set in the setting field, and
the image forming apparatus comprises second hardware circuitry configured to execute program instructions that cause the hardware circuitry to:
receive the information of the specific color area and the data on the document;
convert the specific color area into image data of a predetermined color based on the received information of the specific color area;
extract an image in the specific color area from the converted image data;
convert the extracted image of the specific color area to the predetermined color; and
generate the image data of the predetermined color, in which the converted image of the specific color area is disposed.

* * * * *